US010706500B2

(12) United States Patent
Peterson et al.

(10) Patent No.: US 10,706,500 B2
(45) Date of Patent: Jul. 7, 2020

(54) GENERATING ENHANCED DIGITAL CONTENT USING PIECEWISE PARAMETRIC PATCH DEFORMATIONS

(71) Applicant: Adobe Inc., San Jose, CA (US)

(72) Inventors: John Peterson, Menlo Park, CA (US); Hyunghwan Byun, Mountain View, CA (US)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 16/141,347

(22) Filed: Sep. 25, 2018

(65) Prior Publication Data

US 2020/0098087 A1 Mar. 26, 2020

(51) Int. Cl.
*G06F 3/0481* (2013.01)
*G06F 3/0484* (2013.01)
*G06T 17/30* (2006.01)
*G06T 7/12* (2017.01)
*G06T 7/60* (2017.01)
(Continued)

(52) U.S. Cl.
CPC ........ *G06T 3/0093* (2013.01); *G06F 3/04812* (2013.01); *G06F 3/04845* (2013.01); *G06T 7/12* (2017.01); *G06T 7/60* (2013.01); *G06T 11/60* (2013.01); *G06T 17/30* (2013.01); *G06F 3/04842* (2013.01); *G06T 2200/24* (2013.01)

(58) Field of Classification Search
CPC ......... G06T 13/00; G06T 17/20; G06T 17/30; G06T 2210/21; G06T 2210/44; G06T 13/80; G06T 2219/2021; G06T 2200/24; G06T 3/0093; G06F 3/04812; G06F 3/04845; G06F 17/5018; G06F 17/50

USPC ....... 345/420, 423, 619, 646, 647, 648, 649, 345/660
See application file for complete search history.

(56) References Cited

U.S. PATENT DOCUMENTS 6,608,631 B1 * 8/2003 Milliron ................. G06T 13/00
345/619
6,803,913 B1 10/2004 Fushiki et al.
6,911,980 B1 6/2005 Newell et al.
(Continued)

OTHER PUBLICATIONS

U.S. Appl. No. 16/141,276, Apr. 26, 2019, Preinterview 1st Office Action.
(Continued)

*Primary Examiner* — Jin Cheng Wang
(74) *Attorney, Agent, or Firm* — Keller Jolley Preece

(57) ABSTRACT

Methods, systems, and non-transitory computer readable storage media are disclosed for applying piecewise deformations to digital content using a plurality of parametric patches. For example, the disclosed system generates a plurality of parametric patches (e.g., Bezier patches) within a parametric quilt for digital content (e.g., a digital image or digital text). The disclosed system also provides interface controls for user-defined split/patch locations for the parametric quilt. In one or more embodiments, the disclosed system divides digital content into a plurality of portions. The disclosed system modifies one or more parametric patches and deforms a corresponding portion(s) of the digital content based on the modified parametric patch(es). The disclosed system then recombines the portions of the digital content to generate modified digital content that includes any deformations based on the modified parametric patch(es).

20 Claims, 39 Drawing Sheets

(51) Int. Cl.
*G06T 3/00* (2006.01)
*G06T 11/60* (2006.01)

(56) References Cited

U.S. PATENT DOCUMENTS

| | | | |
|---|---|---|---|
| 7,385,612 B1 | 6/2008 | Peterson | |
| 7,453,474 B2 * | 11/2008 | Faraday | G06F 3/04845 345/660 |
| 7,812,850 B1 * | 10/2010 | Nelson | G06T 11/60 345/420 |
| 8,970,628 B1 * | 3/2015 | Jensen | G06T 19/20 345/419 |
| 10,510,186 B2 | 12/2019 | Batra et al. | |
| 2004/0024575 A1 | 2/2004 | Surazhsky et al. | |
| 2004/0085311 A1 | 5/2004 | Lee et al. | |
| 2006/0290693 A1 * | 12/2006 | Zhou | G06T 17/20 345/420 |
| 2008/0162090 A1 * | 7/2008 | Perry | G06F 17/5018 703/1 |
| 2008/0275677 A1 * | 11/2008 | Landon | G06F 17/5018 703/2 |
| 2010/0214321 A1 * | 8/2010 | Hokkanen | H04N 1/00336 345/660 |
| 2013/0120457 A1 * | 5/2013 | Popovic | G06T 3/0093 345/647 |
| 2013/0162681 A1 | 6/2013 | Peterson | |
| 2014/0267252 A1 * | 9/2014 | Hutchinson | G06T 13/20 345/420 |
| 2014/0267306 A1 * | 9/2014 | Koniaris | G06T 13/20 345/473 |
| 2016/0162603 A1 * | 6/2016 | Schriesheim | G06F 17/50 703/1 |
| 2018/0130256 A1 * | 5/2018 | Wampler | G06T 13/20 |
| 2020/0098087 A1 | 3/2020 | Peterson et al. | |

OTHER PUBLICATIONS

U.S. Appl. No. 16/141,276, Jun. 11, 2019, 1st Action Office Action.
U.S. Appl. No. 16/141,276, Jul. 22, 2019, 1st Action Office Action.
U.S. Appl. No. 16/141,276, Nov. 14, 2019, Office Action.
U.S. Appl. No. 16/141,276, Jan. 29, 2020, Notice of Allowance.
U.S. Appl. No. 16/141,226, Apr. 3, 2020, Preinterview 1st Office Action.

* cited by examiner

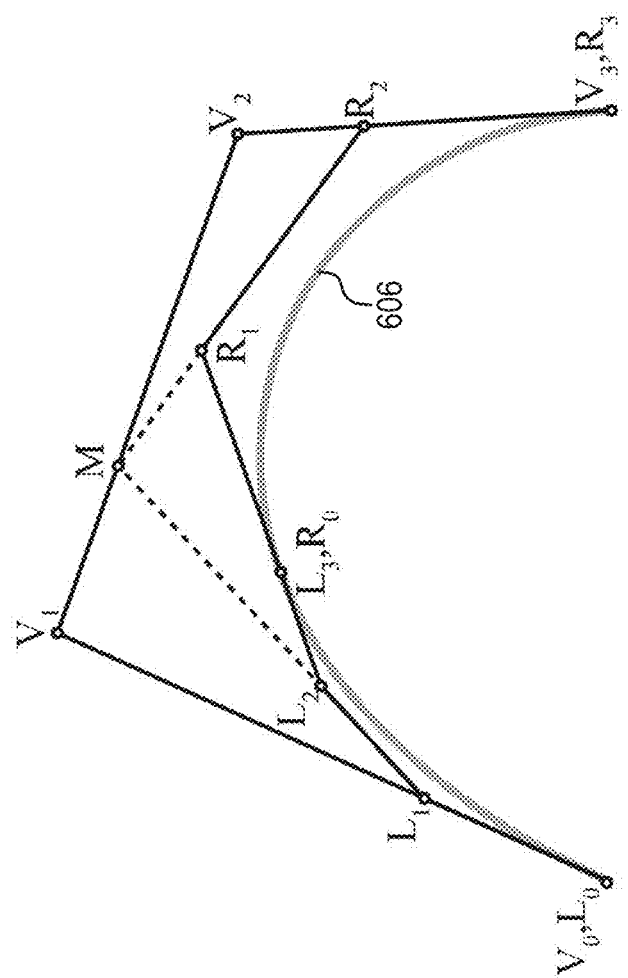
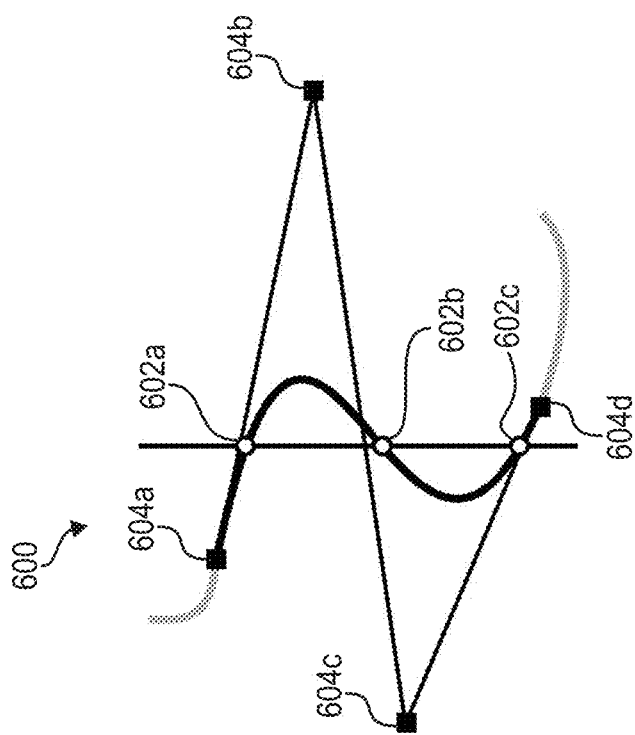
Fig. 6B
Fig. 6A

GENERATING ENHANCED DIGITAL CONTENT USING PIECEWISE PARAMETRIC PATCH DEFORMATIONS

BACKGROUND

Over the last several years, developers have created hardware and software platforms for creating and manipulating digital images. These platforms allow computing systems to manipulate digital images in a variety of ways to modify one or more characteristics and then save or share the edited digital images. Indeed, conventional systems can edit a raster image or vector image by warping or otherwise deforming the image via control points (e.g., in a Bezier patch or a Bezier curve) corresponding to the digital image. Changing a position of a control point in such a warping/deformation operation alters a digital image by stretching or compressing the image in connection with the positions of the group of control points.

The amount of processing expense required to perform a warping/deformation operation on a digital image largely depends on the complexity of the operation. In particular, processing images using Bezier deformations according to conventional methods can become very processor intensive with higher-order deformation operations. For example, changing a position of a control point can cause an image editing application to calculate a deformation for a Bezier patch based on the degree of change of the position (or orientation) of the control point. With higher orders of control points in a single deformation operation for an image, the calculations required to deform the image increase significantly due to the additional computation required to evaluated higher-order polynomials on the various curves within the Bezier patch. As an example, performing a warp/deformation using cubic curves in a 4×4 grid requires approximately $4^3$ operations, while a 6×6 grid requires more than double the amount of computation (approximately $6^2 \times 4$). Accordingly, using higher order deformation operations is impractical for many computing devices due to the computational expenses. Indeed, conventional systems typically utilize application programming interfaces for most drawing and rendering applications, such that cubic Bezier deformation is standardized across the applications.

Some conventional systems attempt to limit the computational expense associated with deformation operations by limiting the number of control points a user interacts with. For instance, some conventional systems limit deformation operations to a 4×4 grid of control points for deforming a Bezier patch corresponding to a digital image. While limiting the number of control points reduces the computational expense relative to using additional control points, doing so limits the flexibility of the warping/deformation operation by reducing overall control over the deformation process. Indeed, the 4×4 bicubic grid of these conventional systems includes only 16 control points with which a user can interact to deform an image. Even in higher order operations, however, conventional systems lack local control in the deformation process because manipulating control points for a Bezier patch on one side of the grid can still have a measurable effect across the entire Bezier patch due to the nature of the curves within a Bezier patch.

Additionally, in the case of vector images, conventional systems typically require a patch-based deformation to be performed on an entire image or artwork. For instance, using the conventional systems, a user would apply a deformation to an image by modifying a deformation patch that corresponds to the entirety of the image. Thus, the conventional systems are unable to perform localized deformation on only a portion of a vector image or artwork. Accordingly, conventional systems lack flexibility when performing deformation operations on vector images.

Conventional systems also lack flexibility and accuracy in relation to modifying digital text. For example, in response to a user request to place text along a path, conventional systems place the text directly on or along the path by modifying a rotation of individual characters in the text to follow the input path. This approach of placing text along a curve can result in crowded, overlapping characters and/or characters that are spread apart. Such a result may not accurately represent the intended aesthetics of the type font, thereby limiting the types of paths that a user may utilize. Accordingly, the conventional systems inefficiently utilize computing resources to produce inflexible and inaccurate deformation operations on digital images.

SUMMARY

One or more embodiments provide benefits and/or solve one or more of the foregoing or other problems in the art with systems, methods, and non-transitory computer readable storage media for generating enhanced digital content based on piecewise patch-based deformation. For example, in one or more embodiments, the disclosed systems provide a quilt warping tool that uses a plurality of warp patches (e.g., Bezier patches) joined together as part of a parametric quilt to provide improved control while deforming a raster image or vector image. For example, in one or more embodiments the disclosed systems control or limit warping to only a portion of a digital image while providing smooth transitions to other portions of the digital image. Furthermore, the disclosed systems provide user interface controls for modifying the warp patches using separate controls (e.g., separate sets of control points) corresponding to each warp patch. The disclosed systems efficiently, flexibly, and accurately deform a digital image by deforming individual portions of an image using separate warp patches.

In one or more embodiments, the disclosed systems also provide user-defined parametric warp splits for deforming a digital image. In particular, the disclosed systems provide user interface controls allowing a user to specify the number and location of lines (e.g., isolines) for determining where to split the digital image for deforming the digital image. The disclosed systems generate parametric warp patches based on the user-defined lines to allow the user to deform image portions of customized sizes. Furthermore, the disclosed systems allow the user to define a buffer zone to prevent deformation of one or more portions of an image from causing a deformation to portions that are separated by the buffer zone.

In one or more embodiments, the disclosed systems also provide piecewise deformation of digital text along a curved path. For example, in response to a request to deform text along a curved path, the disclosed systems create a segment-by-segment offset curve from the curved path. Moreover, the disclosed systems can create a quilt of a plurality of warp patches that correspond to portions of the digital text. In one or more embodiments, the disclosed systems warp curve outlines of characters in the digital text based on the warp patches and fill the warped curves according to a rendering style of the text. The disclosed systems can thus provide improved text deformation that accurately reflects font characteristics of the text while reducing or eliminating artifacts.

Additional features and advantages of one or more embodiments of the present disclosure will be set forth in the description which follows, and in part will be obvious from the description, or may be learned by the practice of such example embodiments.

BRIEF DESCRIPTION OF THE DRAWINGS

Various embodiments will be described and explained with additional specificity and detail through the use of the accompanying drawings in which:

FIGS. 6A-6D illustrates diagrams for deforming vector images in accordance with one or more implementations;

DETAILED DESCRIPTION

Figure 1:
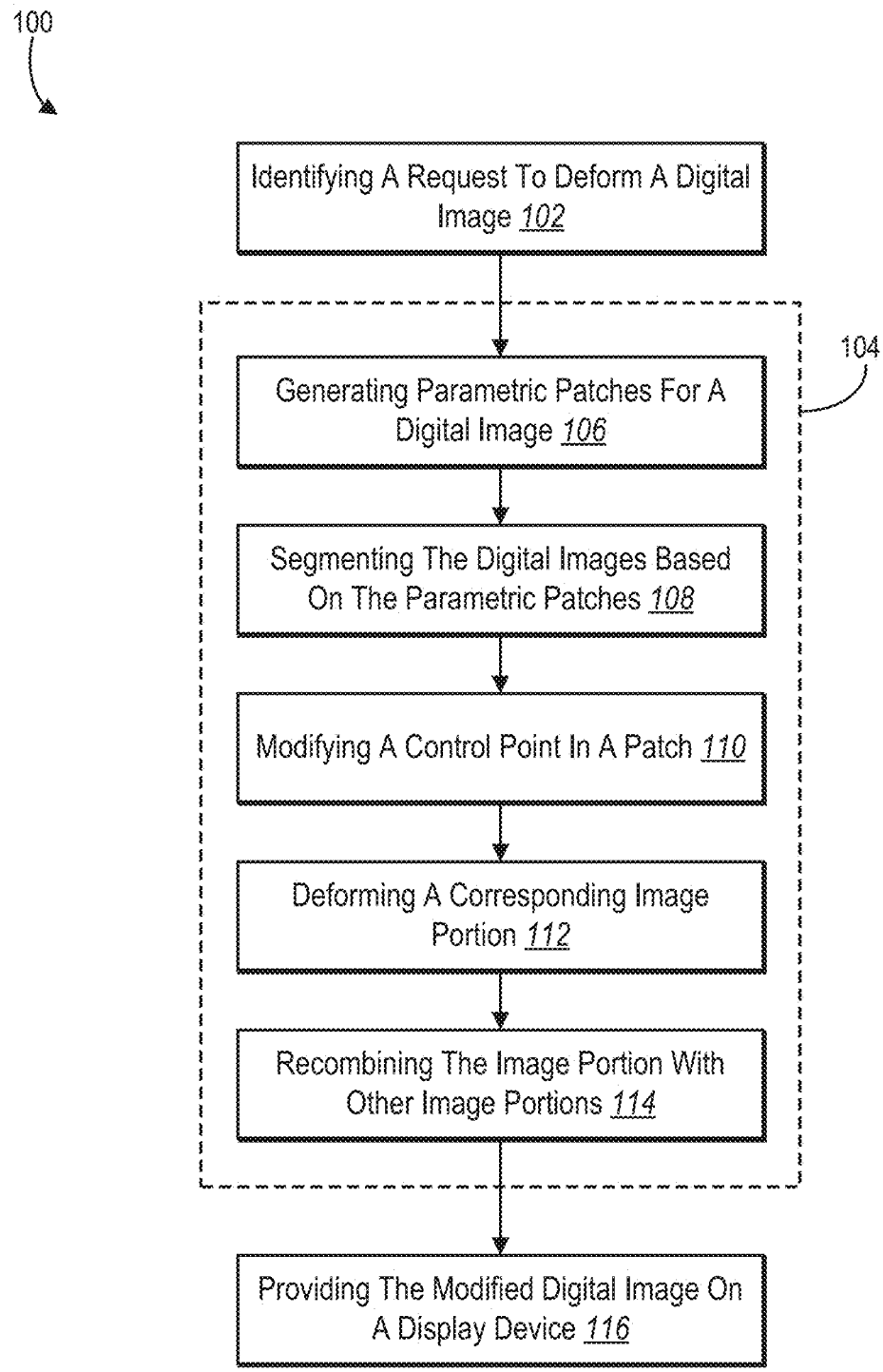
FIG. 1 illustrates a diagram for a process of piecewise deformation of a digital image in accordance with one or more implementations.

One or more embodiments of the present disclosure include a digital content editing system (or simply "content editing system") that performs piecewise deformation of digital content such as digital images (e.g., raster images or vector images) or digital text. For example, in response to a request to deform digital content, the content editing system partitions digital content into a plurality of portions corresponding to a parametric quilt including a plurality of parametric patches (e.g., Bezier patches or other spline-based surfaces) in adjacent portions of the digital content. For instance, he content editing system determines a deformation for digital content corresponding to each parametric patch in the quilt and deforms the individual portions of the digital content. In one or more embodiments, the content editing system then recombines the portions of the digital content. Using a digital quilt of multiple warping patches, the content editing system quickly and efficiently manipulates all or only a portion of a digital image, while providing a smooth transition to the remainder of the digital image.

As just mentioned, the content editing system performs piecewise deformation on digital images (e.g., vector images or raster images). In one or more embodiments, the content editing system performs a deformation operation for a digital image by first generating a plurality of parametric patches within a grid (a "quilt" of parametric patches) corresponding to the digital image. For instance, in response to receiving a request to deform the digital image, the content editing system can determine a parametric quilt for the image that includes a plurality of separate parametric patches. The parametric patches may be of equal size (or approximately equal size) based on the size of the parametric quilt or based on a user input (as described more below). Additionally, each of the parametric patches includes a plurality of control points that allows a user to modify a shape of a corresponding parametric patch.

Furthermore, the content editing system can divide the digital image into a plurality of portions corresponding to the parametric patches. For instance, the content editing system splits the digital image along edges of the parametric patches so each parametric patch corresponds to a separate image portion. To illustrate, for raster images (e.g., a digital image defined by a plurality of pixels), in one or more embodiments the content editing system divides the raster images by generating adjoining sets of subdivided triangles that are mapped to pixels of the digital image. With regard to vector images (e.g., a digital image defined by mathematical curves or lines), the content editing system can slice vector segments along boundaries of parametric patches to divide the vector image into different portions. Specifically, the content editing system determines whether a portion of a digital image falls within the boundaries of a given parametric patch by analyzing the zero-crossing points of vector segments and storing a list of path slices.

As mentioned, each of the parametric patches can include a plurality of control points that a user may manipulate to modify the shape of the corresponding patch. The content editing system can receive an input to modify a parametric patch based on a changed position of a control point for the parametric patch. In one or more embodiments, in response to a position change of a control point of one or more parametric patches, the content editing system deforms corresponding portion(s) of the image. For instance, for a parametric patch corresponding to a specific image portion, the content editing system deforms the image portion by using parametric deformations according to the modified parametric patch. In particular, the content editing system can utilize a plurality of parametric curves defined by the control points to determine how to deform an image portion (e.g., path slices or triangles) for a corresponding parametric patch.

As mentioned above, the content editing system can also recombine the image portions together to create a modified digital image. With regard to a raster image, the content editing system can render pixels corresponding to each deformed triangle to generate a modified digital image. With regard to vector images, the content editing system can recombine deformed vector segments from a list of path slices that are within a defined tolerance. Once the image portions are recombined, the content editing system can provide the modified digital image on a graphical interface of a display device.

As previously mentioned, the content editing system can perform dynamic piecewise deformation based on user-defined parametric patches. Specifically, the content editing system can provide a user interface control allowing a user to customize parametric patch sizes and locations. For instance, in one or more embodiments, the content editing system provides a dynamic parametric patch split control (or simply "split control") within a graphical interface of a client device. Selecting the split control allows a user to manually identify specific location(s) for splitting a digital image and generating parametric patches for deforming separate portions of the digital image.

The content editing system can also insert a buffer zone for deforming a digital image. Specifically, the content editing system provides an interface control for reserving a region of the digital image to prevent deformations across patches separated by the buffer zone. More specifically, the buffer zone prevents a deformation in a first portion of the digital image from causing a deformation in a second portion of the digital image. In addition, the content editing system can allow the user to customize a size (e.g., width and/or height) of the buffer zone, in addition to the location of the buffer zone.

As also mentioned above, the content editing system can perform piecewise deformation on digital text. For example, in one or more embodiments, the content editing system warps digital text along a curved path. To illustrate, the content editing system can generate an offset path corresponding to a curved path. In one or more embodiments, the content editing system determines a size (e.g., a height) of the digital text to determine a distance between the curved path and the offset path to fit the digital text within a border created by the curved path and the offset path. The content editing system also determines a plurality of deformation regions based on the curved path and the offset path. For example, the content editing system can use segments in the curved path, changes in curvature, control points, or other criteria to determine distinct regions for deforming individual portions of the digital text.

Once the content editing system has determined the offset path and the deformation regions, the content editing system can then generate parametric patches corresponding to the deformation regions. Indeed, similar to embodiments for deforming a digital image, the content editing system divides the text into a plurality of parametric patches within a parametric quilt. Furthermore, in one or more embodiments, the content editing system deforms the parametric patches corresponding to the previously identified deformation regions so the text within each parametric patch is deformed according to the curvature of the curved path and offset path. The content editing system can thus stretch or compress the text based on curve(s) in the curved path and within separate regions. In one or more embodiments, the content editing system recombines the text portions corresponding to the separate parametric patches to generate a completed, modified text that follows the curved path.

As mentioned, the digital content editing system provides a number of advantages over conventional systems. For example, the content editing system improves the flexibility of computing systems that implement digital content deformation processes. In particular, the content editing system improves flexibility by dividing digital content using separate parametric patches within a parametric quilt that cover distinct portions of the digital content. The partitioned image and separate parametric patches provide many more control points in a deformation operation, which allows for more detailed deformations than conventional systems. In contrast, conventional systems that utilize a Bezier patch only allow users to modify control points for a single Bezier patch (typically up to bicubic) during a deformation operation.

Furthermore, as mentioned above, the content editing system allows increased control over modifications to digital content. Indeed, by utilizing a quilt of parametric patches, the content editing system can apply different deformations to different portions of a digital image. Moreover, the content editing system can deform any portion of a digital image while leaving other portions of a digital image unchanged. Thus, the content editing system allows for a greater number of control points and also provides greater control over applying deformations to individual portions of digital content.

Additionally, the digital content editing system improves efficiency and processing performance of computing systems implementing digital content deformation processes while maintaining flexibility. Specifically, while the content editing system can provide an increased number of control points compared to conventional systems, dividing digital content according to a plurality of parametric patches for a deformation operation reduces the number of calculations required to deform the digital content. In contrast, allowing a user to deform digital content using a higher-order Bezier patch in conventional systems greatly increases the number of required calculations. Thus, the content editing system provides flexibility with reduced processing requirements.

Furthermore, the digital content editing system also provides improved user interface controls that improve the functionality of implementing computing devices. For example, by providing interactive split controls illustrating split isolines as users interact with digital content, the digital content editing system reduces user interactions and the time required to manipulate digital content. Moreover, interactive split controls allow computing systems to more flexibly define locations of parametric patch boundaries. Thus, the digital content editing system allow for more efficient and less time consuming deformations while providing more flexibility in defining and utilizing patch quilts.

Moreover, the digital content editing system improves accuracy of computing systems implementing digital text deformation processes. For instance, by partitioning digital text into a plurality of parametric patches corresponding to deformation regions determined based on a curved path, the content editing system more accurately represents font/text characteristics when deforming the text. Specifically, by stretching or compressing portions of the text based on a distance from the curved path and whether the curved path curves inward or outward, the content editing system maintains the spacing and style of the original font. Achieving this with conventional systems is difficult without introducing artifacts into the text along a curved path.

As illustrated by the foregoing discussion, the present disclosure uses a variety of terms to describe features and advantages of the content editing system. Additional detail is now provided regarding the meaning of the terms. For example, as used herein, the term "digital content" refers to visual content a computing device displays on a display device. Digital content can include content such as digital images (e.g., raster images or vector images). Digital content can include digital photographs, computer-drawn images, or digital text. Digital content may be user-generated, computer-generated, or a combination of both. Additionally, the editing system can allow a user to view, edit, or otherwise interact with digital content via one or more inputs associated with a computing device.

As used herein, the term "raster image" refers to a digital image made up of pixels. In particular, a raster image includes an image of one or more raster elements depicted by coloring or shading various pixels in a grid of pixels. Raster images have a fixed resolution and zooming in on a raster image often results in blurring and digital artifacts, as the grid of pixels is magnified without introducing more information. Common examples of raster image file formats include GIF, JPEG, PNG, and TIFF files.

As used herein, the term "vector image" refers to a digital image include a series of mathematical curves and lines. A vector image includes one or more vector drawing segments or curves, defined below. Because vector images employ mathematical equations to represent edges rather than a grid of pixels, zooming in on a vector image does not cause aliasing or digital artifacts along edges of a vector drawing segment. Indeed, a vector image is resizable without losing quality in color or smoothness. Common examples of vector file formats include SVG, EPS, and PDF files.

As used herein, the term "parametric patch" (or "parametric surface") refers to a spline surface used in computer-aided design for modifying digital content. In particular, a parametric patch includes a smooth-continuous surface defined by a number of control points (e.g., control points that modify the surface from a unit square). To illustrate, a parametric patch can include a Bezier patch or surface. For example, a bicubic Bezier patch includes a 4×4 grid of control points (i.e., 16 total control points) defining a shape of the Bezier surface based on a positioning of the control points. More specifically, control points within a Bezier patch define parametric curves that are interpolated based on the position of the corresponding control points and determine the shape of the Bezier patch as a whole. While many examples described herein utilize Bezier patches and curves, a parametric patch can include one or more other types of splines such as, but not limited to, Hermite curves, B-splines, non-uniform rational basis splines, Kappa-curves, Catmull-Rom splines or another parameter curve/patch able to approximate a dense series of points.

As used herein, the term "control point" refers to an interaction point on a parametric patch that determines a shape of the parametric patch. A control point includes edge points, corner points, or intermediate points within a parametric patch. Modifying the position of a single control point can change curves (e.g., vertically and horizontally) within a parametric patch. Moreover, in an image editing process (e.g., deformation), the content editing system uses the position of control points of a parametric patch to determine how to modify a corresponding image or image portion. Furthermore, as used herein, the term "coincident control point" refers to a control point that is shared by two or more parametric patches. For example, a control point that lies at the edge or corner of two parametric patches is a coincident control point. Changing a position of a coincident control point thus modifies more than one parametric patch.

As used herein, the terms "quilt," "digital quilt," "Bezier quilt," and "parametric quilt" refer to a region (e.g., a grid) that includes a plurality of parametric patches. For instance, a parametric quilt can include a plurality of parametric patches that cover a region of digital content. To illustrate, a parametric quilt can include a 4×4 grid of parametric patches of the same or different sizes for deforming a digital image. In another example, a Bezier quilt can include one or more rows (and/or column) of Bezier patches for deforming digital text.

As used herein, the term "path" refers to a continuous function that extends from an initial point to a terminal point. A path can include one or more Bezier curves and/or one or more straight lines. Furthermore, a path can include other representations of curved/straight lines including Hermite curves, B-splines, non-uniform rational basis splines, Kappa-curves, Catmull-Rom splines or another parameter curve. Accordingly, a "curved path" refers to a path that includes at least one Bezier curve. Furthermore, the initial point and the terminal point of a path can be at distinct locations or at the same location, thereby forming a completely enclosed area (or areas) or forming an open-ended path. As used herein, an "offset path" is a path that a computing device generates using a curved path to create deformation regions for deforming digital text.

Also, as used herein, the terms "image portion," "portion," and "text portion" refer to a region of digital content that is less than a whole of the digital content. For instance, the editing system can divide a digital image into a plurality of portions corresponding to a plurality of Bezier patches. Additionally, the editing system can divide digital text into a plurality of portions corresponding to a plurality of Bezier patches. Furthermore, a "path portion" can also refer to a portion of a path (e.g., a segment or curve along a path).

As used herein, the term "deformation region" refers to a region for determining a portion of digital text to deform according to a parametric patch. Specifically, a deformation region is an area within a boundary formed by an original path and an offset path. As described herein, the content editing system determines a plurality of deformation regions within the boundary formed by the original path and the offset path. Thus, deformation regions allow the content editing system to determine how to modify un-deformed text to create modified (i.e., deformed) digital text along a curved path using a plurality of Bezier patches.

As used herein, the term "parametric continuity" refers to a smoothness of a path. In particular, parametric continuity can be measured by the number of derivatives of a function corresponding to the path that are continuous. Parametric continuity for a path is represented as $C^k$, where k is the class of the continuity. For example, with continuity of $C^0$ indicates that the function representing the path is a continuous function (i.e., a curve in the path is connected at a given joint). Furthermore, a $C^1$ function indicates that two segments connected at a joint share the same first derivative at the joint. Accordingly, the editing system can perform deformations to maintain $C^0$ and/or $C^1$ continuity of original digital content so that deformed digital content has smooth transitions between Bezier patches according to the original digital content.

As used herein, the terms "dynamic parametric patch split control" and "split control" refer to a tool or control within a graphical interface allowing a user to customize split locations within a graphical user interface. For example, a split control can include an interface element (and an associated command) for defining split locations. Additionally, a split control can include a user interface element that assists a user in performing the associated operation, including, but not limited to, displaying a dynamic split indicator corresponding to a movement of the cursor. As used herein, the term "dynamic split indicator" refers to a visible line (e.g., isoline following a path within a parametric quilt) within a graphical interface that indicates where a split would be inserted based on a current location of a cursor or user input.

As used herein, the term "buffer zone" refers to a region separating two or more parametric patches in connection with an operation to deform a digital image. In particular, a buffer zone can include a parametric patch between two parametric patches. Inserting a buffer zone divides a single parametric patch into a plurality of parametric patches, or separate two or more existing parametric patches by a distance corresponding to the buffer zone. Furthermore, a buffer zone can include a predefined size or a user-defined size.

Additional detail will now be provided regarding the content editing system in relation to illustrative figures portraying exemplary implementations. To illustrate, FIG. 1 includes an overview of a series of acts 100 of piecewise deformation of a digital image. In one or more embodiments, the content editing system performs the series of acts 100. For instance, a client device can implement the content editing system for performing the series of acts 100 to deform a digital image using a plurality of Bezier patches.

As illustrated in FIG. 1, the content editing system performs an act 102 of identifying a request to deform a digital image. For example, the content editing system receives a request to perform a "quilt" warp deformation operation within a client application. As previously mentioned, the digital image can be a raster image or a vector image. Thus, the client application may be a raster-based image editing application or a vector-based image editing application. Furthermore, the client application can display the digital image on a display device for the user to view and/or interact with (e.g., edit) the digital image. As described in relation to FIGS. 2A-2E, the request can be for deforming an entire digital image. Alternatively, as described in relation to FIG. 4, the request can be for deforming only a portion of a digital image (e.g., the Bezier quilt corresponds to less than the entire digital image).

In one or more embodiments, the request to deform a digital image involves a user selecting a "quilt" warp tool within the client application to request the deformation operation. Alternatively, the request may be part of a series of operations that includes the "quilt" warp deformation operation as one operation. Thus, the request may be directly in response to a user input, based on a request to perform a series of operations, or an automated operation requested by the computing device.

Additionally, FIG. 1 shows that the content editing system also performs an act 104 of deforming a digital image using a plurality of Bezier patches. As illustrated, the act 104 also includes a plurality of additional acts (acts 106-114) for performing the deformation operation. In particular, the series of acts 100 includes an act 106 of generating parametric patches for the digital image. For instance, as described with respect to FIG. 2B, the content editing system can generate a plurality of Bezier patches of equal size within a Bezier quilt for the deformation operation of the digital image. In one or more embodiments, the content editing system determines a number of Bezier patches to generate based on a setting associated with the operation (e.g., a default setting or a user preference setting). In one or more additional embodiments, the content editing system dynamically determines the number of Bezier patches based on dimensions of the digital image (or selection associated with the deformation operation), including a height/width ratio, shape, or resolution. Alternatively, as described with respect to FIGS. 7-9C, the content editing system can allow a user to manually specify patch locations/sizes for a digital image.

Furthermore, the content editing system can generate Bezier patches having a variety of different orders (e.g., linear, cubic, bicubic). For example, the content editing system can generate a plurality of bicubic Bezier patches within the Bezier quilt. To illustrate, a plurality of bicubic Bezier patches provides a set of 4×4 control points for each of the Bezier patches such that each Bezier patch includes 16 control points (with at least some control points in each Bezier patch being coincident with control points of adjacent Bezier patches). As previously mentioned, the control points allow a user to modify the Bezier patches, which causes the content editing system to deform the corresponding image portions.

In one or more additional embodiments, the content editing system generates Bezier patches of an order other than bicubic (e.g., linear, cubic). For example, when deforming digital text along a curve path, the content editing system can utilize cubic Bezier patches. Utilizing lower order Bezier patches requires less computing resources than higher Bezier patches, but because the content editing system generates a plurality of Bezier patches (each with its own set of control points), the content editing system can still provide flexibility and accuracy in deformation operations by deforming each image portion individually. Additionally, the content editing system can set an order of the Bezier patches based on the digital content (e.g., linear along a height of the text and cubic along the length of the text) or based on a setting associated with the request.

As shown in FIG. 1, the series of acts 100 also includes an act 108 of dividing the digital image based on the parametric patches, as briefly mentioned previously. After the content editing system has generated the Bezier patches, or in conjunction with generating the Bezier patches, the content editing system then partitions (or subdivides) the digital image into portions that correspond to the Bezier patches, as described with respect to FIG. 2C. To illustrate, because the content editing system generates the Bezier patches to deform individual portions of the image, the content editing system partitions the digital image along edges of the Bezier patches. Accordingly, each Bezier patch corresponds to a separate portion of the digital image (i.e., a single Bezier patch does not overlap more than one portion of the image, and vice versa).

In one or more embodiments, the content editing system divides the digital image into a plurality of logical portions. In one example, the content editing system stores the logical portions as separate files within memory. In another example, the content editing system stores the logical portions as separate entries in a table or as separate database entries using coordinate/location information for each of the portions. The content editing system uses the Bezier patches to determine the coordinate/location information for the portions. For instance, the content editing system can utilize a row/column index of the patches to identify the portions of the digital image that fall within each patch.

As mentioned briefly, the content editing system can perform piecewise deformation of raster images or vector images. The content editing system divides a raster image by subdividing separate portions of the image into a plurality of triangular "shards" based on the patch locations and then performing additional subdivisions based on deformations in a given portion. Additional detail regarding partitioning raster images is provided below with respect to FIGS. 2F-2G. With regard to vector images, the content editing system determines zero-crossing points for vector segments in a vector image and stores a list of path slices for determining the portions of the vector image correspond to particular Bezier patches. The content editing system uses the zero-crossing points and list of path slices to reassemble the vector image when generating the modified digital image after deforming the path slices. Additional detail regarding partitioning vector images is provided below with respect to FIGS. 6A-6D.

FIG. 1 illustrates that the series of acts 100 includes an act 110 of modifying a control point in a patch. In particular, the content editing system can receive a user input to modify a control point within a Bezier patch by changing a position of the control point. For example, as described in more detail with respect to FIG. 2D, a user can change positions of any number of control points associated with each Bezier patch. Changing a position of a control point changes a shape of the Bezier patch, and therefore, changes a shape of one or more Bezier curves associated with the control point.

As mentioned, the Bezier quilt for the digital image includes a plurality of Bezier patches in which each Bezier patch is adjacent to at least one other Bezier patch. Accordingly, each Bezier patch includes control points that are coincident with control points of at least one other Bezier patch. Changing the position of a coincident control point changes the shape of the corresponding Bezier patches. For instance, a coincident control point at an edge (i.e., in the middle of an edge) of a first Bezier patch and a second Bezier patch modifies both the first Bezier patch and the second Bezier patch. Additionally, a coincident control point at a corner shared by four Bezier patches modifies all four Bezier patches when moved.

The series of acts 100 also includes an act 112 of deforming a corresponding image portion. In response to determining that the positions of one or more control points modify a shape of a Bezier patch, the content editing system calculates a deformation based on the modified Bezier patch. Specifically, the content editing system calculates a Bezier patch deformation based on the positions of the control points in the Bezier patch and an effect of the control points on a plurality of Bezier curves within the Bezier patch. The content editing system then deforms a portion of the image corresponding to the Bezier patch based on the calculated Bezier patch deformation (e.g., by stretching or compressing the portion according to the control points). The content editing system modifies each portion of the image according to the corresponding Bezier patches.

Additionally, after deforming the digital image, the series of acts 100 includes an act 114 of recombining the image portion with other image portions. In particular, the content editing system recombines a deformed image portion with any adjacent portions to create a finalized digital image with any deformations from corresponding Bezier patches. To illustrate, the content editing system can recombine a first image portion at a corner of the digital image (e.g., an upper left corner) with two adjacent image portions (e.g., at a right edge and a bottom edge of the first image portion).

For example, when deforming a vector image, the content editing system can recombine image portions using information stored with vector segments or a list of path slices. For instance, when the content editing system slices a path into separate vector segments, the content editing system stores parametric locations of the slice locations, sorted by increasing parametric value. When reconstructing the path, the content editing system reassembles the list of path slices according to the order in which the parametric slice locations are stored. As described in relation to FIG. 6C, recombining the portions allows the content editing system to redraw the vector segments with any deformations introduced by modified Bezier segments.

After deforming the digital image, the series of acts 100 includes an act 116 of providing the modified digital image on a display device. In particular, the content editing system can display the resulting modified digital image with the recombined image portions (including any deformed image portions) within a user interface of a client application. For example, FIG. 2E and the accompanying description below illustrate an example user interface of a client application for displaying a modified digital image after a deformation operation. Additionally, the content editing system allows the user to view the modified digital image and/or perform additional modifications to the modified digital image.

Figure 2A:
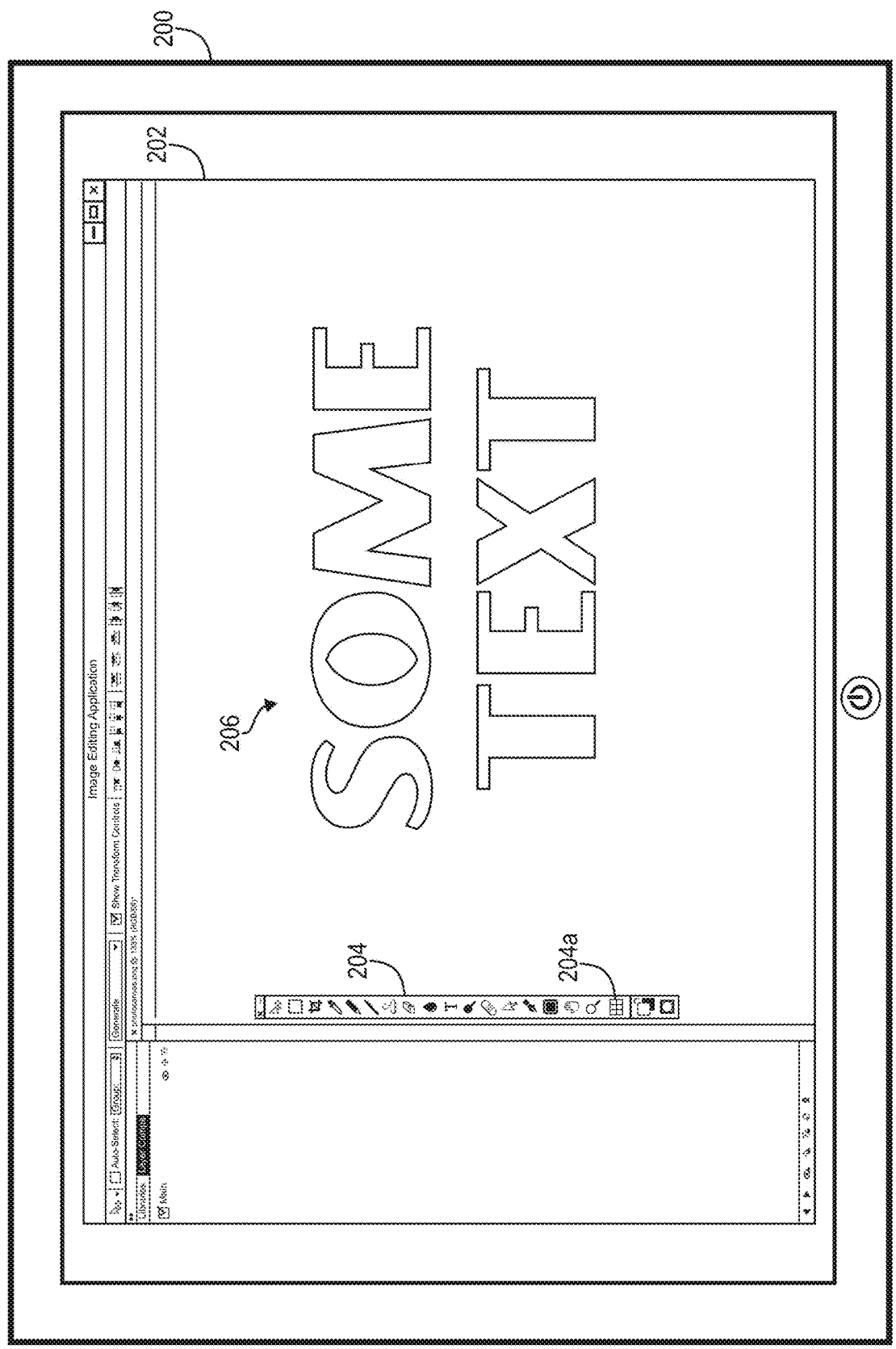
FIGS. 2A-2G illustrate diagrams for deforming a raster digital image in accordance with one or more implementations.
Figure 2B:
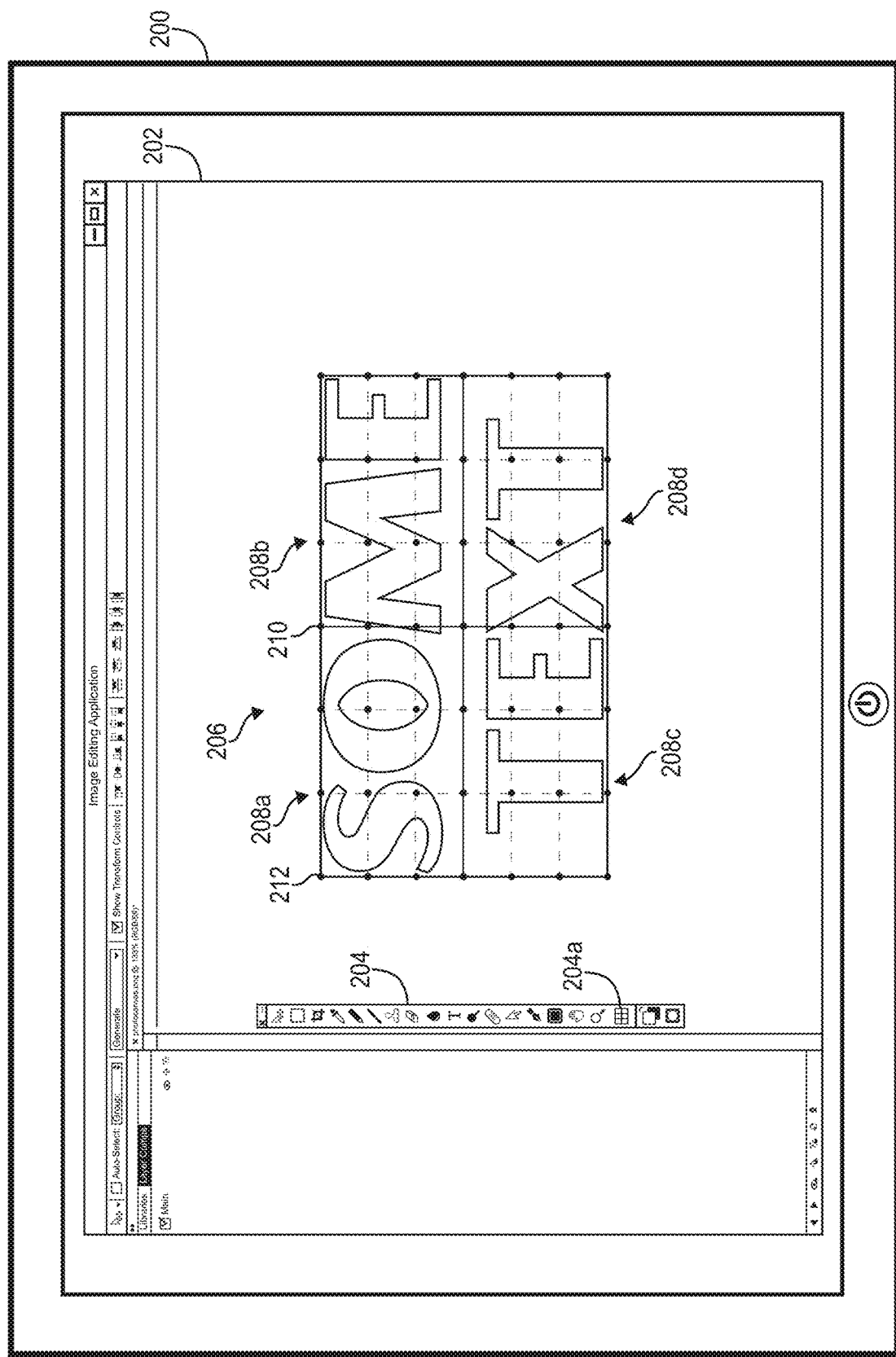
Figure 2C:
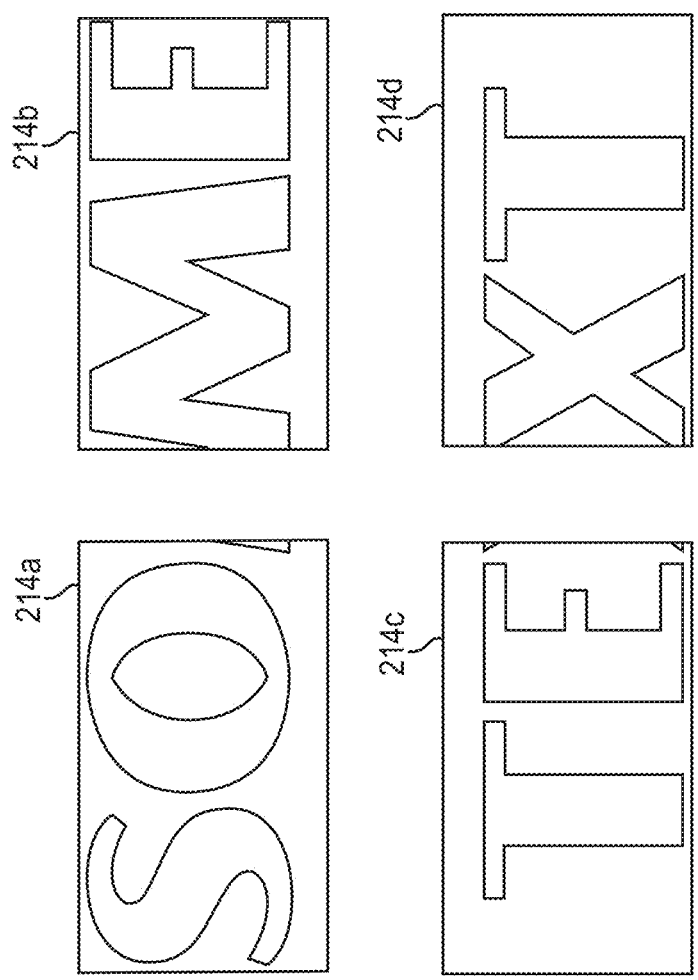
Figure 2D:
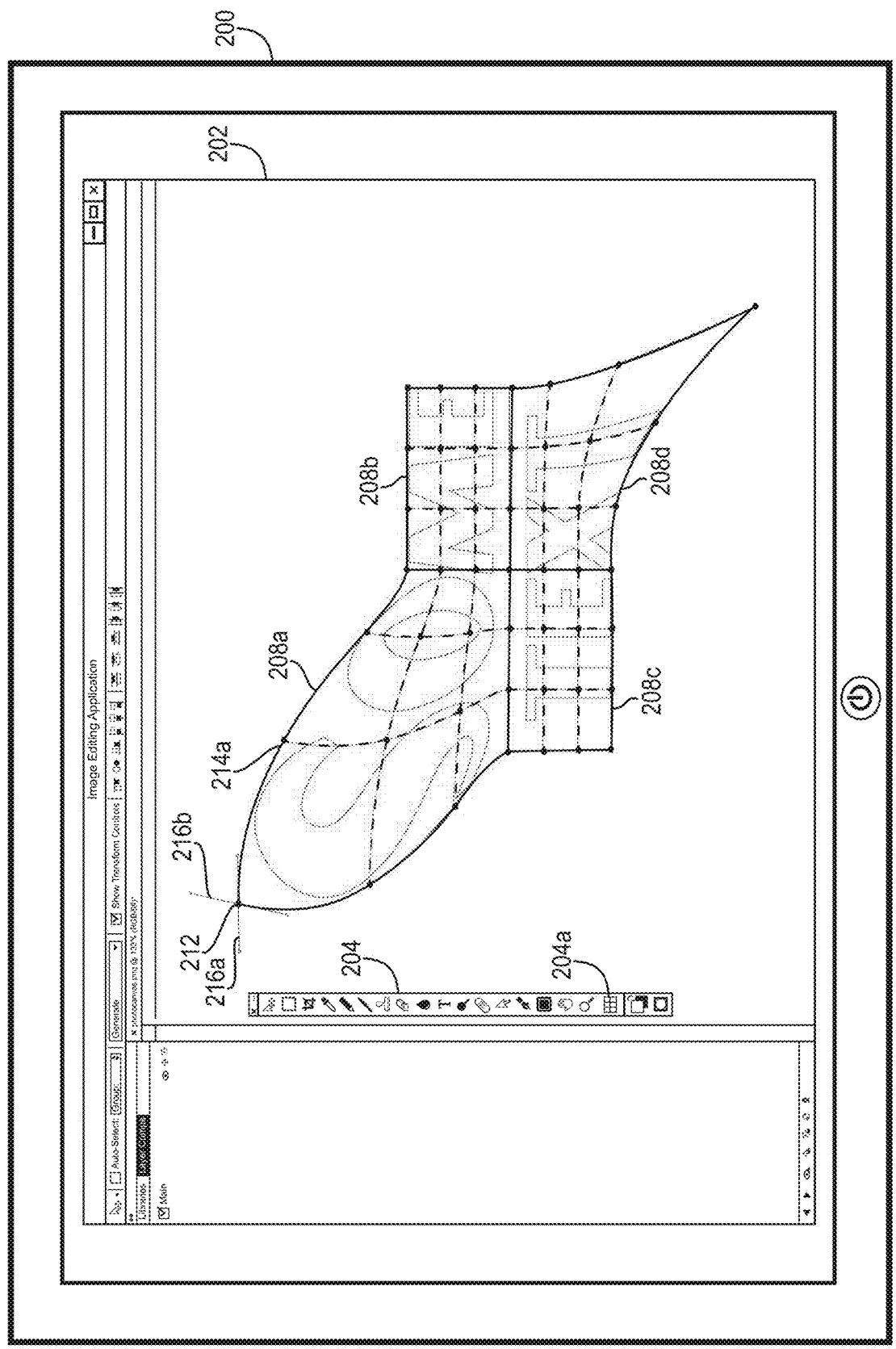
Figure 2E:
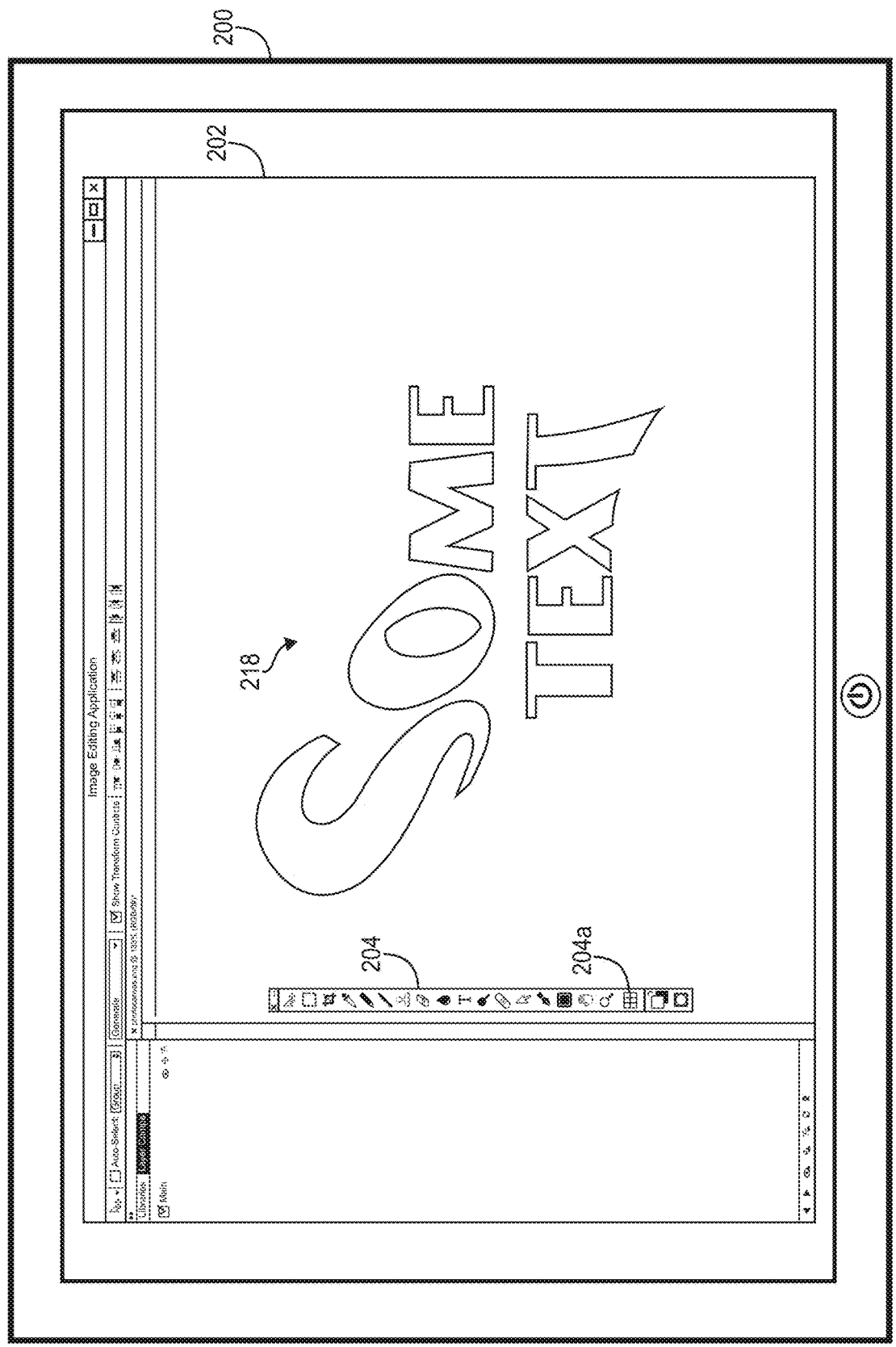
Figure 2F:
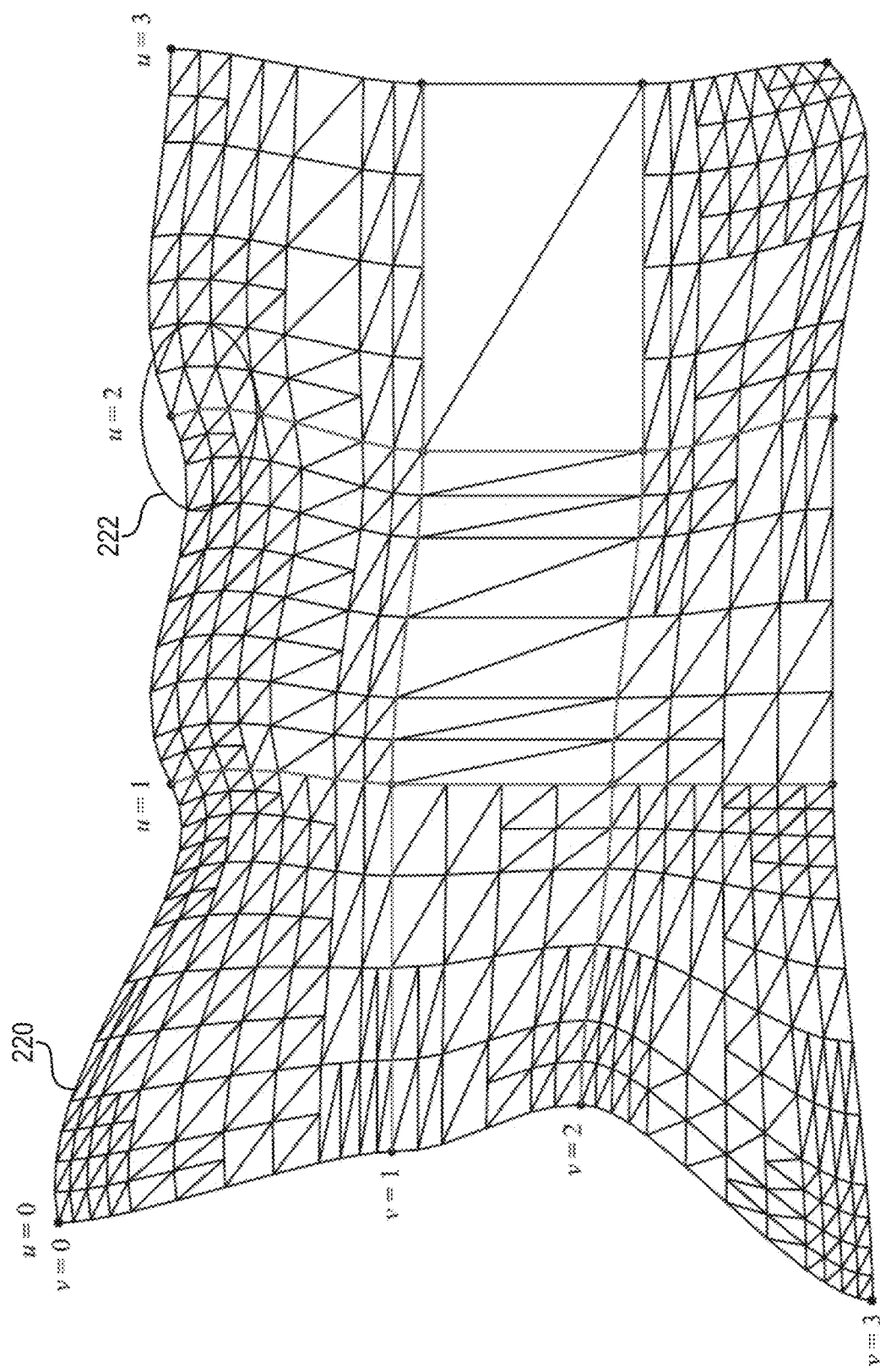
Figure 2G:
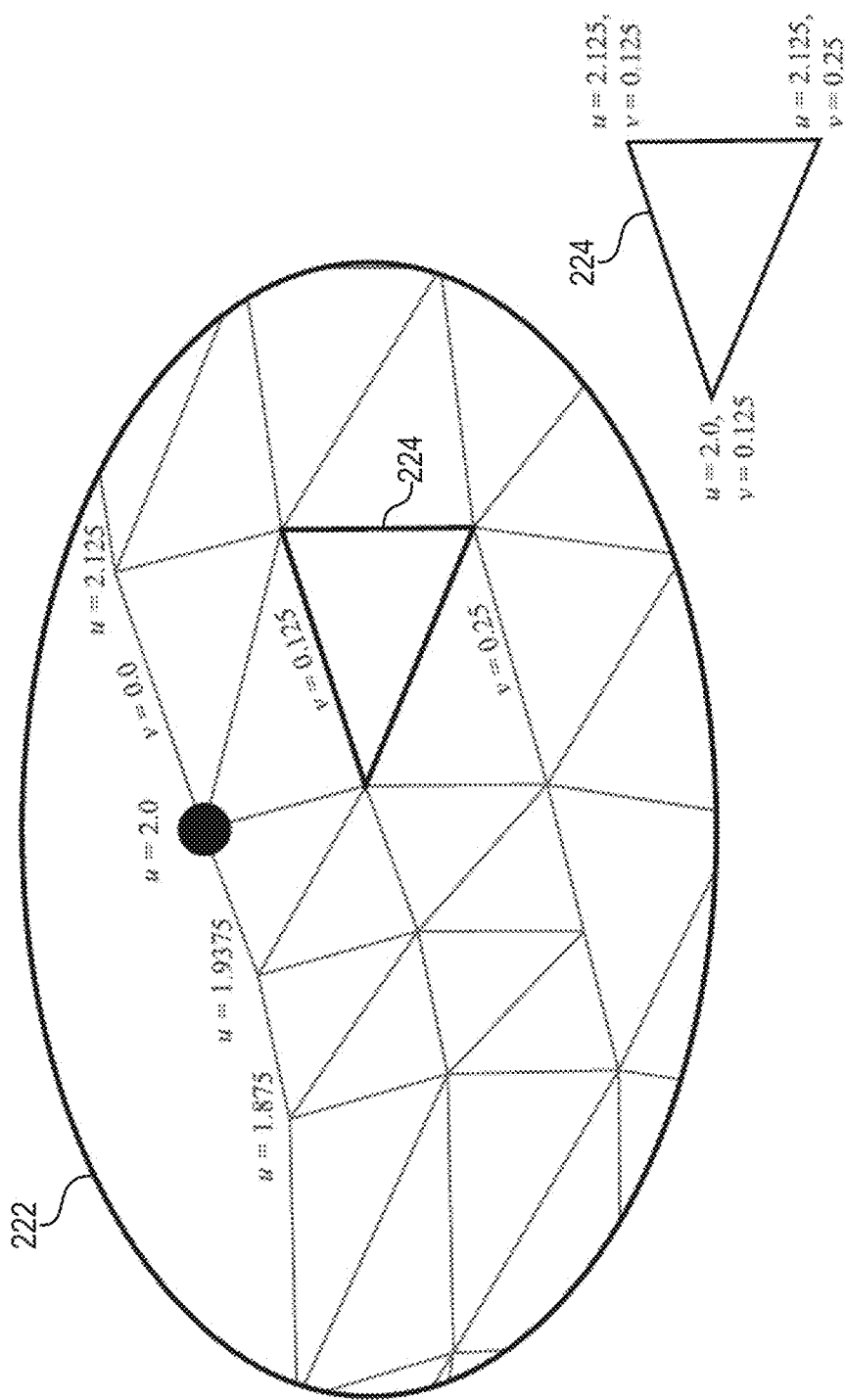

As mentioned, FIGS. 2A-2G illustrate diagrams for performing a deformation operation on a raster image within a client application. Specifically, FIGS. 2A-2C and 2E illustrate embodiments of a graphical user interface within a client application displayed on a client device. FIG. 2D illustrates an embodiment of a plurality of image portions corresponding to the raster image. FIGS. 2F-2G illustrate a process for subdividing raster images for a deformation process. The accompanying description includes additional details associated with the various operations in the process described in FIG. 1.

As shown, FIG. 2A includes a client device 200 on which a client application 202 runs. For instance, the client application 202 can be an image editing application that allows a user to edit digital images or other digital content using a plurality of tools 204. In one or more embodiments, the tools 204 include a "quilt warp" tool that allows the user to perform the deformation processes described above in FIG. 1. Alternatively, the quilt warp tool can be included in a menu or other area of the client application 202.

In any case, in response to the user selecting the quilt warp tool, the content editing system allows the user to select a region of digital content to deform. To illustrate, the user selects to deform a digital image 206 displayed within the user interface of the client application 202. As illustrated in FIG. 2A, the digital image 206 includes digital text displayed on a plurality of lines. While the digital image 206 includes text, it is understood that a digital image can include any digital image content as previously described. The quilt warp tool thus causes the content editing system to perform a deformation operation that the user can apply to any type of digital image content.

Once the user has selected the quilt warp tool and designated the region of the digital image 206 that the user wants to deform, the content editing system analyzes the region of the digital image 206 to determine a plurality of Bezier patches within a Bezier quilt associated with the digital image 206. In particular, the content editing system first determines the order (or degree) of the Bezier patches in the Bezier quilt (i.e., how many control points each Bezier patch will have). For instance, the content editing system can determine the degree or order of the Bezier patches based on a default setting or a user preference/setting indicating the order of Bezier patches. The user can thus specify the amount of fine-grained control when deforming the digital image by increasing or decreasing the number of control points in each Bezier patch.

Furthermore, the content editing system determines the number of Bezier patches to include in the Bezier quilt. The number of Bezier patches included in the Bezier quilt may also be based on a default setting or a user preference/setting indicating the number of Bezier patches. The number of patches in the Bezier quilt also affects the amount of control the user has over the deformation process. More specifically, a greater number of Bezier patches also changes the total number of control points across the entire Bezier quilt without changing the number of control points within each separate Bezier quilt.

In the embodiment of FIG. 2B, the content editing system generates four Bezier patches for the digital image 206. Specifically, the content editing system generates two rows of two Bezier patches 208a-208d. As illustrated, each of the Bezier patches 208a-208d is adjacent to at least two other Bezier patches. For instance, a first Bezier patch 208a is adjacent to a second Bezier patch 208b and a third Bezier patch 208d. Similarly, the second Bezier patch 208b is adjacent to the first Bezier patch 208a and a fourth Bezier patch 208d.

Each of the Bezier patches 208a-208d in FIG. 2B is a bicubic Bezier patch with 16 control points. Because each of the Bezier patches 208a-208d is adjacent to other Bezier patches within the Bezier quilt, the Bezier patches include a number of coincident control points. For example, a first control point 210 is a coincident control point that corresponds to the first Bezier patch 208a and the second Bezier patch 208b. Changing a position of the first control point 210 changes a shape of the first Bezier patch 208a and the second Bezier patch 208b. In contrast, a second control point 212 corresponds to only the first Bezier patch 208a, and thus modifies only the first Bezier patch 208a.

In one or more embodiments, the content editing system generates the Bezier patches 208a-208d by treating the cumulative set of control points from the Bezier patches 208a-208d as a single parametric quilt (i.e., the Bezier quilt). Additionally, redundant points at the edges are automatically tied together as coincident control points. The content editing system converts quilt control point indices i,j into respective patch indices of a M×N sized quilt of patches using:

$$i_q = \min\left(\frac{i}{k_v}, M - 1\right)$$

$$u_q = \min\left(\frac{j}{k_u}, N - 1\right)$$

$$i_p = i - i_q k_v$$

$$j_p = j - j_q k_u$$

where the parameters of the patch are u and v, where (in parameter space) u extends across the patch and v extends down. Additionally, the indices $i_q j_q$ identify the patch within the quilt, and $i_p j_p$ identify the control point within the patch. The values $k_u, k_v$ refer to the degree (order-1) in u and v of the individual patches. Also note that M and N refer to the number of patches within the quilt.

Once the content editing system has generated the Bezier patches 208a-208d, the content editing system divides the digital image 206 into a plurality of portions 214a-214d, illustrated in FIG. 2C. In particular, the portions 214a-214d correspond to the Bezier patches 208a-208d. The content editing system divides the digital image 206 to create the portions 214a-214d such that a Bezier patch corresponds to a specific image portion. To illustrate, the first Bezier patch 208a shown in FIG. 2B corresponds to a first portion 214a shown in FIG. 2C. Additionally, while FIG. 2C illustrates visual separation between the portions 214a-214d, the visual separation is for illustration purposes.

As mentioned, in one or more embodiments, the content editing system distorts raster images and/or vector images according to user interaction with control points. For example, the content editing system can determine a plurality of different image portions contained within a digital image and then apply distortions to each image portion. For example, in one or more embodiments, the content editing system utilizes the approaches described in U.S. Pat. No. 7,385,612, which describes methods for deforming and/or distorting portions of raster images and/or vector images, and is incorporated by reference herein in its entirety. Additional detail is provided below with respect to FIGS. 2F and 2G.

After generating the Bezier patches 208a-208d and dividing the digital image 206 into a plurality of portions 214a-214d, the content editing system allows the user to modify the Bezier patches 208a-208d using the control points in each patch. For example, FIG. 2D illustrates that the user has modified the first Bezier patch 208a by changing the position of a plurality of control points corresponding to the first Bezier patch 208a.

As previously described, the control points for each Bezier patch directly modify only the corresponding Bezier patch (with the exception of coincident control points, as described later in connection with FIG. 3). Specifically, adjusting the control point 212 at the upper-left corner of the digital image 206 modifies only the first Bezier patch 208a directly. Similarly, adjusting non-coincident control points in the first Bezier patch 208a also only modify the first Bezier patch 208a. Thus, for a bicubic Bezier patch that is adjacent to two other patches as shown in FIG. 2D, the user can change the position (or translation) associated with up to 9 control points without modifying other Bezier patches. In one or more additional embodiments, however, adjusting control points in a given Bezier patch indirectly modifies other Bezier patches by causing the content editing system to modify control points in the other Bezier patch to maintain parametric continuity.

Moreover, the content editing system allows the user to adjust a rotation of a control point to further modify the Bezier patch. Specifically, similar to an individual Bezier curve, a control point can include rotation handles for each dimension of the Bezier patch to allow the user to change a rotation of the control point. To illustrate, the control point 212 includes a first set of handles 216a for the x dimension and a second set of handles 216b for they dimension. Each set of handles allows the user to adjust a rotation of a control point in addition to tangent information associated with the control point. Changing the position and length of the handles can thus change a curve vector (i.e., direction and strength) applied to a Bezier curve associated with the control point at the control point location.

After, or in connection with, a change applied to a Bezier patch using a control point, the content editing system modifies a corresponding portion of the digital image. In particular, the content editing system uses the changes made to the Bezier patch to determine a Bezier deformation of the corresponding image portion. The content editing system applies the deformation to the image portion in real-time, within a preview window, or after the user has selected to apply the Bezier deformation to the image. As shown in FIG. 2D, the content editing system updates the portion 214a corresponding to the first Bezier patch 208a based on the modifications to the first Bezier patch 208a.

As mentioned, in one or more embodiments the content editing system deforms an image portion by using contour information associated with a Bezier patch governed by corresponding control points. Specifically, the content editing system uses relocation information for control points to determine how to deform the image portion based on predefined intended behaviors of canonical locations of the control points. In one or more embodiments, the content editing system utilizes the approaches described in U.S. Pat. No. 6,911,980, which describes methods for deforming digital content using Bezier patches (referred to as "Bezier shapes"), and which is incorporated by reference herein in its entirety.

Moreover, FIG. 2D illustrates users can modify the other Bezier patches. Specifically, FIG. 2D illustrates that the user has modified several control points corresponding to the fourth Bezier patch 208d. Furthermore, the user has left the second Bezier patch 208b and the third Bezier patch 208c unaltered by leaving the corresponding control points in default positions (and with default rotation information).

When the content editing system has determined the deformations for one or more of the portions of a digital image, then recombines the portions into a single image. The method of recombining the image portions may depend on the method used to divide the portions. To illustrate, if the content editing system partitions the image into logical portions stored within memory, the content editing system can recombine the portions back into a single image within memory and remove the pointers to the separate image portions. Alternatively, if the content editing system partitions the image into separate temporary files, the content editing system can recombine the separate files into a single image file.

In any case, the content editing system recombines the image portions to create a single digital image containing any deformations based on any modified Bezier patches during the deformation operation. FIG. 2E illustrates a modified digital image 218 including all of the deformations based on the modified Bezier patches shown in FIG. 2D. Thus, the content editing system generates the modified digital image 218 and displays the modified digital image 218 on a display device of the client device 200. The user can then store, share, or continue to edit the modified digital image 218 within the client application 202.

As previously mentioned, and as described in more detail in U.S. Pat. No. 7,385,612, the content editing system partitions a raster image for deformation by subdividing the raster image into a plurality of triangular "shards." In particular, based on the Bezier patches within the Bezier quilt, the content editing system maps a parameter range (described with u and v coordinates) to a portion of the raster image on which a deformation is performed. For a single bicubic Bezier patch, the u, v parameters range from 0 to 1, but for a larger patch (e.g., a quilt including a plurality of patches), the range may be determined by the number of patches in each direction. Accordingly, each column increases the u range by one, and each row increases the v range by one. FIG. 2F illustrates an embodiment of a subdivided quilt 220 of Bezier patches.

As shown in FIG. 2F, the content editing system subdivides each patch independently. Specifically, based on the locations of the Bezier patches relative to the digital image, the content editing system recursively splits each patch in half parametrically until the edges of the subdivided portion are sufficiently straight and free from twist. Once a subdivided portion of a patch meets these criteria, the content editing system can then represent the subdivided portion by two triangles.

FIG. 2G illustrates a section 222 of the subdivided quilt 220 of Bezier patches. In particular, FIG. 2G illustrates how the subdivided parameter values map to corners of each triangle, as shown with triangle 224. As the subdivision operation progresses, the content editing system records the parametric coordinates of each subdivided portion of the patch. When the subdivided patch section is straight enough to render (e.g., meets a tolerance value or threshold), the content editing system assigns each corner of the resulting triangle the corresponding parameter values. Furthermore, when rendering the triangle, the content editing system maps the u, v coordinates assigned to the triangle vertices to the raster coordinates by simple linear scaling. To illustrate, for an image of 500×300 pixels, the u, v coordinates of [2.0, 0.125] translate to pixel coordinates of [333.3, 12.5]. The mapping may be optionally offset or scaled to include a subset or portion of the raster image.

Additionally, when rendering each triangle, the content editing system fetches the pixels from the source image using the previously generated mapping. The content editing system then linearly interpolates the pixels when rendering the triangle, such as by using texture mapping techniques. The content editing system can thus recombine the image portions by reconstructing the image from the subdivided triangles.

Figure 3A:
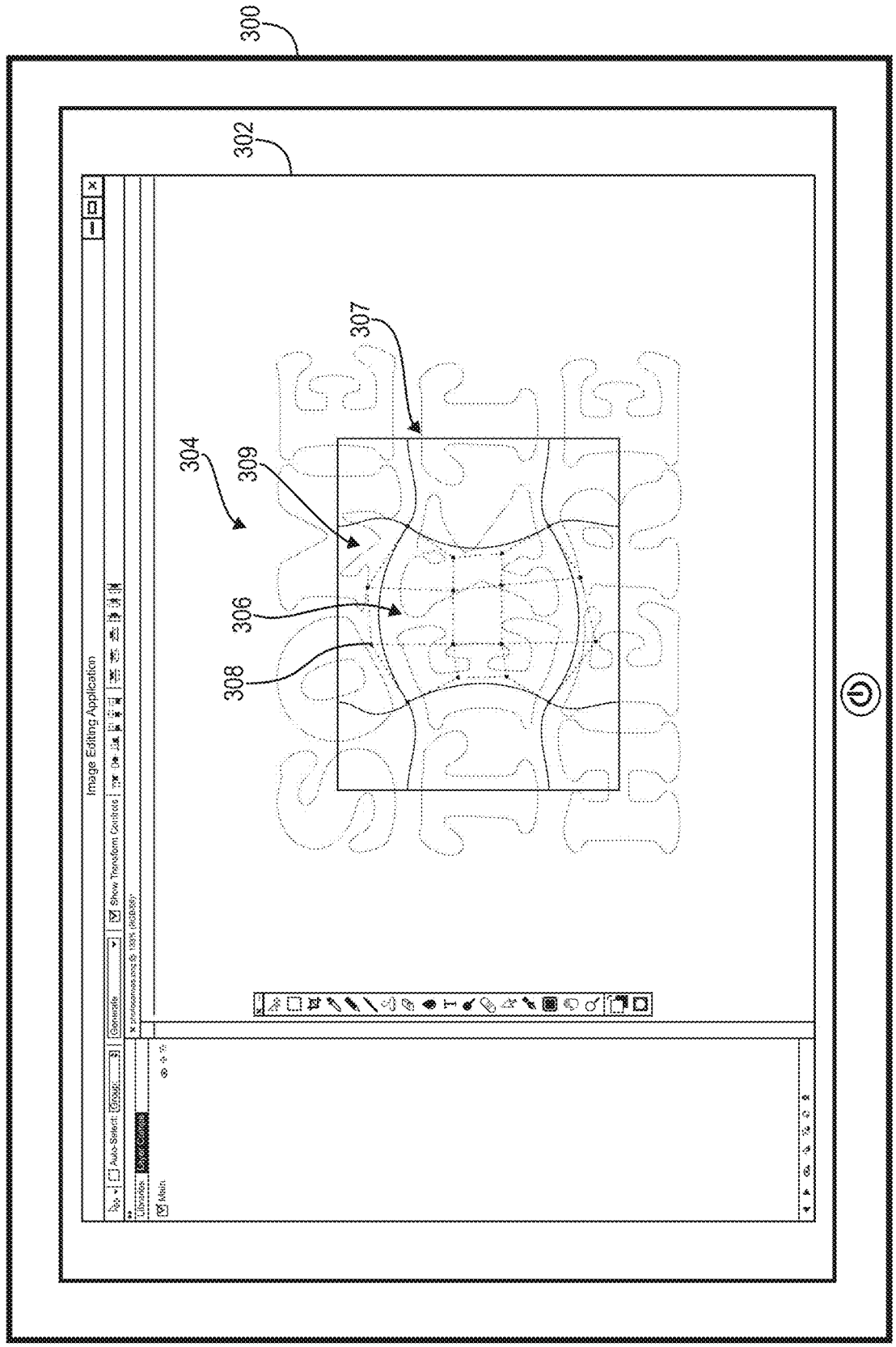
FIG. 3A illustrates a diagram for a Bezier patch of a plurality of Bezier patches for a digital image in accordance with one or more implementations.
Figure 3B:
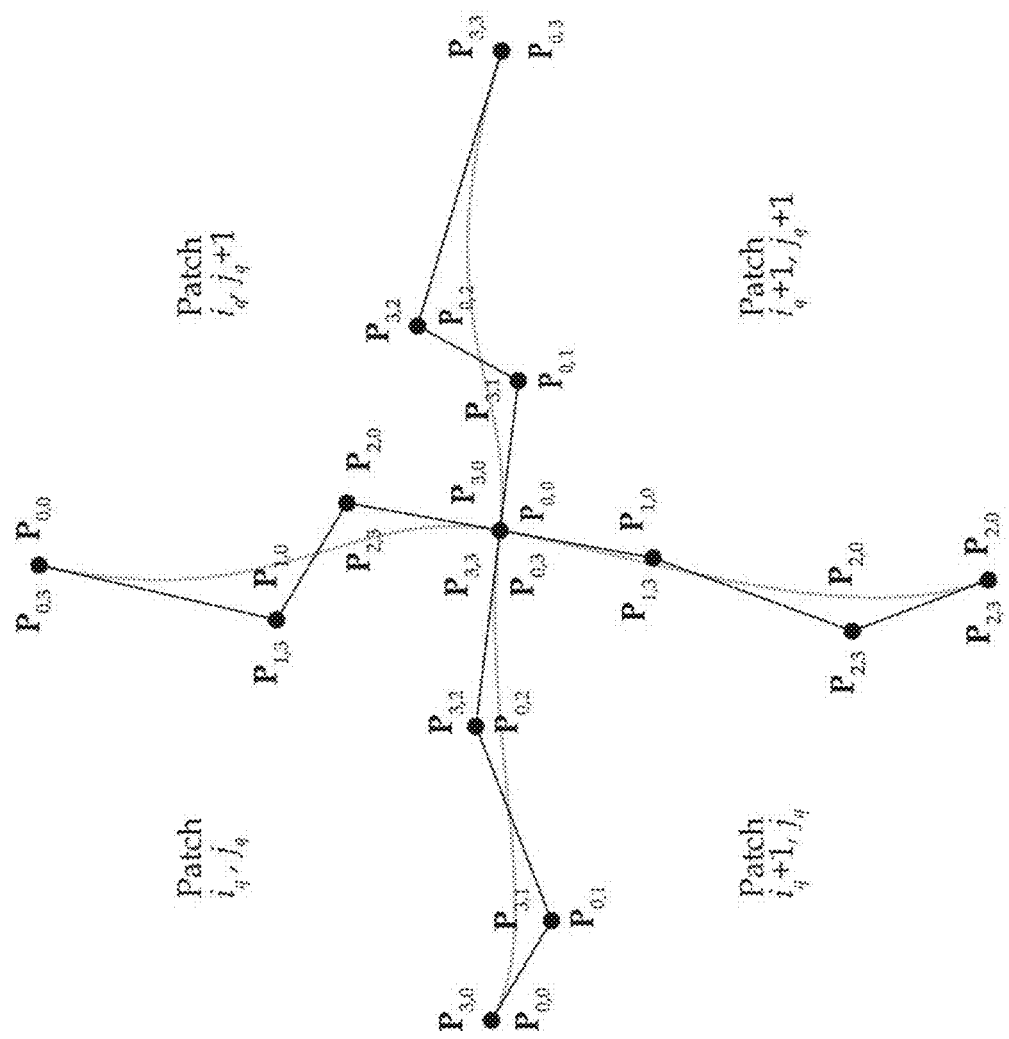
FIG. 3B illustrates a diagram for a plurality of control points in a plurality of Bezier patches in accordance with one or more implementations.

As mentioned above, the content editing system allows a user to modify a plurality of Bezier patches within a Bezier quilt, including coincident control points at the edges or corners of more than one Bezier patch. FIGS. 3A-3B illustrate an embodiment of modifying Bezier patches by interacting with coincident control points. Specifically, FIG. 3A illustrates a graphical user interface for modifying Bezier patches in a Bezier quilt. FIG. 3B illustrates a diagram representing a plurality of coincident control points for a plurality of Bezier patches.

FIG. 3A illustrates a client device 300 that includes a client application 302 that allows a user to deform a digital image 304. As shown, a Bezier patch 306 in the center of a Bezier quilt[307] of nine (i.e., 3×3) Bezier patches, which is in the center of the digital image 304. The Bezier patch 306 is a bicubic patch that includes a set of 16 control points that allow a user to modify a plurality of Bezier curves associated with the Bezier patch 306.

FIG. 3A illustrates Bezier curves at the edges of the Bezier patch 306, the Bezier curves corresponding to the edges of the Bezier patch 306, as well as Bezier curves corresponding to edges of adjacent Bezier patches. The Bezier curves are shown to illustrate the effect of the control points on the Bezier patches, and thus, on the deformation applied to the corresponding image portions. By modifying a translation of the control points of the Bezier patch 306, the user can cause the content editing system to deform the portion of the image corresponding to the Bezier patch 306.

Additionally, and as previously described, modifying control points at the edges of the Bezier patch 306 (i.e., coincident control points) also causes the content editing system to modify the corresponding control points in the other Bezier patches. To illustrate, modifying control point 308 at the upper edge of the Bezier patch 306 causes the content editing system to modify a Bezier patch 309 above the Bezier patch 306. The content editing system also deforms the portion of the digital image 304 corresponding to the Bezier patch 309 in accordance with the modified control point 308. Similarly, modifying control points at the corners of the Bezier patch 306 causes the content editing system to modify the corresponding control points for each of the other Bezier patches adjacent to the Bezier patch 306.

FIG. 3B illustrates that the content editing system can also modify control points in adjacent Bezier patches to maintain parametric continuity of Bezier curves for the corresponding patches. Specifically, maintaining parametric continuity can prevent the modifications from introducing breaks or non-smooth transitions into the Bezier curves based on modified control points. For instance, in order to maintain C0 parametric continuity between two adjacent Bezier patches, the content management system can determine that a modified control point is coincident and then move corresponding coincident control points with the modified control point.

Specifically, as previously mentioned, $i_p, j_p$ identify the control point within a patch. A point is on a patch edge if $i_p$ or $j_p$ are zero or $k_v$, $k_u$ (respectively). Unless the point falls on the edge of the quilt, a control point at the patch edge is coincident, and the content editing system also edits the opposing control point in the adjoining patch in conjunction with the control point. Likewise, if a control point at the corner of the patch's array of points is changed, the content editing system edits the opposing points in the surrounding three patches (if applicable) to maintain C0 continuity and prevent breaks in the curves.

The content editing system can apply similar constraints to preserve C1 continuity of curves spanning more than one Bezier patch (e.g., the curves illustrated in FIG. 3A). C1 continuity preserves the first derivative (or slope) of a curve, preventing the deformation patches from introducing sharp corners or creases where the curves cross patch boundaries. To maintain C1 continuity, the content editing system can modify control points of adjoining patches so that adjacent points that were originally collinear remain collinear. In particular, if the user modifies a control point within a Bezier patch, the modification may also cause the content editing system to change an adjacent control point automatically to maintain C1 continuity. If the adjacent control point is at an edge of the Bezier patch, the content editing system also changes the corresponding coincident control point of the adjacent Bezier patch to maintain parametric continuity.

To illustrate, moving point $P_{3,2}$ of patch $i_q, j_q$ can cause the content editing system to modify point $P_{3,3}$ of patch $i_q$, $j_q$. Because the content editing system moved point $P_{3,3}$, and because point $P_{3,3}$ is coincident with points from three adjacent patches (patch $i_q$, $j_{q+1}$, patch $i_{q+1}$, $j_q$, patch $i_{q+1}, j_{q+1}$), the content editing system also moves the corresponding points (point $P_{3,0}$, point $P_{0,3}$, point $P_{0,0}$), respectively. The content editing system can thus maintain parametric continuity within each Bezier patch, as well as across multiple Bezier patches. The content editing system can also maintain any class of parametric continuity as specified in the deformation operation.

Figure 4:
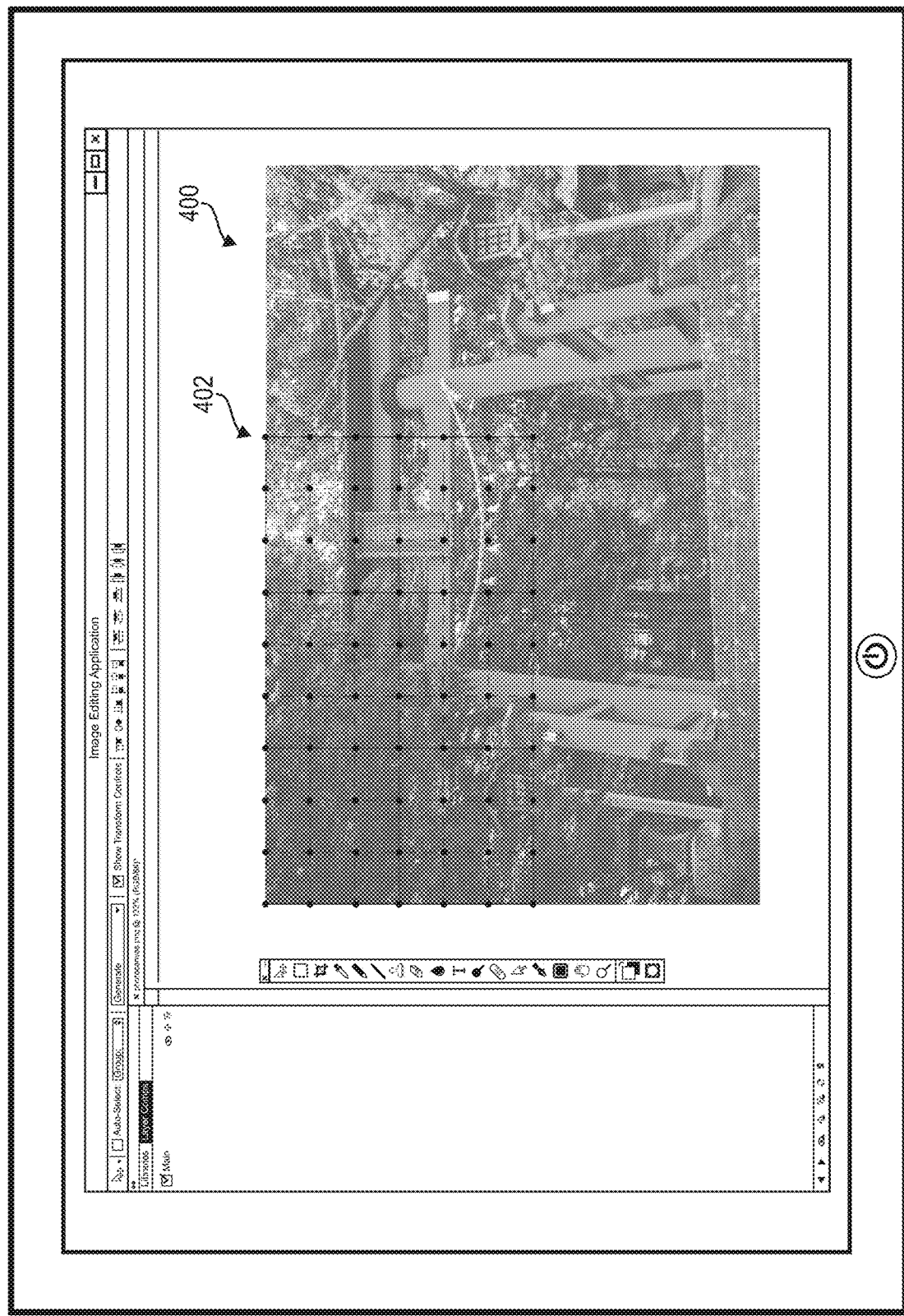
FIG. 4 illustrates a diagram of a plurality of Bezier patches for deforming a portion of a digital image in accordance with one or more implementations.

In addition to allowing a user to perform a deformation operation across an entire image using a plurality of Bezier patches, the content editing system allows a user to perform a deformation operation across a portion of an image (e.g., less than all of the image). For example, FIG. 4 illustrates a deformation operation on only a portion of a digital image 400. In particular, a Bezier quilt 402 for the deformation operation encompasses a portion of the digital image 400 as indicated based on a user input. The user input may include the use of a selection tool prior to selecting the quilt warp tool. Alternatively, the quilt warp tool itself allows the user to select either the entire image or specify only a portion of an image.

In one or more embodiments, in response to a request to deform a portion of the digital image 400, the content editing system separates the indicated portion from the rest of the digital image 400. The content editing system then divides the indicated portion into a plurality of portions based on Bezier patches in a Bezier quilt for the indicated portion. Additionally, after the user has modified one or more of the Bezier patches, the content editing system deforms the corresponding portions, recombines the portions together, and then recombines the indicated portion (with the deformations) with the rest of the digital image 400. Thus, the content editing system allows a user to perform a deformation operation for only a selected portion of an image.

As described in relation to FIG. 1, and the more detailed descriptions above in relation to FIGS. 2A-2E, 3, and 4, the content editing system performs operations for deforming digital images. The operations allow the digital editing system to use a piecewise deformation process with a plurality of individually modifiable Bezier patches within a Bezier quilt. Accordingly, the acts and operations illustrated and described above in relation to FIG. 1 (e.g., act 104), and the associated descriptions in FIGS. 2A-2E, 3, and 4, provide the corresponding structure for an example step for modifying the digital image utilizing a parametric quilt comprising a plurality of parametric patches.

Figure 5:
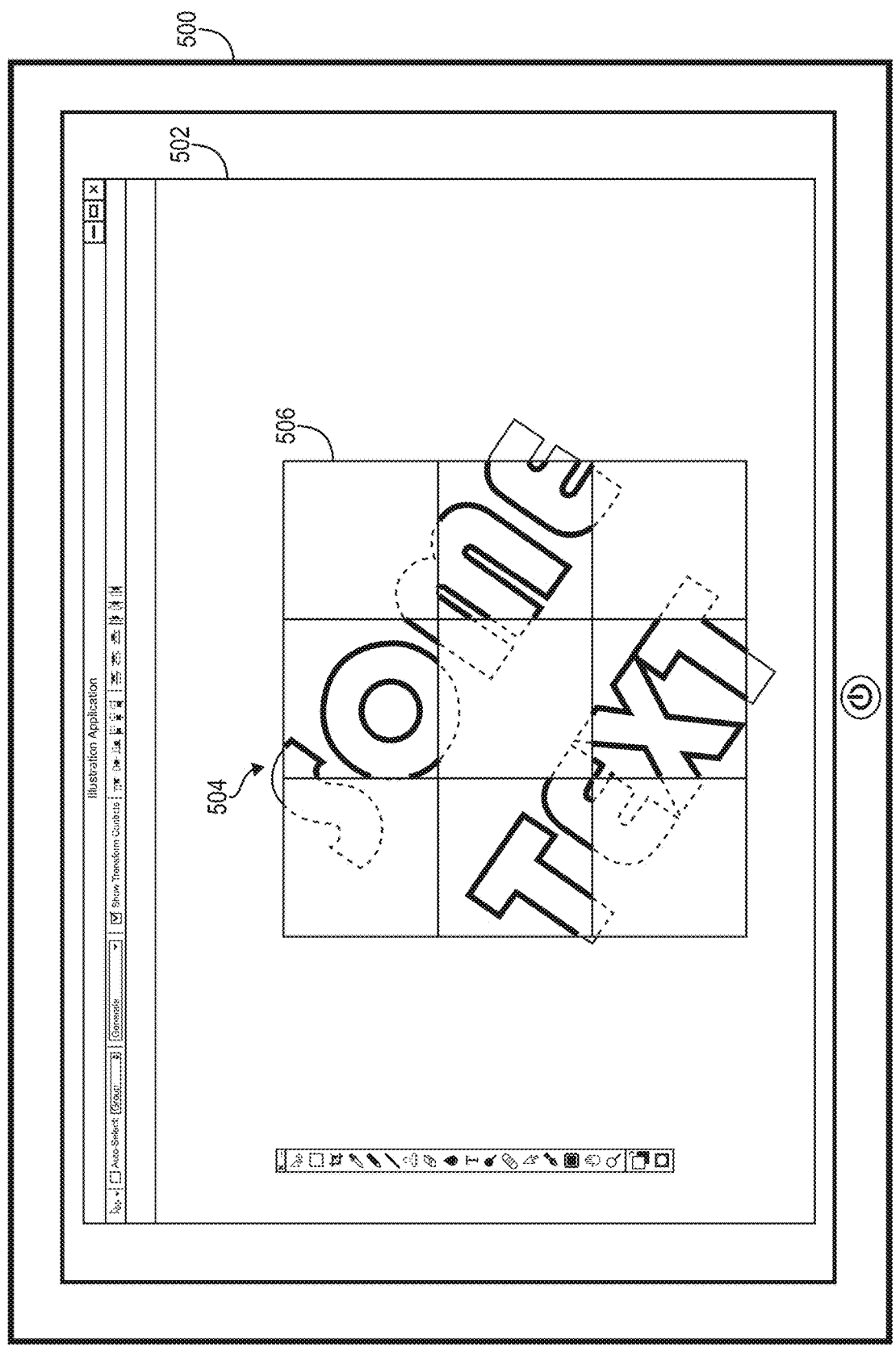
FIG. 5 illustrates a diagram of a plurality of Bezier patches for a vector digital image in accordance with one or more implementations.

As previously mentioned, the content editing system also performs piecewise deformation on vector images. FIG. 5 and FIGS. 6A-6D illustrate embodiments of a piecewise deformation operation for vector images. Specifically, FIG. 5 illustrates a graphical user interface for performing piecewise deformation of a vector image. FIGS. 6A-6D illustrate diagrams with additional details for performing piecewise deformation of vector drawings.

FIG. 5 illustrates a client device 500 on which a client application 502 runs for creating, viewing, and editing vector images. In particular, FIG. 5 illustrates a piecewise deformation operation for a vector image 504. As with a raster image, in response to a request to perform a deformation operation on the vector image 504 (e.g., based on user selection of a quilt warp tool), the content editing system can cause the client application 502 to generate a plurality of Bezier patches within a Bezier quilt 506 corresponding to at least a portion of the vector image 504.

As illustrated, the content editing system generates a plurality of Bezier patches for the indicated portion of the vector image 504. Furthermore, the content editing system divides the vector image 504 into portions according to the Bezier patches. The client application 502 then allows the user to modify one or more of the Bezier patches using separate sets of control points for the Bezier patches (e.g., see FIG. 2D). Based on the modified Bezier patches, the content editing system deforms the corresponding portions of the vector image 504 and recombines the portions back together to create a modified vector image. FIGS. 6A-6D and the accompanying description provide additional detail for deforming separate portions of a vector image.

A vector image uses mathematical equations to represent edges within a digital image (instead of a grid of pixels, as in a raster image). A given vector path includes information defining the (x, y) position of the path (e.g., the beginning of the path) and the direction of the path, including any curves. A vector path can also include values for stroke color, shape, thickness, and fill. Because vector images correspond to mathematical representations that define the position and direction of vector paths within the vector images, the content editing system determines the positions of vector segments relative to Bezier patches using the mathematical representations. In particular, the content editing system can determine slice arrays within a Bezier quilt and identify zero crossing points of paths corresponding to the slice arrays.

Specifically, for a given Bezier quilt containing a plurality of Bezier patches, the content editing system first collects two separate arrays of coordinates (in the x and y directions) on which to split or partition a vector image. The arrays of coordinates to split the vector image include the edges of the Bezier quilt and the internal boundaries of the Bezier patches. For example, in the 3×3 Bezier quilt of FIG. 5, the content editing system determines four slice coordinates in each of the x and y directions (one coordinate for each vertical patch boundary line and one coordinate for each horizontal patch boundary line). In one or more embodiments, the content editing system sorts the arrays by increasing values.

For each segment within a given vector path, the content editing system determines a bounding box. Specifically, the bounding box is a tight bounding box determined by computing inflection points of the Bezier curve and not just the bounds of the control points. If the segment is within the bounds described by the slice arrays, and for each value in the x coordinates, the content editing system records any location where the segment crosses a given x coordinate in the slice array. Similarly, the content editing system records any location where a segment crosses a given y coordinate corresponding to the slice array.

To illustrate, FIG. 6A shows a diagram for analyzing a vector segment 600 (i.e., a particular curve within a vector path of a vector image) to determine zero-crossing points 602a-602c. For example, to find where a segment crosses a particular x coordinate of a patch boundary, the content editing system subtracts the x coordinate of the patch boundary from the x coordinates of the segment's control points 604a-604d. This allows the content editing system to determine the crossing locations for a given slice coordinate based on the zero-crossings or root finding for the vector segment 600. If the x values for all of the control points of the segment 600 have the same sign (i.e., the x-coordinates are either all greater than or less than the x-coordinate of a patch boundary), there are no zero-crossing points, and the content editing system performs no division of the segment and skips any subsequent tests for that x value. Otherwise, the content editing system employs a root-finding algorithm to find the exact parameter(s) where the segment crosses zero (e.g., using Cardano's cubic formula with no approximation such that the solution is closed form with no approximation methods required). For a cubic Bezier segment, for instance, the content editing system may identify up to three roots, corresponding to up to three zero crossing points.

Once the content editing system finds the roots, it evaluates the segment 600 at the parameters indicated by the roots. The content editing system also checks the y coordinate against the overall bounds of the partition to ensure that the segment 600 is relevant (i.e., contained within the Bezier quilt). If the roots are valid, the content editing system records the parametric values associated with the roots by storing the parametric values as a segment index (an integer value) added to the parameter where the segment 600 crosses.

After determining the crossing points in the x and y directions for a path, the content editing system finds a parametric value for every location that the path crosses the set of x and y slice coordinates. The content editing system also sorts these parametric values by increasing value so that the values progress along the curve. As described in more detail below, this allows the content editing system to deform the corresponding portions and recombine the portions after deformation.

Additionally, the content editing system can store each piece of a sliced vector path in a data structure (e.g., a list of path slices). The structure contains: 1) the section of the path contained within the bounds of two x and two y slice coordinates (e.g., within a given Bezier patch); 2) the location (row and column) of the path section within the grid of slice coordinates (e.g., in FIG. 5, the letter "O" is mostly within location (0,1) and the letter "X" is mostly within (2,1)); and 3) the parameter value where the segment begins (in the original path).

For each of the parameters on the path corresponding to crossing locations at the slice coordinates, the content editing system splits the path at the parameter. To split the path, the content editing system splits a segment (indexed by the integer value of the parameter) into two identical pieces (e.g., using De Casteljau's algorithm) at the location within the segment, specified by the fractional portion of the parameter, t. For example, FIG. 6B illustrates a diagram for splitting a vector path segment 606 including a cubic Bezier curve. Additionally, the following relationships correspond to the labels of FIG. 6B, where Lerp refers to a linear interpolation function:

$Lerp(t,A,B)=(1-t)A+tB$ $L_0=V_0$ $M=Lerp(t,V_1,V_2)$ $L_1=Lerp(t,V_0,V_1)$ $L_2=Lerp(t,L_1,M)$ $R_2=Lerp(t,V_2,V_3)$ $R_1=Lerp(t,M,R_2)$ $L_3=Lerp(t,L_2,R_1)$ $R_0=L_3$ $R_3=V_3$ Additionally, $V_{0\ldots3}$ are the original cubic Bezier control points, and $L_{0\ldots3}$ and $R_{0\ldots3}$ are the control points for the new split segments matching the original. The two segments meet at $L_3$, $R_0$.

After the content editing system has split the path at a given parameter value, the content editing system checks a point on the path section against the grid of slice coordinates to determine where the point falls in the quilt (i.e., the row and column of the patch). The content editing system adds this information to the list of path slices. Furthermore, if a curve segment is sliced in two places (i.e., two slice parameters have the same integer segment number), the content editing system re-adjusts the parameter after slicing the first segment away, as the remaining segment's range is now from 0 to 1 (e.g., within (0,0) and (0,1) of the quilt).

If the content editing system finds no parameters while searching for slice parameters, this indicates that the path is either completely contained within a rectangle defined by the x and y slice coordinates (e.g., a single Bezier patch), or the path is completely outside their bounds. If the path is completely outside, the content editing system does not perform any further processing. If the path is completely inside, the content editing system uses a point on the curve to identify the location of the path within the grid and creates a single path slice, with the parameter set to a value of 0.

Figure 6C:
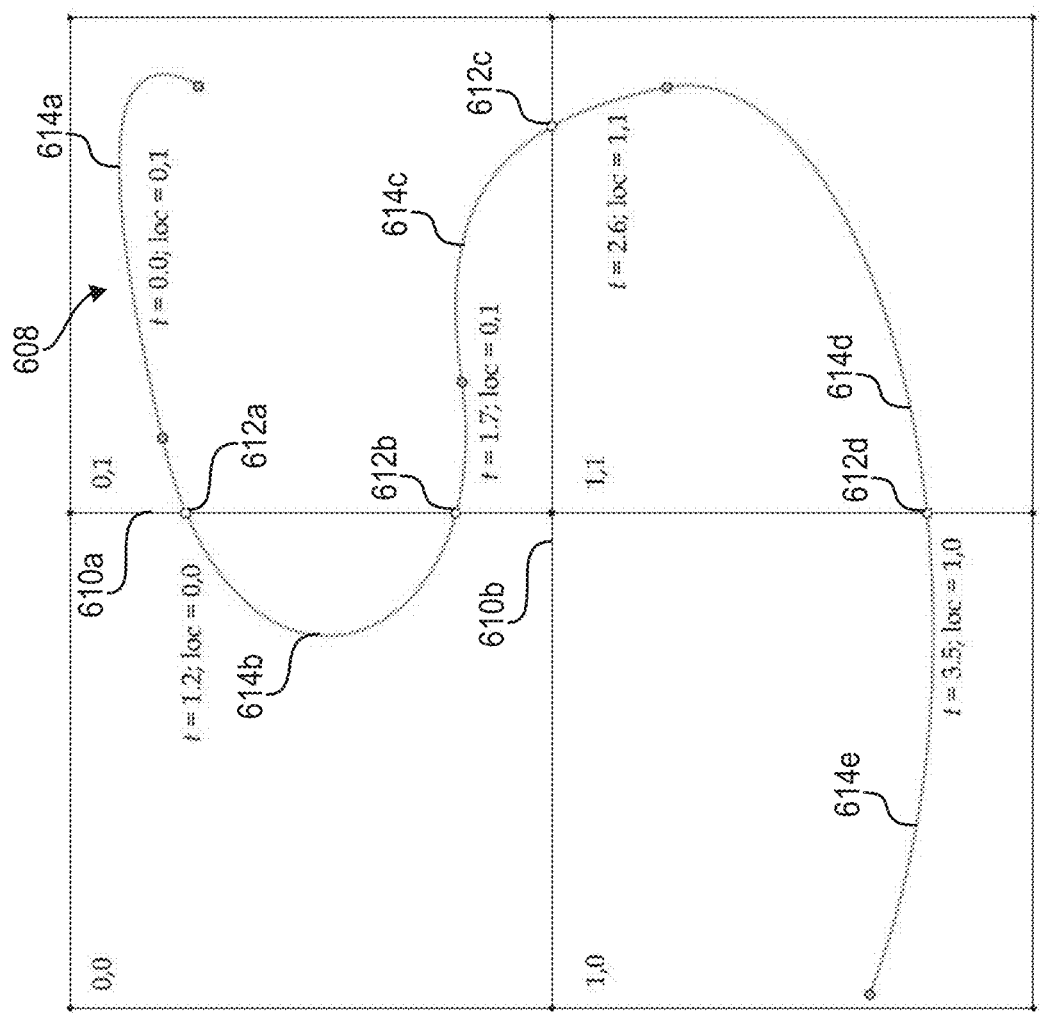

FIG. 6C illustrates an embodiment in which a path 608 crosses a plurality of slice coordinates 610a-610b in the x and y directions. In particular, the content editing system determines a plurality of zero-crossing points 612a-612d of the path 608 across the slice coordinates 610a-610b. For example, the content editing system determines the zero-crossing points 612a-612d using the process described in FIG. 6A.

After determining the zero-crossing points 612a-612d, the content editing system also determines one or more path slices 614a-614e from the path 608 for including in the list of path slices. Specifically, the content editing system determines separate patch indices (i.e., the row and column of the patch, (0,0), (0,1), (1,0), (1,1) in a 2×2 grid) corresponding to the path slices 614a-614e based on the slice coordinates 610a-610b. The list of path slices includes the path slices 614a-614e and a row/column of the coordinate region in which each path slice is contained, which indicates a Bezier patch that controls a deformation of the corresponding region.

Figure 6D:
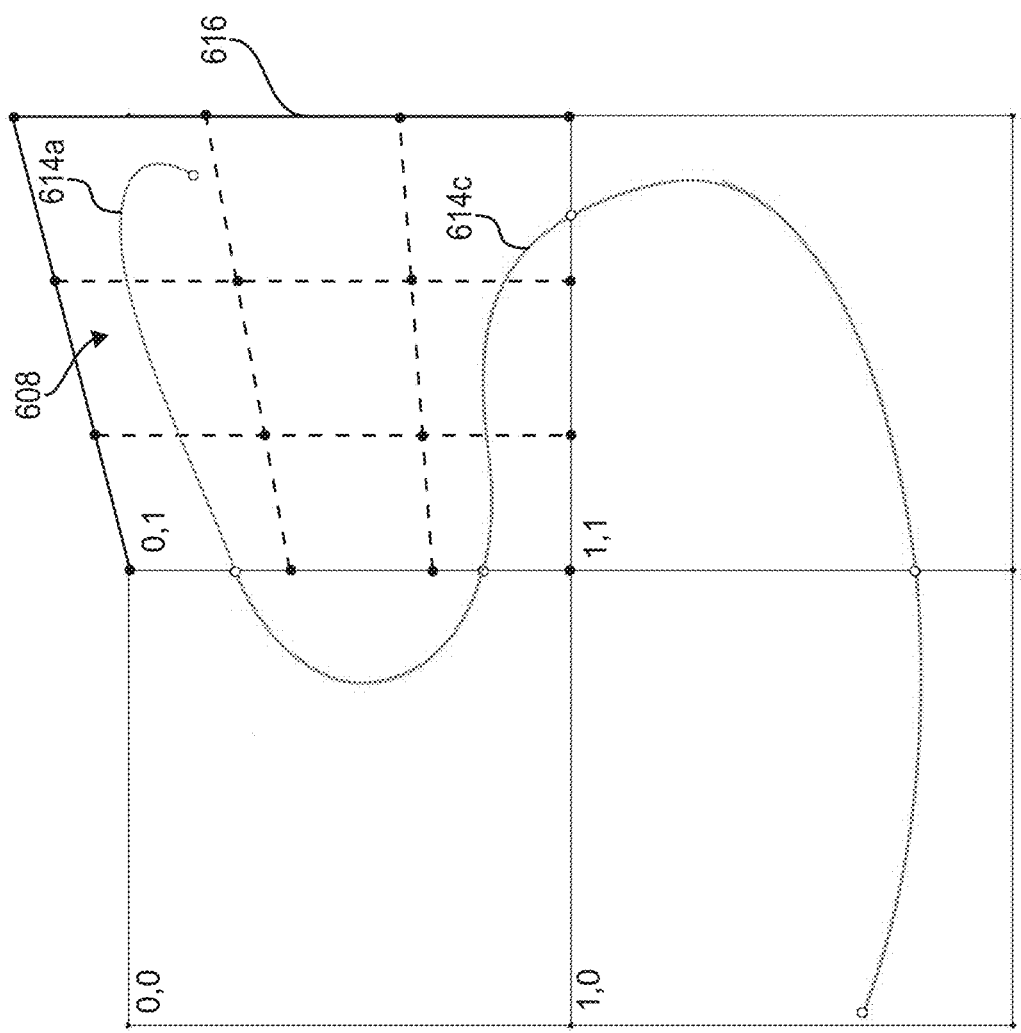

Using these row/column values, the content editing system can deform (or render, etc.) a given slice and update the path according to the deformation of the slice. For instance, FIG. 6D illustrates a deformation of the region at (0,1) based on a modified Bezier patch 616 corresponding to the region. To illustrate, in response to detecting that a user modifies the Bezier patch 616, the content editing system deforms the path slices 614a, 614c contained within the region according to the modified Bezier patch 616. Additionally, because the content editing system has identified the path slices within the region, the content editing system can deform the path slices without deforming any other path slices that are outside the region, with the exception of maintaining parametric continuity.

After processing the path slices by deforming any path slices based on corresponding Bezier patches, the content editing system recombines the path slices base into a single path. In particular, the content editing system "un-splits" the previously divided path slices by reversing the above-described path slice procedure. For example, in relation to FIG. 6B, the content editing system determines that the control points $L_{0...3}$ are from the last curve segment in a path slice and $R_{0...3}$ are from the first curve segment of the subsequent path slice.

To determine whether two slices are close enough in alignment to be joined, the content editing system determines the midpoints M from both sides as:

$$M_L = \frac{L_2 - (1-t)L_1}{t}$$

$$M_R = \frac{R_1 - tR_2}{1-t}$$

where t is the fractional parameter recorded with the path slice. If the two values $M_L$ and $M_R$ are within a predefined tolerance value, then the content editing system recombines the slices by creating a single cubic Bezier segment from:

$$L_0; \frac{L_1 - (1-t)L_0}{t}; \frac{R_2 - tR_3}{1-t}; R_3$$

The content editing system computes these four points to replace the two segments at the ends of the path slices. Alternatively, if $M_L$ and $M_R$ do not meet the predefined tolerance value (e.g., because of distortions introduced by the deformation operation), the content editing system leaves the segments introduced in the slicing process as-is (e.g., without recombining the deformed segments that do not satisfy the tolerance value). The content editing system thus deforms separate segments of vector paths using a plurality of Bezier patches and then recombines the segments after completing the deformation process while only adding additional control points for certain deformed segments (e.g., segments that do not satisfy the tolerance value).

In one or more embodiments, the content editing system displays all of the control points for each Bezier patch during a piecewise deformation operation (e.g., as illustrated in FIGS. 2B and 4). In additional embodiments, the content editing system displays only some of the available control points for one or more Bezier patches. For example, the content editing system can identify a user input to modify a specific Bezier patch of the plurality of Bezier patches. The content editing system can display the control points for the identified Bezier patch while hiding the control points for other Bezier patches. In another example, the content editing system can display a number of control points based on a user preference, based on a selected control point, or based on other criteria.

Additionally, while the above descriptions provide embodiments for performing a deformation operation on a single digital image, the content editing system can perform a deformation operation for more than one digital image. For example, the content editing system can allow a user to specify a selection that encompasses a plurality of digital images to perform a deformation operation across the plurality of digital images (or at least a portion of more than one digital image). For example, the content editing system can allow the user to specify a deformation area that encompasses more than one digital image (e.g., a set of images of a single scene, such as a plurality of images forming a panoramic view of a scene) within a single editing layer or across more than one editing layer. The Bezier patches and corresponding deformations can thus correspond to different portions of different digital images based on a plurality of Bezier patches.

Figure 7:
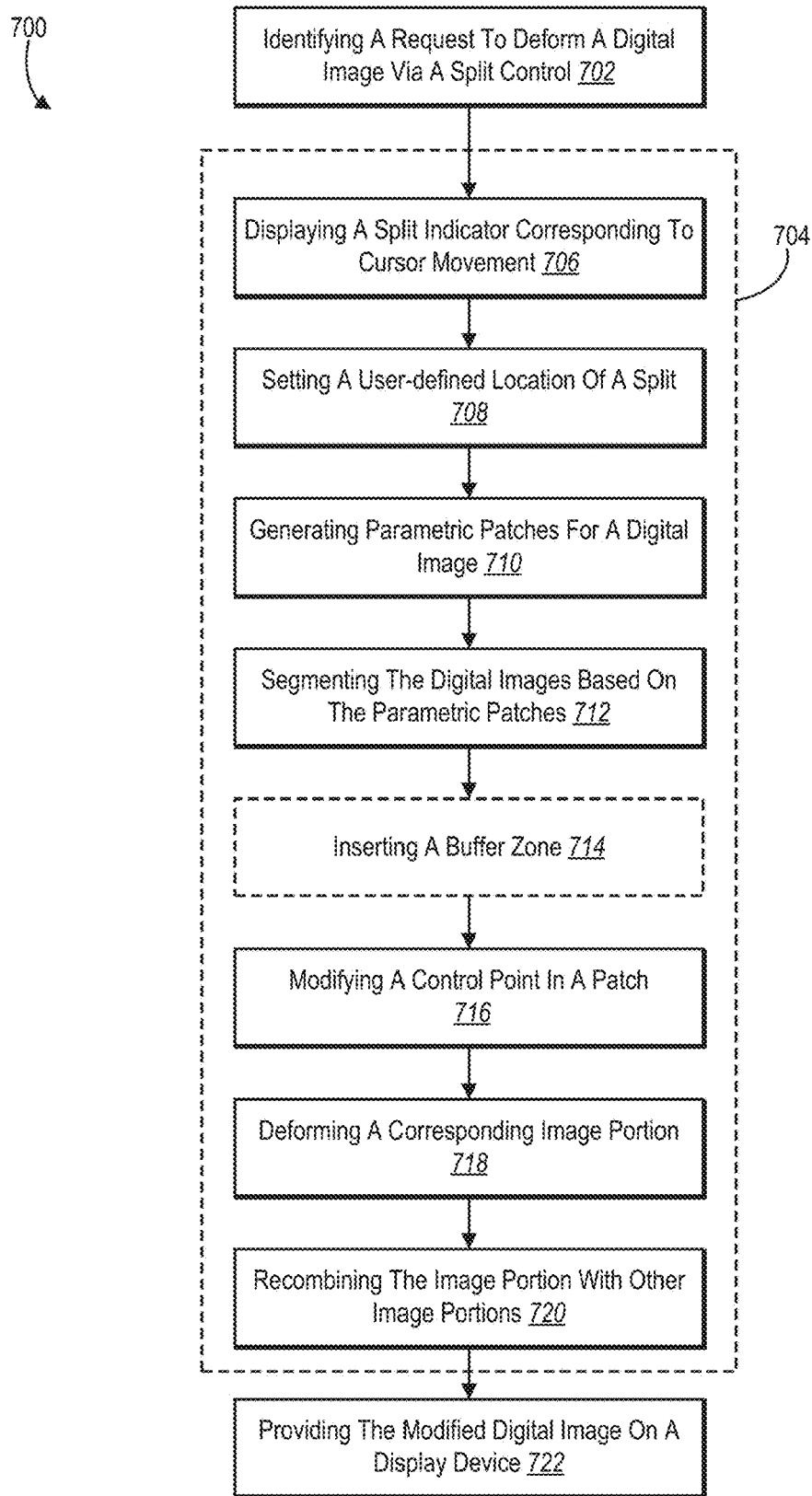
FIG. 7 illustrates a diagram for a process of deforming an image using a dynamic parametric patch split control in accordance with one or more implementations.

As described previously, the content editing system performs deformations for a digital image by allowing a user to manually define patch locations and sizes for a digital image. Specifically, the user manually defines the patch locations and sizes by specifying one or more locations of one or more splits for dividing the digital image into portions corresponding to parametric patches. FIG. 7 includes an overview of a series of acts 700 of dynamic piecewise deformation of digital images. In one or more embodiments, the content editing system performs the series of acts 700. For instance, a client device can implement the content editing system for performing the series of acts 700 to deform a digital image using a plurality of parametric patches based on user-defined split locations via a dynamic parametric patch split control.

As illustrated in FIG. 7, the content editing system performs an act 702 of identifying a request to deform a digital image via a manual split selection process. For instance, the content editing system receives a request to perform a parametric deformation operation for a digital image utilizing a dynamic parametric patch split control within a client application. As mentioned, the digital image may be a raster image or a vector image. The client application displays the digital image on a display device for the user to view and/or interact with (e.g., edit) the digital image. As described in relation to FIGS. 8A-8G, the request can involve a user manually inserting one or more locations for slicing the digital image. Furthermore, as described in relation to FIGS. 9A-9C, the request can involve a user manually inserting a buffer zone for preventing deformations from affecting certain portions of the digital image.

In one or more embodiments, the request to deform the digital image involves a user selecting a split control within the client application. For instance, the split control can include one or more user interface tools that are associated with one or more operations for inserting splits into the digital image. Additionally, the split control can include a user interface tool indicating a desire by the user to deform the digital image and causes the client application to display one or more additional user interface tools for specifying one or more split operations. For example, as described in more detail below, the user interface tools can include tools for placing a vertical split, a horizontal split, a cross split (i.e., horizontal and vertical), or a buffer zone.

FIG. 7 also shows that the content editing system performs an act 704 of deforming the digital image. As illustrated, the act 704 includes a plurality of additional acts (the acts 706-720) for performing the deformation operation. In particular, the series of acts 700 includes an act 706 of displaying a split indicator corresponding to cursor movement. For example, as described with respect to FIGS. 8A-8C, the content editing system provides a split indicator (i.e., a visual element that indicates a possible location of a split on a digital image) within a graphical interface of the client application. The split indicator can be a visual element (e.g., a line) that displays over the top of the digital image within the graphical interface at a location corresponding to the possible location of the split on the digital image. To illustrate, the content editing system provides a horizontal indicator corresponding to a horizontal split, a vertical split indicator corresponding to a vertical split, or a cross indicator corresponding to a cross split.

In one or more embodiments, the content editing system provides the split indicator according to movement of a cursor within the graphical interface so the user sees the possible location of the split relative to the digital image. For instance, the content editing system tracks the movement of the cursor relative to the digital image and displays the split indicator based on the position of the cursor. In one or more embodiments, the content editing system redraws the split indicator within the graphical interface in response to detecting movement of the cursor across the digital image. Thus, the split indicator is a dynamic visual element that changes position within the graphical interface as the user moves the cursor within the graphical interface.

Additionally, the content editing system performs an act 708 of setting a user-defined location of a split. Specifically, the content editing system sets a location of a split for the digital image based on a user input selecting the location. Setting the location of a split determines a vertical and/or horizontal line across the digital image for use in determining locations of parametric patches for the digital image. The location of a split can be based on a cursor location at the time of the user input selecting the location. Alternatively, the user sets the location of a split at specific coordinates (e.g., within a coordinate plane in which the digital image is located) by inputting x and/or y coordinates for precise input locations.

Figure 8A:
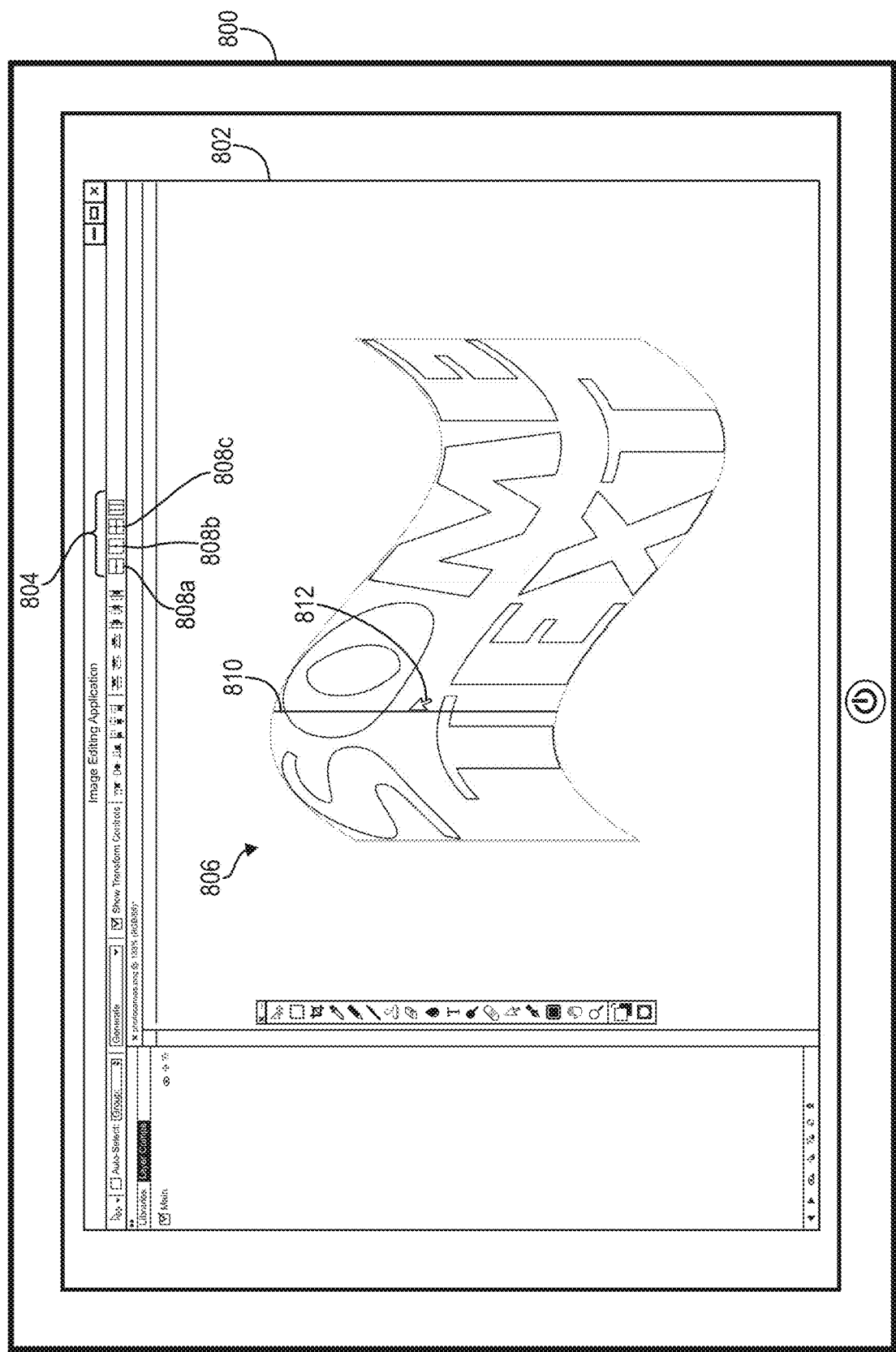
FIGS. 8A-8G illustrate diagrams for deforming a digital image based on user-defined locations of splits for the digital image in accordance with one or more implementations.
Figure 8B:
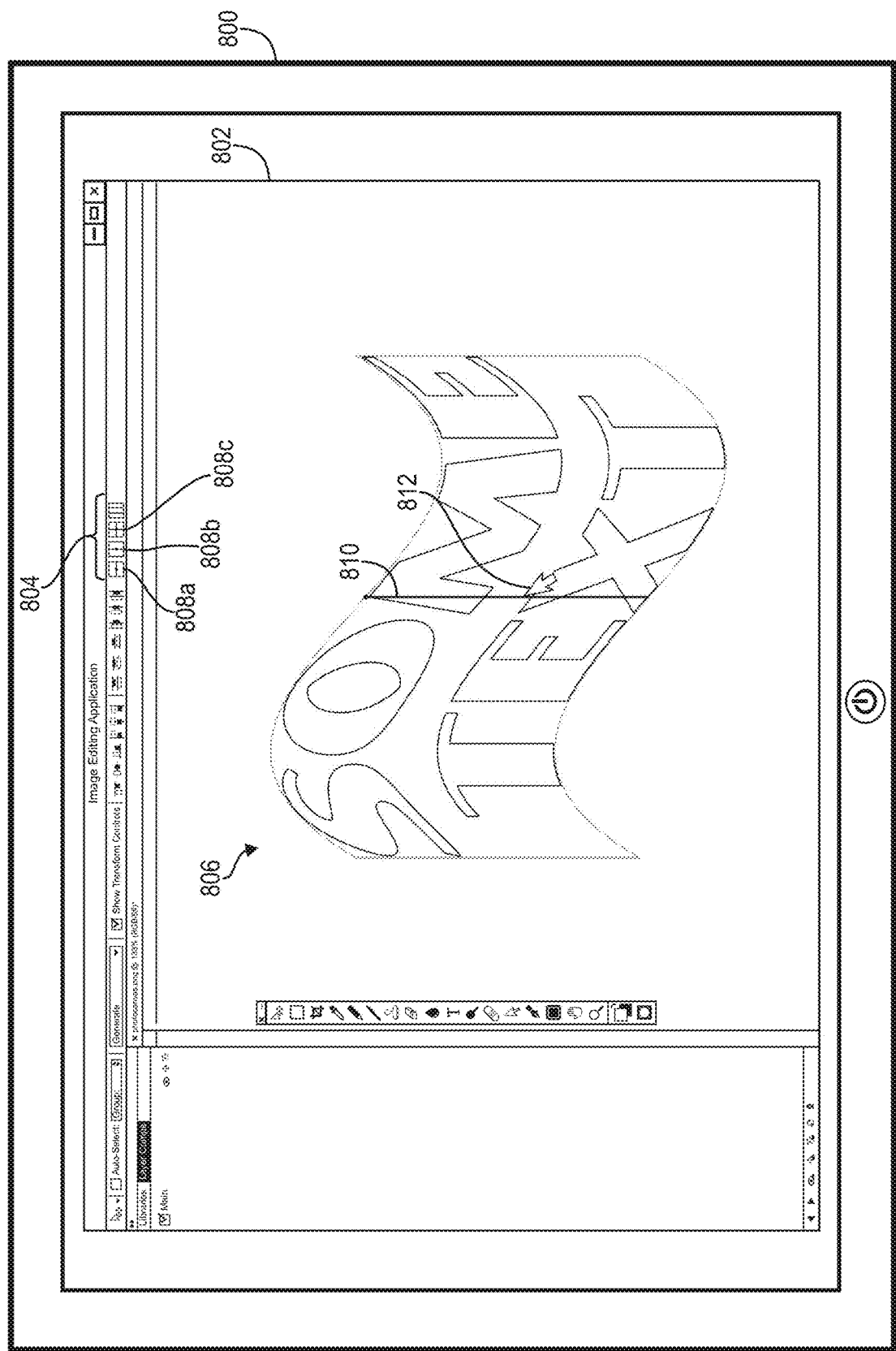
Figure 8C:
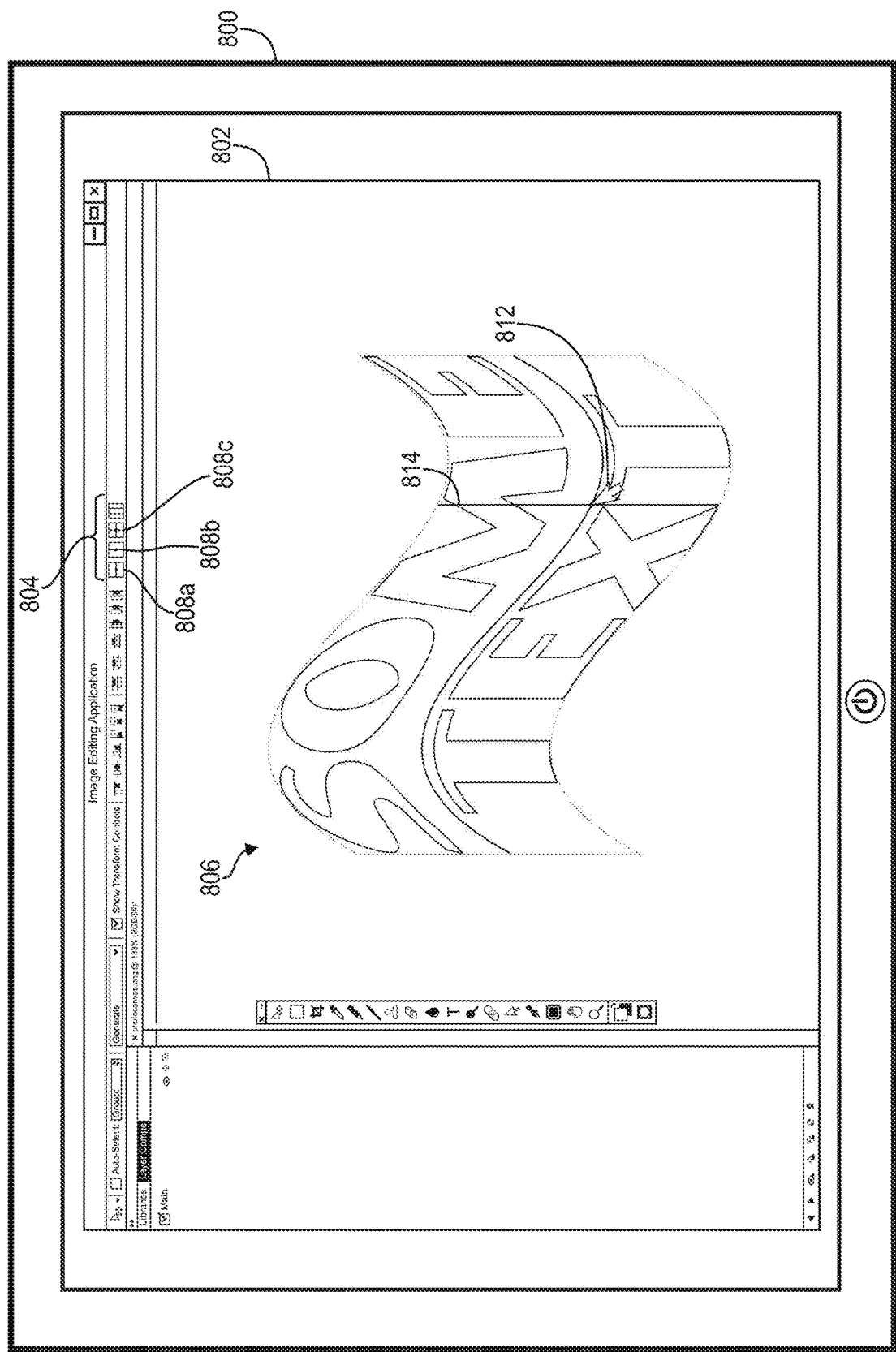

The content editing system also performs an act 710 of generating parametric patches for a digital image. In particular, the content editing system generates a plurality of Bezier patches within a Bezier quilt for the deformation operation of the digital image, as previously described with respect to FIG. 1. The content editing system generates the Bezier patches based on the user-defined split locations. Accordingly, as illustrated in FIGS. 8A-8C, for example, the content editing system generates a plurality of Bezier patches of different dimensions, depending on the user-defined split locations. In one or more embodiments, the content editing system generates any number of Bezier patches based on the number of split locations for the digital image. To illustrate, a single split (i.e., either a horizontal or a vertical split) results in the content editing system generating (at least) two Bezier patches, while a cross split (i.e., both a horizontal and a vertical split) results in the content editing system generating (at least) four Bezier patches.

Additionally, as described in relation to FIG. 1, the content editing system can generate Bezier patches of different orders. For instance, the content editing system can generate a plurality of bicubic Bezier patches. As mentioned, a plurality of bicubic Bezier patches provides a set of 4×4 control points for each of the Bezier patches such that each Bezier patch includes 16 control points (including coincident control points). The content editing system can also generate parametric patches of an order other than bicubic.

As illustrated in FIG. 7, the series of acts 700 include an act 712 of dividing the digital images based on the parametric patches. In response to the user defining the split locations, and after, or in conjunction with, generating the Bezier patches, the content editing system divides the digital image into portions that correspond to the Bezier patches. For example, as previously described with respect to FIG. 1, the content editing system generates the Bezier patches to deform individual portions of the image by slicing the digital images along the edges of the Bezier patches. Because the Bezier patches have sizes and locations based on user-defined split locations, the content editing system can divide the digital image into a plurality of portions that have different dimensions, as illustrated in FIGS. 8A-8C.

The series of acts 700 can also include an optional act 714 of inserting a buffer zone. Specifically, the content editing system inserts a buffer zone in response to a user input via a graphical interface control (e.g., a buffer control) to place a buffer zone between two or more parametric patches, as described in more detail with respect to FIGS. 9A-9C. For instance, the content editing system allows a user to specify a location for a buffer zone, preventing deformations of portions adjacent to the buffer zone from deforming other portions separated from the deformed portions by the buffer zone.

In one or more embodiments, the content editing system allows a user to specify a location and size of a buffer zone. In particular, the content editing system displays an indicator of a location of the buffer zone (including any edges of the buffer zone) as a cursor moves within the graphical interface. Alternatively, the content editing system allows the user to set the size of the buffer zone by inserting the edges of the buffer zone individually or by specifying the size using a text box or other number input method.

The user can then set the location of the buffer zone by selecting an option to set the buffer zone. When the user sets the location of the buffer zone, the content editing system inserts the buffer zone to separate two or more Bezier patches by modifying the Bezier patches to set new edges of the patches at the edges of the buffer zone. For example, when inserting a vertical buffer zone between two Bezier patches, the content editing system shifts the edges of the adjacent patches by a distance based on the width of the buffer zone. Thus, by inserting the buffer zone, the content editing system changes the dimensions of one or more Bezier patches for the digital image.

The buffer zone may be any region separating a plurality of parametric patches for deforming a digital image and corresponds to a specific portion of the digital image. For instance, according to one or more embodiments, the content editing system generates a buffer zone that includes an additional Bezier patch to separate two or more other Bezier patches, as described in more detail with respect to FIGS. 9A-9C. A user may thus modify a buffer zone according to the principles described herein for modifying a Bezier patch. Alternatively, the content editing system can generate a buffer zone that does not have its own set of control points, preventing a user from directly deforming a portion of the digital image corresponding to the buffer zone, rather than indirectly via one or more adjacent Bezier patches.

The series of acts 700 also includes an act 716 of modifying a control point in a patch. Specifically, the content editing system receives a user input to modify a control point within a Bezier patch by changing a position of the control point. For example, as described previously in relation to FIG. 1, a user can change positions of any number of control points associated with each Bezier patch to modify the Bezier patch.

As previously described, coincident control points can modify more than one Bezier patch. In one or more embodiments in which a user inserts a buffer zone, modifying a control point at an edge of a buffer zone modifies a first Bezier patch and the buffer zone without modifying a second Bezier patch. Similarly, modifying a control point at an edge of the buffer zone and the second Bezier patch modifies the second Bezier patch without modifying the first Bezier patch.

The series of acts 700 further includes an act 718 of deforming a corresponding image portion. In response to detecting a modified Bezier patch, the content editing system deforms the corresponding portion of the image. Specifically, the content editing system calculates a Bezier (or other parametric) patch deformation based on the positions of the modified control points in the Bezier patch, as described previously with respect to FIG. 1. The content editing system modifies each portion of the image according to the corresponding Bezier patches while processing buffer zones to prevent patches from cause deformations in portions of the image separated by the buffer zones.

After deforming the portions of the image, the series of acts 700 includes an act 720 of recombining the image portion with other image portions. In particular, as described previously with respect to FIG. 1, the content editing system recombines a deformed image portion with any adjacent portions to create a finalized digital image with any deformations from corresponding Bezier patches. To illustrate, the content editing system can recombine a first image portion at a corner of the digital image (e.g., an upper left corner) with two adjacent image portions (e.g., at a right edge and a bottom edge of the first image portion). The content editing system can also recombine portions of the image corresponding to any buffer zones with adjacent portions of the digital image.

The series of acts 700 further includes an act 722 of providing the modified digital image on a display device. In particular, as described with respect to FIG. 1, the content editing system displays the resulting modified digital image with the recombined image portions (including any deformed image portions) within a graphical interface of a client application. Additionally, the content editing system allows the user to view the modified digital image and/or perform additional modifications to the modified digital image. For example, the content editing system can allow the user to add or remove Bezier patches, splits, and/or buffer zones to further deform the digital image.

As mentioned, FIGS. 8A-8G illustrate deforming a digital image based on user-defined locations of splits for the digital image. Specifically, FIGS. 8A-8G illustrate embodiments of a graphical user interface within a client application for display on a client device. The accompanying description includes additional details associated with the various operations in the process described in relation to FIG. 7.

As shown, FIG. 8A includes a client device 800 on which a client application 802 runs. For example, the client application 802 can be an image editing application allowing a user to edit digital content using a dynamic parametric split control 804 (or simple "split control 804"). Specifically, FIG. 8A illustrates modifying a digital image 806 using the split control 804 within the client application 802. As mentioned, the split control 804 allows a user to manually insert a user-defined location of a split using the processes described above in FIG. 7.

As also mentioned, the split control 804 includes one or more tools for setting user-defined locations of splits. In one or more embodiments, the split control 804 includes a plurality of tools. For instance, the split control 804 includes a group of related tools for inserting different types of splits in a digital image. To illustrate, the split control can include a horizontal split tool 808a, a vertical split tool 808b, and a cross split tool 808c. In various implementations, the tools can be displayed on a toolbar, within a dialog, or within a dropdown menu. Additionally, the content editing system can allow a user to use hotkeys, shortcuts, or other input methods to select the split control 804 and/or the associated tools.

As illustrated in FIG. 8A, in response to the user selecting the vertical split tool 808b, the content editing system causes the client application 802 to display a split indicator 810 within the graphical interface. In particular, as mentioned, the content editing system displays the split indicator 810 based on the movement of a cursor 812 (or finger/stylus location) across the digital image 806. For example, as the user moves the cursor 812 within the client application (e.g., using a mouse or other device input), the content editing system draws the split indicator 810 to provide an indication of a possible split location on the digital image based on the position of the cursor 812.

In the case of a vertical split, if the x coordinates of the cursor 812 are within the left and right bounds of the digital image 806, the content editing system displays the split indicator 810 as a vertical line at the x coordinates of the cursor 812 overlaid on top of the digital image 806. Similarly, in the case of a horizontal split, if the y coordinates of the cursor 812 are within the upper and lower bounds of the digital image 806, the content editing system displays the split indicator as a horizontal line at the y coordinates of the cursor 812 overlaid on top of the digital image 806. Otherwise, the content editing system hides the split indicator 810 from view. In at least some implementations, the content editing system also hides the split indicator 810 if either the x or y coordinates of the cursor 812 is outside the bounds of the digital image 806. Alternatively, the content editing system may only check a single axis based on whether the selected tool is for a vertical or a horizontal split.

To illustrate, FIG. 8A shows the cursor 812 at a first position within the graphical interface. The content editing system detects the cursor 812 is at an x coordinate within a left and right bound of the digital image 806. The content editing system then draws the split indicator 810 as a vertical line across the digital image 806 at the detected x coordinate of the cursor 812. FIG. 8B illustrates the cursor 812 at a second position within the graphical interface. The content editing system detects that the cursor 812 is at a new x coordinate that is still within the left and right bound of the digital image 806 and then draws the split indicator 810 at the new x coordinate of the cursor 812. Thus, each time the cursor 812 moves within the graphical interface, the content editing system detects the movement and redraws the split indicator 810, which appears to a user as a smooth movement of the split indicator 810 with the movement of the cursor 812.

In response to the user providing an input to set the split location, the content editing system sets the split at the indicated location. For instance, the user can provide an input by performing a mouse click, tap, or similar operation. Alternatively, for a drag operation, the user provides an input by releasing a mouse button or lifting a finger. The content editing system then splits the digital image 304 into a plurality of portions at the location corresponding to the split indicator 810. The content editing system also generates the parametric patches at the location corresponding to the split indicator 810. Thus, the content editing system allows the user to preview exactly how the content editing system splits the digital image 304 before the user sets the split location.

Additionally, as previously mentioned, the content editing system can allow a user to set a plurality of split locations with a single operation. Specifically, in response to the user selecting the cross split tool 808c, the content editing system can display a split indicator 814 with a vertical line and a horizontal line, as shown in FIG. 8C. The content editing system can display the lines such that the lines cross at the location of the cursor 812. Accordingly, the content editing system can move the split indicator 814 (including the vertical line and the horizontal line) with the movement of the cursor 812 within the digital image 806.

In addition, the content editing system displays the split indicator 814 to conform to contours of the digital image 806 based on an existing deformation or warp. For instance, if the user has performed a previous deformation on the digital image 806 (e.g., using piecewise parametric patch deformation), the content editing system can store the deformation information. To illustrate, the content editing system can store the deformation information in memory while the user is performing sequential deformation operations (e.g., prior to applying changes to the digital image 806). Alternatively, the content editing system can store the deformation information in a project file or in metadata to allow the content editing system to use the deformation information at a later time.

The content editing system then uses the stored deformation information to deform the split indicator 814 within the graphical interface. As illustrated in FIG. 8C, the horizontal line of the split indicator 814 follows the contour of the previous deformation (e.g., the contours of the Bezier surface) of the digital image 806. Furthermore, the vertical line of the split indicator 814, though not deformed, follows the edges of the digital image 806 as the cursor 812 moves within the digital image 806. In addition, because the content editing system deforms the split indicator 814 to follow the contours of previous deformation operations (e.g., to follow the contours of the Bezier surface corresponding to the image deformation), the content editing system also splits the digital image 806 according to the contours of the previous deformation operations when setting the location of the splits. Accordingly, the content editing system can allow a user to perform subsequent warp operations that build on the previous deformation information when performing later parametric deformations.

Figure 8D:
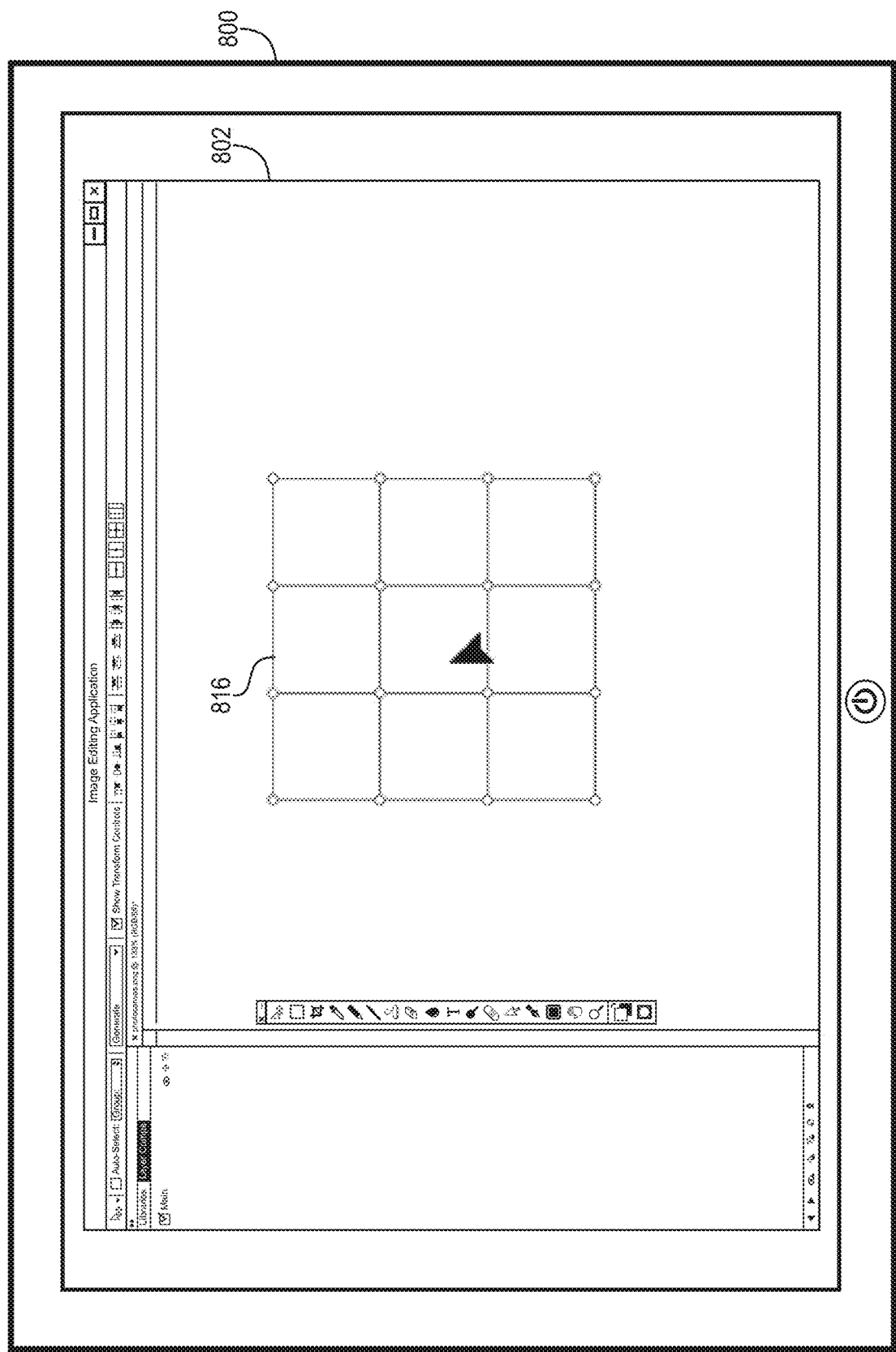

As further illustrated in FIGS. 8D-8G, the content editing system intelligently determines whether to insert a vertical or horizontal split when in an active "split mode." Specifically, the content editing system allows the use of a modifier key or other input to indicate a "split mode" in which the user can split a digital image is active. FIG. 8D illustrates an embodiment of a user interface of the client application 802 when the split mode is inactive. In particular, FIG. 8D illustrates a quilt 816 including a plurality of parametric patches. When split mode is inactive, the user interface does not display any split indicators for adding additional splits to the quilt 816.

In one or more embodiments, to activate split mode, a user inserts an input using a modifier key. For example, the user can press and hold the "alt" key to enter split mode. Alternatively, the user can toggle the split mode using the "alt" key to remain in split mode until the user presses the key a second time. In another example, the user can use another key or input method to enter split mode, as determined by the client application 802 and/or user preferences.

Figure 8E:
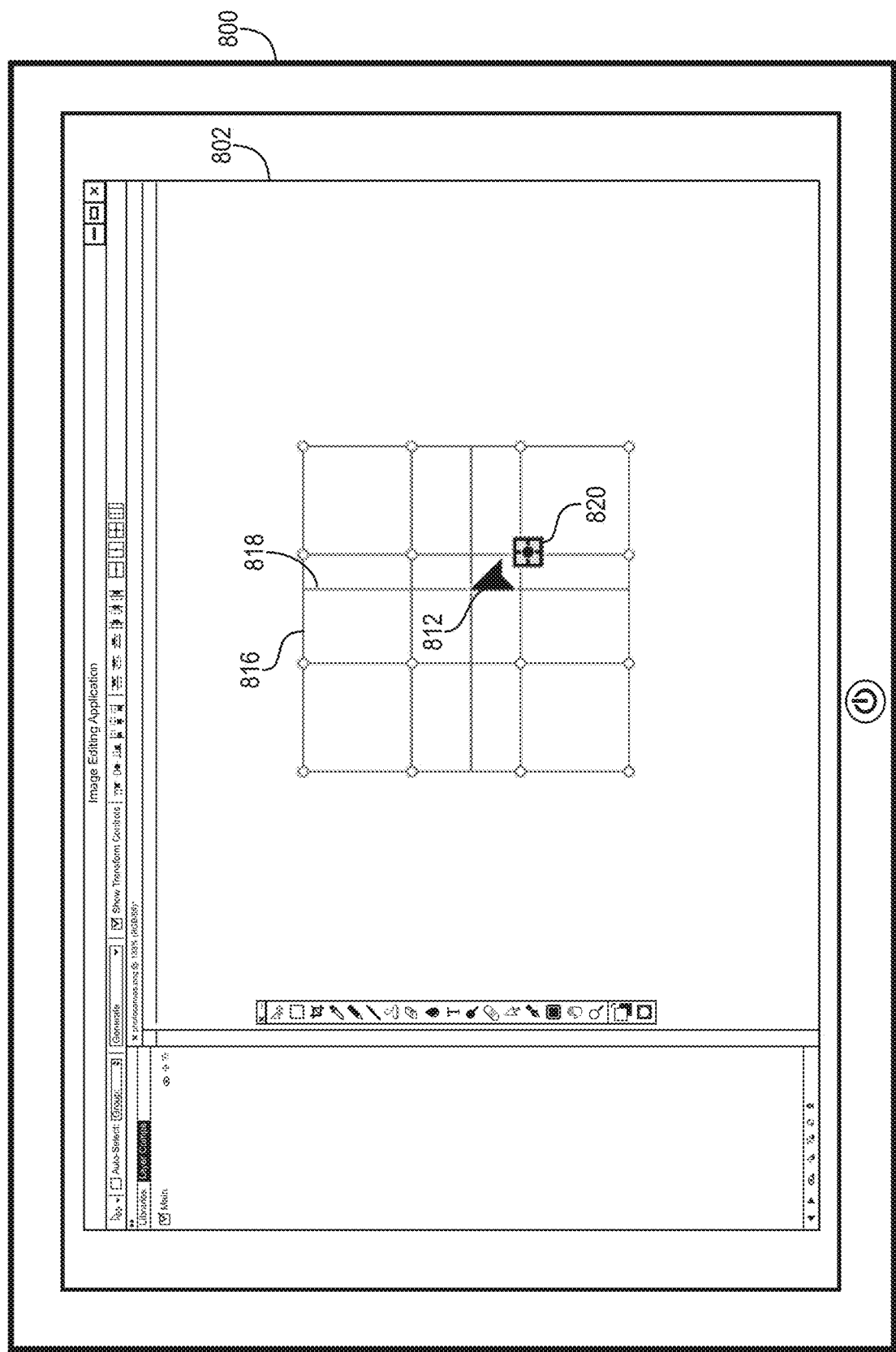

After entering split mode, the content editing system displays one or more split indicators based on the location of the cursor 812 relative to one or more existing split locations. In particular, the content editing system determines whether to display a horizontal split indicator, vertical split indicator, or cross split indicator based on how close the cursor 812 is to one or more existing split locations. As shown in FIG. 8E, if the content editing system determines that a location of the cursor 812 is not within a threshold distance of any existing split locations, the content editing system displays a cross split indicator 818. While the cross split indicator is visible, providing an input to insert a split causes the content editing system to insert a cross split centered at the cursor location. Additionally, the content editing system can display a cross split icon 820 next to the cursor 812 to indicate that the split mode is active for inserting a cross split.

Figure 8F:
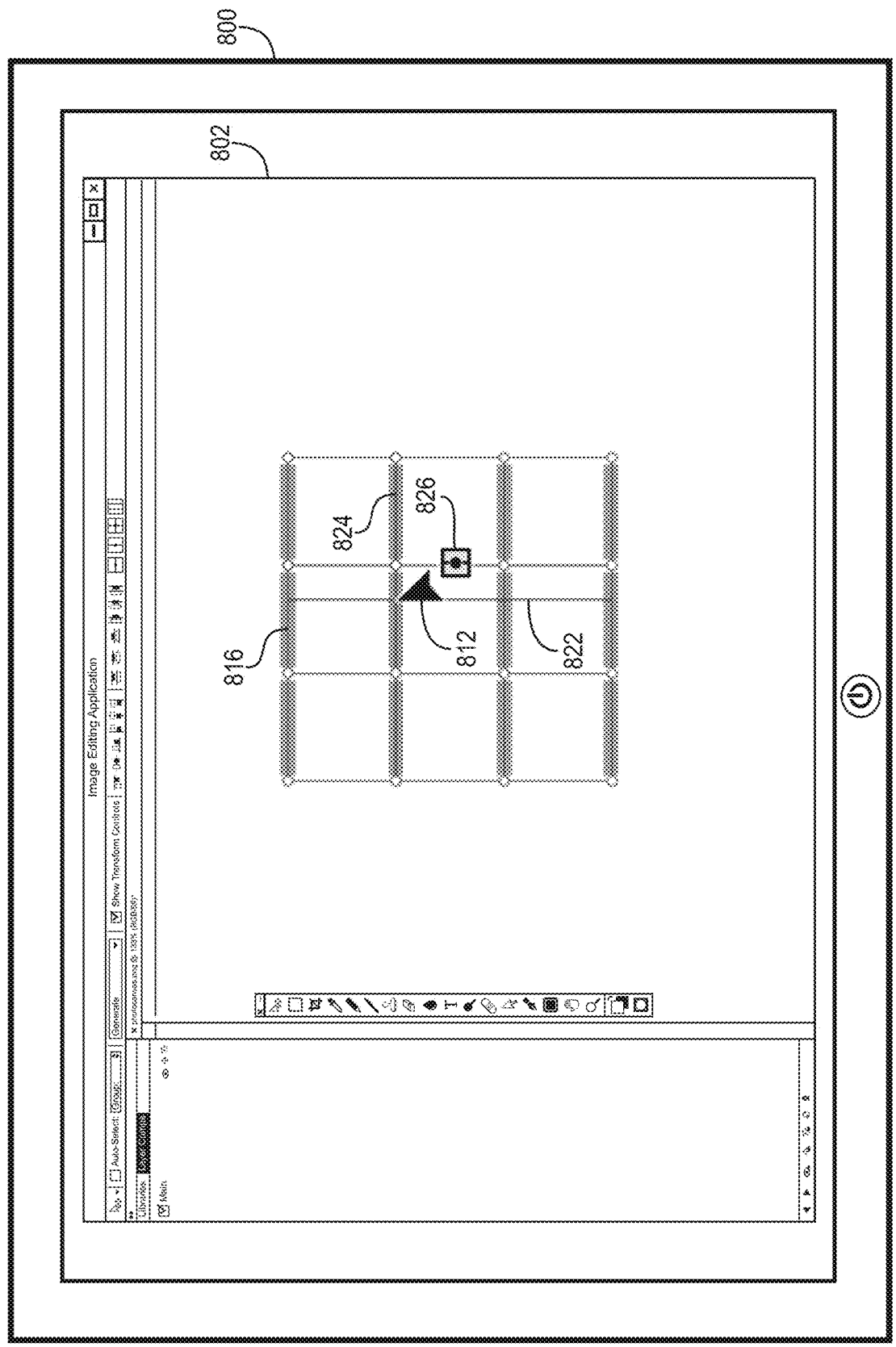

FIG. 8F illustrates intelligently determining to display a vertical split indicator 822 based on the location of the cursor 812. Specifically, the content editing system determines that the cursor is on or near a horizontal split 824 (or a horizontal edge) in the quilt 816, but not within a threshold distance of any vertical splits. Based on the cursor 812 being on or near the horizontal split 824, the content editing system determines that the user wants to insert a vertical split, rather than another horizontal split so close to the other horizontal split 824. In one or more embodiments, the content editing system determines that the cursor 812 is on or near the horizontal split 824 based on the cursor 812 being within a specific pixel range (or other measurement) of the horizontal split 824 while in split mode. The content editing system can also display a vertical split icon 826 next to the cursor 812 to indicate that the split mode is active for inserting a vertical split.

Figure 8G:
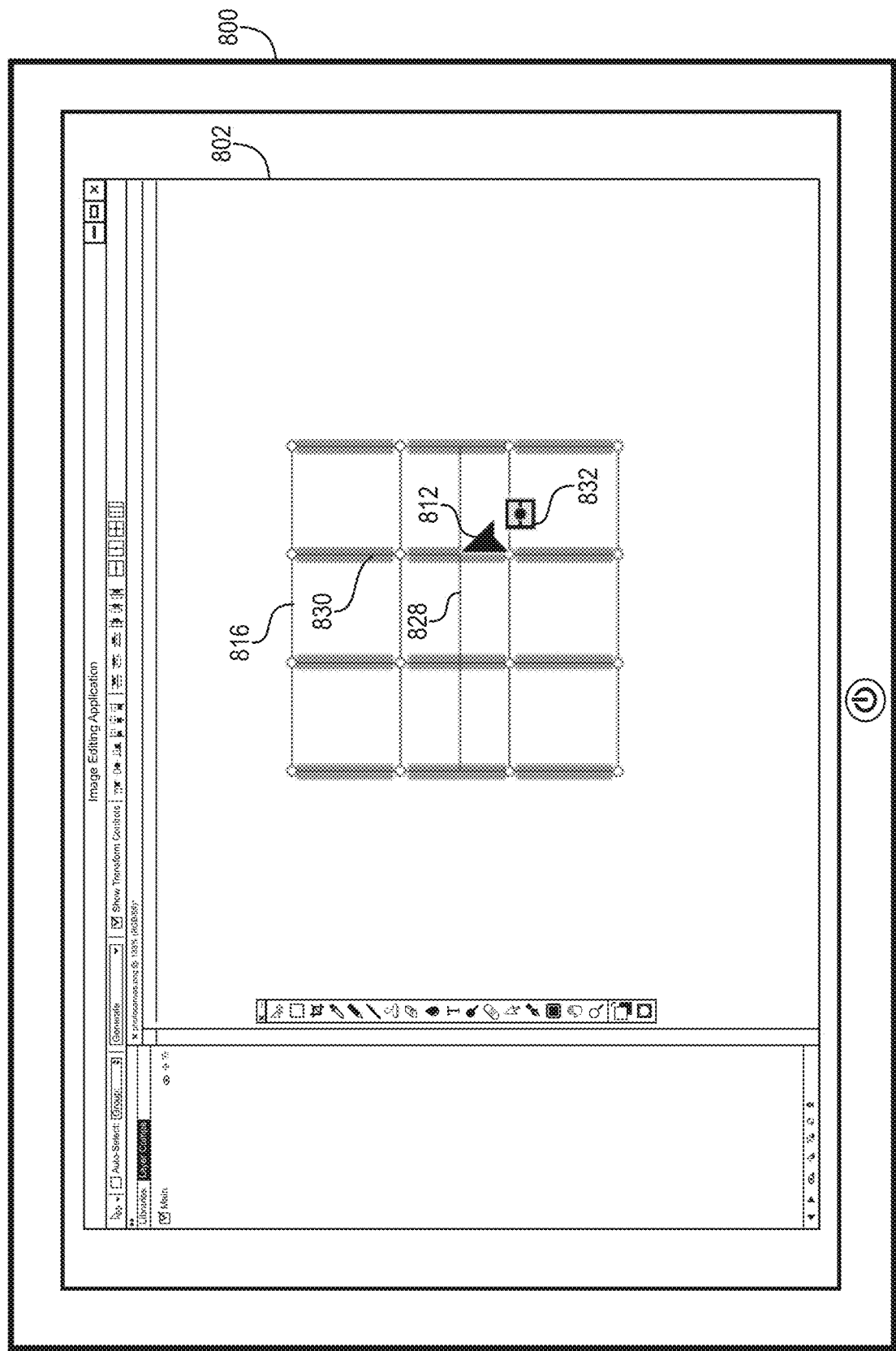

FIG. 8G illustrates intelligently determining to display a horizontal split indicator 828 in response to determining that the cursor 812 is on or near a vertical split 830 (or a vertical edge) in the quilt 816. In particular, the content editing system determines that the user wants to insert a horizontal split, rather than another vertical split, based on the proximity of the cursor 812 to the vertical split 830 and then displays the horizontal split indicator 828 at the cursor location. Additionally, the content editing system can display a horizontal split icon 832 near the cursor 812 to indicate that the split mode is active for inserting a horizontal split.

In one or more embodiments, if the cursor 812 is within a threshold distance of at least one horizontal split and at least one vertical split, the content editing system can hide split indicators. Furthermore, the content editing system prevents the user from inserting additional splits into the quilt 816 while the cursor 812 is near both a horizontal split and a vertical split. In one or more alternative embodiments, the content editing system allows the user to manually specify insertion of one or both of a horizontal or vertical split even if the cursor 812 is within the threshold distance of one or more existing splits.

As illustrated in FIGS. 8A-8G, the content editing system allows a user to manually specify the locations of one or more split locations for deforming a digital image. The content editing system allows the user to input any number of split locations, as may serve a particular implementation. In one or more embodiments, the content editing system sets a limit on the number of partitions that a user can insert into a digital image. The limit may be based on image dimensions, computing resources, predefined settings, or other criteria.

Figure 9A:
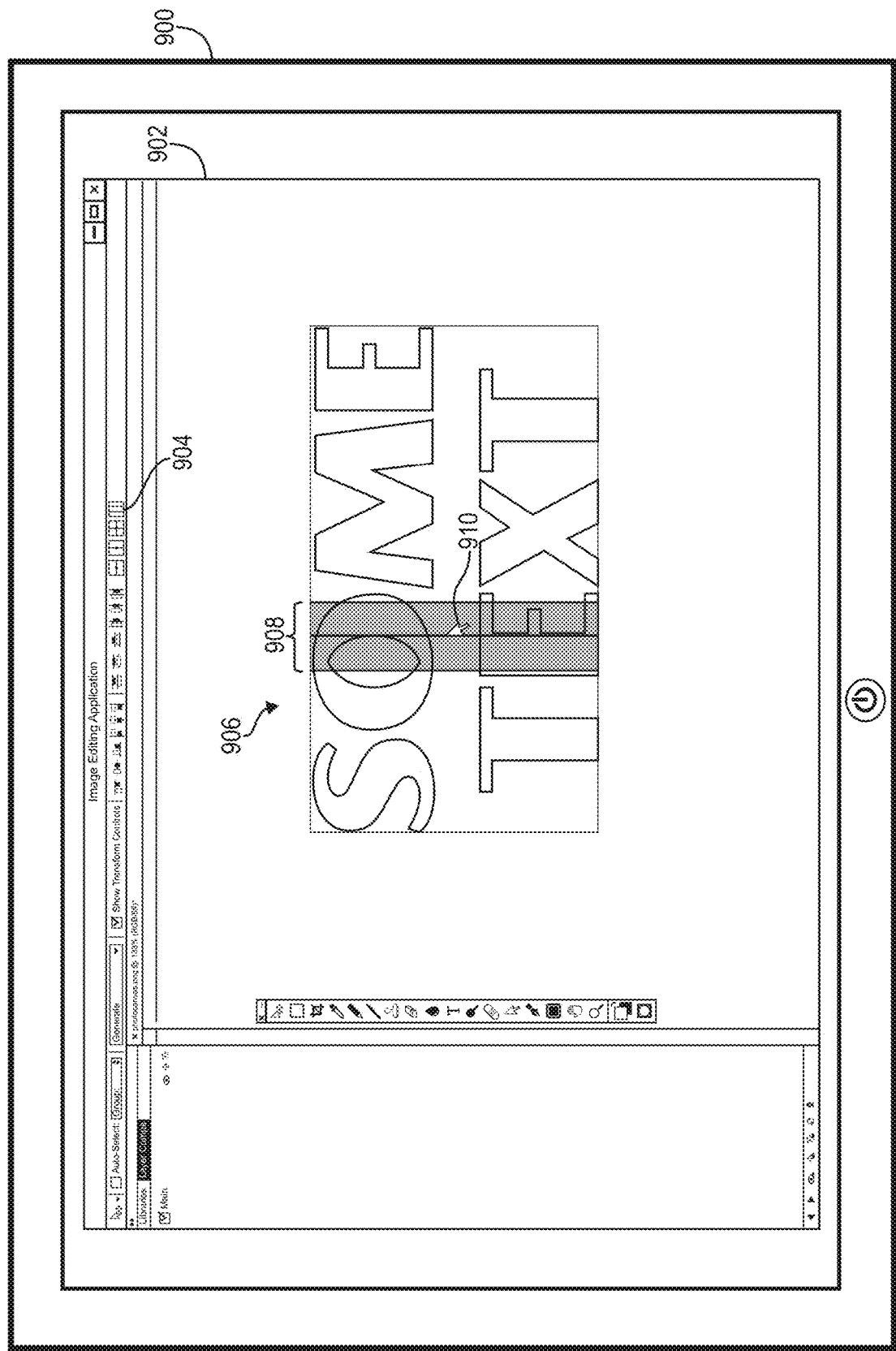
FIGS. 9A-9C illustrate diagrams for inserting a buffer zone for deforming a digital image in accordance with one or more implementations.
Figure 9B:
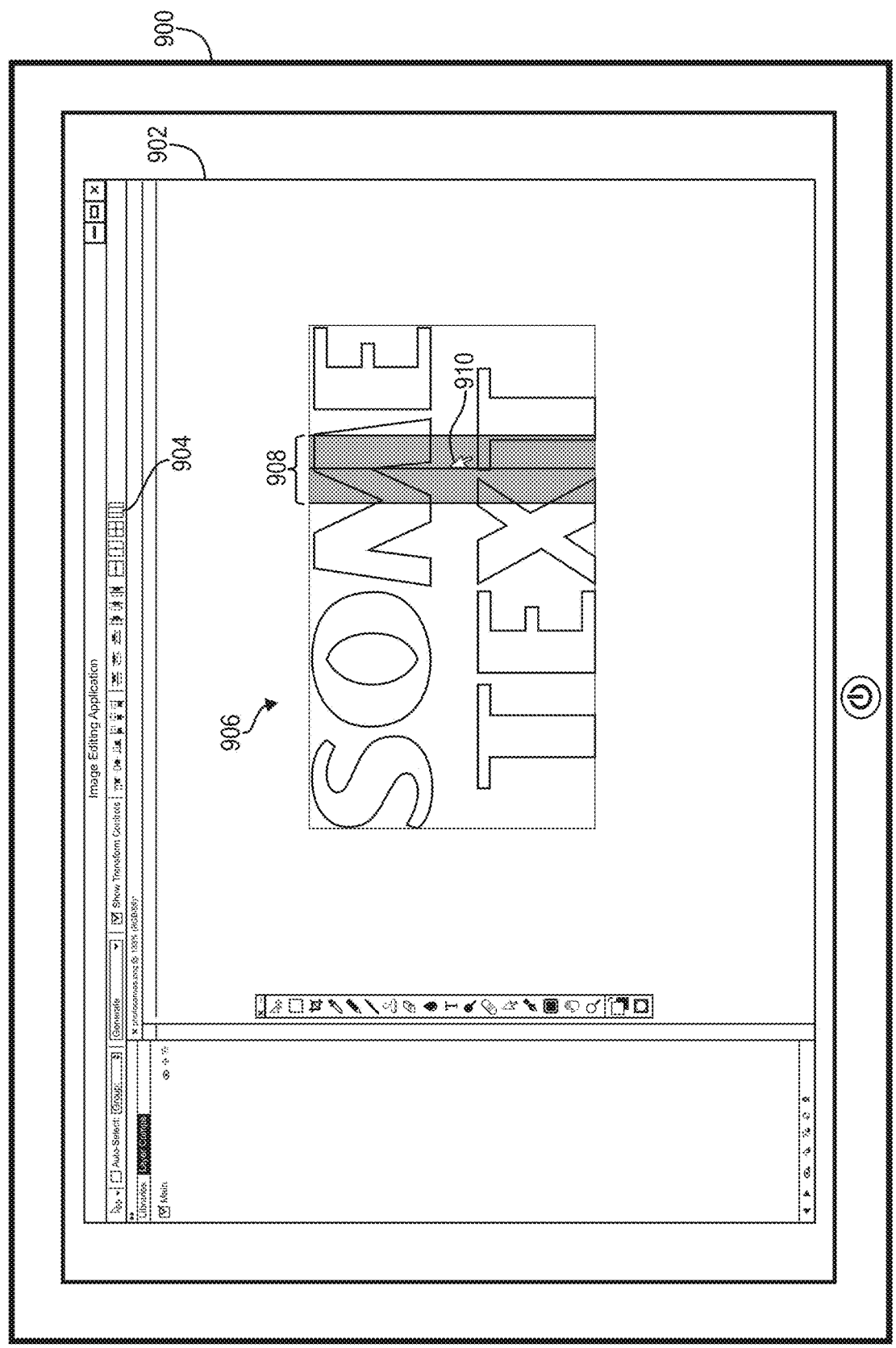
Figure 9C:
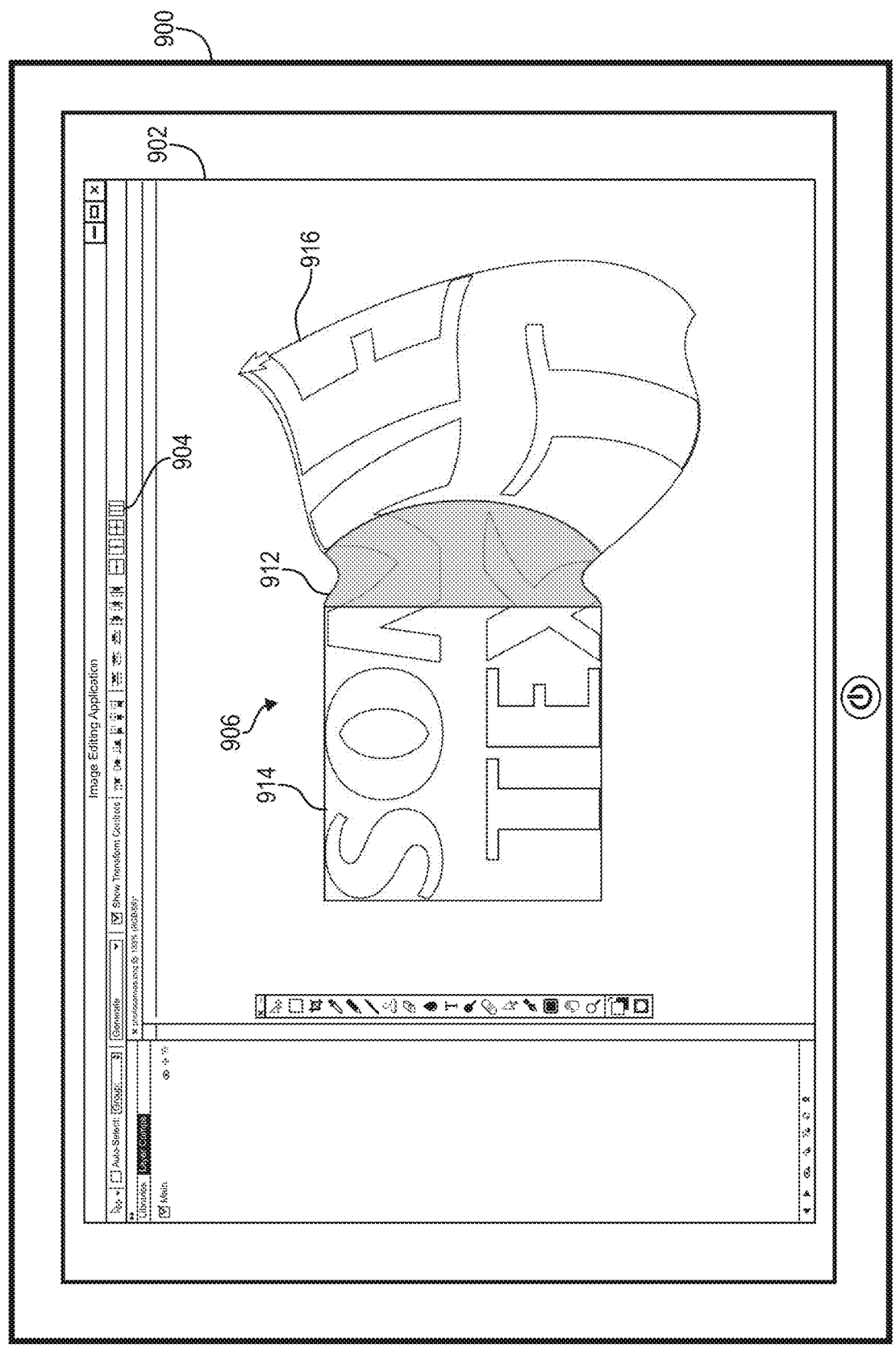

As previously mentioned, FIGS. 9A-9C illustrate diagrams for inserting a buffer zone for deforming a digital image. Specifically, FIGS. 9A-9C illustrate embodiments of a graphical user interface within a client application for display on a client device.

As illustrated, FIG. 9A includes a client application 902 running on a client device 900. For instance, the client application 902 is an image editing application allowing a user to edit digital content using a buffer zone control 904 for a deformation operation. In particular, FIG. 9A illustrates inserting a buffer zone into a digital image 906 (i.e., reserving a portion of the image as a buffer zone) using the buffer zone control 904 within the client application 902. The buffer zone control 904 allows a user to insert a buffer zone that prevents deformations in portions separated by the buffer zone from causing deformations in the other separated portions.

In one or more embodiments, the content editing system causes the client application to display a buffer zone indicator 908 in response to the user selecting the buffer zone control 904. For example, the content editing system displays the buffer zone indicator 908 based on the movement of a cursor 910 across the digital image 906. To illustrate, as the user moves the cursor 910 within the client application, the content editing system draws the buffer zone indicator 908 to provide an indication of a possible location for inserting a buffer zone in the digital image based on the position of the cursor 910.

For instance, FIG. 9A shows the cursor 910 at a first position within the graphical interface. The content editing system detects that the cursor 910 is at an x coordinate within a left and right bound of the digital image 906. The content editing system then draws the buffer zone indicator 908 as a set of lines overlaid on top of the digital image 906 centered at the detected x coordinate of the cursor 910. FIG. 9B illustrates the cursor 910 at a second position within the graphical interface. The content editing system can detect that the cursor 910 is at a new x coordinate that is still within the left and right bound of the digital image 906 and then draw the buffer zone indicator 908 at the new x coordinate of the cursor 910. Thus, each time the cursor 910 moves within the graphical interface, the content editing system detects the movement and redraw the buffer zone indicator 908, which may appear to a user as a smooth movement of the buffer zone indicator 908 with the movement of the cursor 910.

Additionally, the content editing system determines whether to display the buffer zone indicator 908 based on whether a buffer zone at the inserted location causes two or more parametric patches to be separated. For instance, the content editing system determines a width of the buffer zone and then use the location of the cursor 910 to determine whether inserting the buffer zone at the location is at an edge of the digital image 906. If the buffer zone is at the edge of the digital image 906 (e.g., half the width of the buffer zone is equal to, or greater than, the distance from the cursor 910 to the edge), the content editing system can hide the buffer zone indicator 908 within the graphical interface. Otherwise, the content editing system can display the buffer zone indicator 908 based on the location of the cursor 910.

The content editing system can also display the buffer zone indicator 908 based on a selected orientation of the buffer zone. For instance, while FIG. 9A illustrates a single buffer zone control 904, the content editing system can provide separate controls for inserting a horizontal buffer zone, a vertical buffer zone, or a cross buffer zone (e.g., a combined vertical and horizontal buffer zone). Alternatively, the content editing system can provide a dialog window, text field, or other tool (e.g., a hotkey) within the client application to allow the user to switch between a horizontal and vertical buffer zone. The client application can display the buffer zone indicator 908 according to the selected orientation of the buffer zone.

In one or more embodiments, the content editing system allows a user to manually set each edge/boundary of a buffer zone individually. Specifically, the content editing system allows the user to set a first edge (e.g., a left edge or a bottom edge) of a buffer zone by placing the cursor 910 at a desired location of the first edge and providing an input (e.g., a mouse click). The content editing system can then allow the user to set a second edge (e.g., a right edge or a top edge) of the buffer zone by placing the cursor 910 at a desired location of the second edge and providing another input. The content editing system can then insert the buffer zone based on the selected edges from the user inputs.

As described above, the content editing system can allow the user to insert a buffer zone centered at a cursor location or by manually setting the edges/boundaries of the buffer zone. The content editing system can also allow the user to set a size of the buffer zone. In the case of manually inserted edges, the content editing system determines the size of the buffer zone based on the manually inserted edges. In the case of a buffer zone centered at the cursor location, the content editing system can also provide a setting for setting the size of the buffer zone (e.g., a number selector element or number text field)

To insert a buffer zone, the content editing system determines local parameter coordinates (u, v, or both) for slicing the digital image 906. Specifically, the content editing system partitions the digital image 906 across or down at the edges of the buffer zone and modifies the existing parametric patches (or create new parametric patches) based on the edges of the buffer zone. In one or more embodiments, the content editing system modifies existing patches using De Casteljau's algorithm (or other parametric curve/patch splitting algorithm) to separate rows and/or columns corresponding to each modified patch. The content editing system thus creates new patches to insert into the parametric quilt of parametric patches.

Once the content editing system has inserted a buffer zone, the content editing system can deform separated portions of a digital image separately. FIG. 9C illustrates a buffer zone 912 that separates a first portion 914 of the digital image 906 from a second portion 916 of the digital image 906. As illustrated, deformations to the second portion 916 of the digital image 906 (i.e., based on modified control points of a corresponding parametric patch) do not cause a deformation of the first portion 914 of the digital image 906. Accordingly, deformations in the second portion 916 that would otherwise cause a deformation in the first portion 914 without the buffer zone 912 (e.g., to maintain parametric continuity) instead cause a deformation in the buffer zone 912. This allows a user to maintain a shape of one or more portions of a digital image while deforming an adjacent portion of the digital image with greater precision.

In one or more embodiments, because the content editing system creates a new parametric patch when inserting a buffer zone, the content editing system may allow a user to modify the buffer zone itself using control points associated with the parametric patch for the buffer zone. In particular, the parametric patch corresponding to the buffer zone may include a set of control points that allows a user to deform the buffer zone separately from adjacent portions. Additionally, deformations caused by direct modification of the parametric patch corresponding to the buffer zone can cause deformations to the adjacent portions to maintain parametric continuity.

Alternatively, the content editing system can create the parametric patch for the buffer zone without providing a set of control points for direct interaction by a user. In particular, while the content editing system may create a new parametric patch for the quilt of patches, the content editing system can prevent a user from directly deforming the corresponding portion of the image by hiding control points for the buffer zone patch. Thus, the content editing system can create a buffer zone that only allows for deformation transitions (i.e., indirect deformations based on parametric continuity) between other portions of a digital image, but not for direct deformations in response to user interaction with the buffer zone.

As described in relation to FIG. 7, and the more detailed descriptions in relation to FIGS. 8A-8C and 9A-8C, the content editing system performs operations for deforming digital images. The operations allow the digital editing system to utilize a piecewise deformation process with a plurality of individually modifiable Bezier patches based on user-defined split locations and buffer zones. Accordingly, the acts and operations illustrated and described above in relation to FIG. 7 (e.g., the step 704), and the associated descriptions in FIGS. 8A-8C and 9A-9C, provide the corresponding structure for an example step for modifying the digital image based on a user-defined split using a dynamic parametric patch split control.

Figure 10:
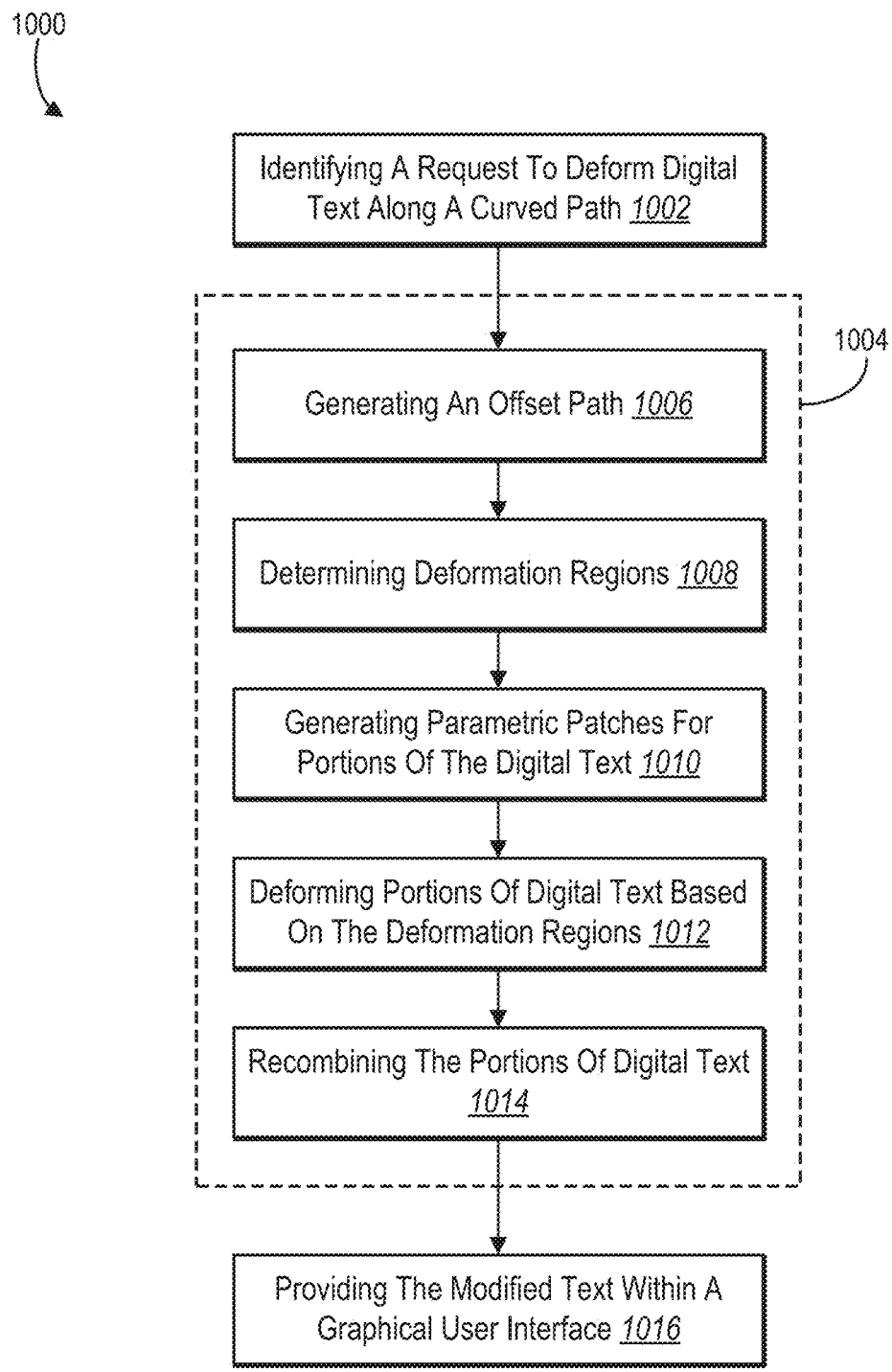
FIG. 10 illustrates a diagram for piecewise deformation of digital text along a curved path in accordance with one or more implementations.

As described above with respect to FIG. 1, the content editing system can perform deformations for a digital image by allowing a user to modify individual Bezier patches corresponding to separate portions of the digital image. As previously mentioned, the content editing system can also deform digital text along an input path. FIG. 10 includes an overview of a series of acts 1000 of piecewise deformation of digital text along a curved path. In one or more embodiments, the content editing system performs the series of acts 1000. For instance, a client device can implement the content editing system for performing the series of acts 1000 to deform digital text along a curve path using a plurality of Bezier patches corresponding to separate deformation regions.

As illustrated in FIG. 10, the content editing system performs an act 1002 of identifying a request to deform digital text along a curved path. For example, the content editing system receives a request to perform a text deformation operation along a path within a client application. The client application can display the digital text on a display device for the user to view and/or interact with the digital text. As described in relation to FIGS. 11A-11F, the request can be for deforming all of the digital text along a path. Alternatively, the request can be for deforming only a portion of digital text along a path (e.g., a selected portion of the digital text).

FIG. 10 also shows that the content editing system performs an act 1004 of modifying the digital text using a plurality of Bezier patches. As illustrated, the act 1004 includes a plurality of additional acts (the acts 1006-1014) for performing the deformation operation. In particular, the series of acts 1000 includes an act 1006 of generating an offset path. To illustrate, the content editing system identifies an original path including at least one Bezier curve, as described in relation to FIG. 11A. In one or more embodiments, the content editing system generates the offset path by creating a segment-by-segment curved path based on the original path, as described in relation to FIG. 11B. For instance, the content editing system identifies separate Bezier curve segments of the original path (e.g., based on control points and/or curvature associated with the original path) and then generates the offset curve to follow the curvature of the original path.

Additionally, the content editing system determines a distance of the offset path from the original path based on a size of the digital text. Specifically, the content editing system generates the offset path such that an area formed by the original path and the offset path can contain the digital text. Furthermore, generating the offset path based on the size of the digital text affects the shape (e.g., length and curvature) of the offset path.

As shown in FIG. 10, the series of acts 1000 also includes an act 1008 of determining deformation regions. For instance, as described in relation to FIG. 11C, the content editing system determines deformation regions within the offset path and original path, each with a specific curvature, shape, and size. The deformation regions allow the content editing system to determine how to modify Bezier patches corresponding to the digital text, as described below.

FIG. 10 illustrates that the series of acts 1000 also includes an act 1010 of generating Bezier patches for portions of the digital text. In particular, the content editing system generates Bezier patches corresponding to individual portions of the digital text, as described in relation to FIG. 11D. The individual portions of the text (and thus, the Bezier patches) are based on the deformation regions, a user input, the size of the digital text, or other criteria. In one or more embodiments, the content editing system generates the Bezier patches for the unmodified digital text, such that a default position of the Bezier patches includes no deformation.

The series of acts 1000 also includes an act 1012 of deforming portions of digital text based on the deformation regions. Specifically, the content editing system deforms the portions of digital text by modifying the Bezier patches for the portions based on the deformation regions, as described in relation to FIG. 11E. To illustrate, the content editing system warps the Bezier curves for the portions of digital text to align to the deformation regions defined by the curved path and the offset path.

Additionally, the series of acts 1000 includes an act 1014 of recombining the segments. For instance, after modifying the Bezier patches, the content editing system recombines one or more deformed segments of digital text with the corresponding adjacent segments to generate the modified text. FIG. 11E and the accompanying description provide an example of digital text with a plurality of segments that the content editing system has deformed based on a curved path and then recombined to complete a deformation operation.

After modifying the digital text, the series of acts 1000 includes an act 1016 of providing the modified text within a graphical user interface. In particular, the content editing system can display the resulting modified digital text with the recombined text portions (including any deformed portions of digital text) within a user interface of a client application. For example, FIG. 11F and the accompanying description below illustrate an example user interface of a client application for displaying modified digital text after a deformation operation along a curved path. Additionally, the client application can allow the user to view the modified digital text and/or perform additional modifications to the modified digital text.

Figure 11A:
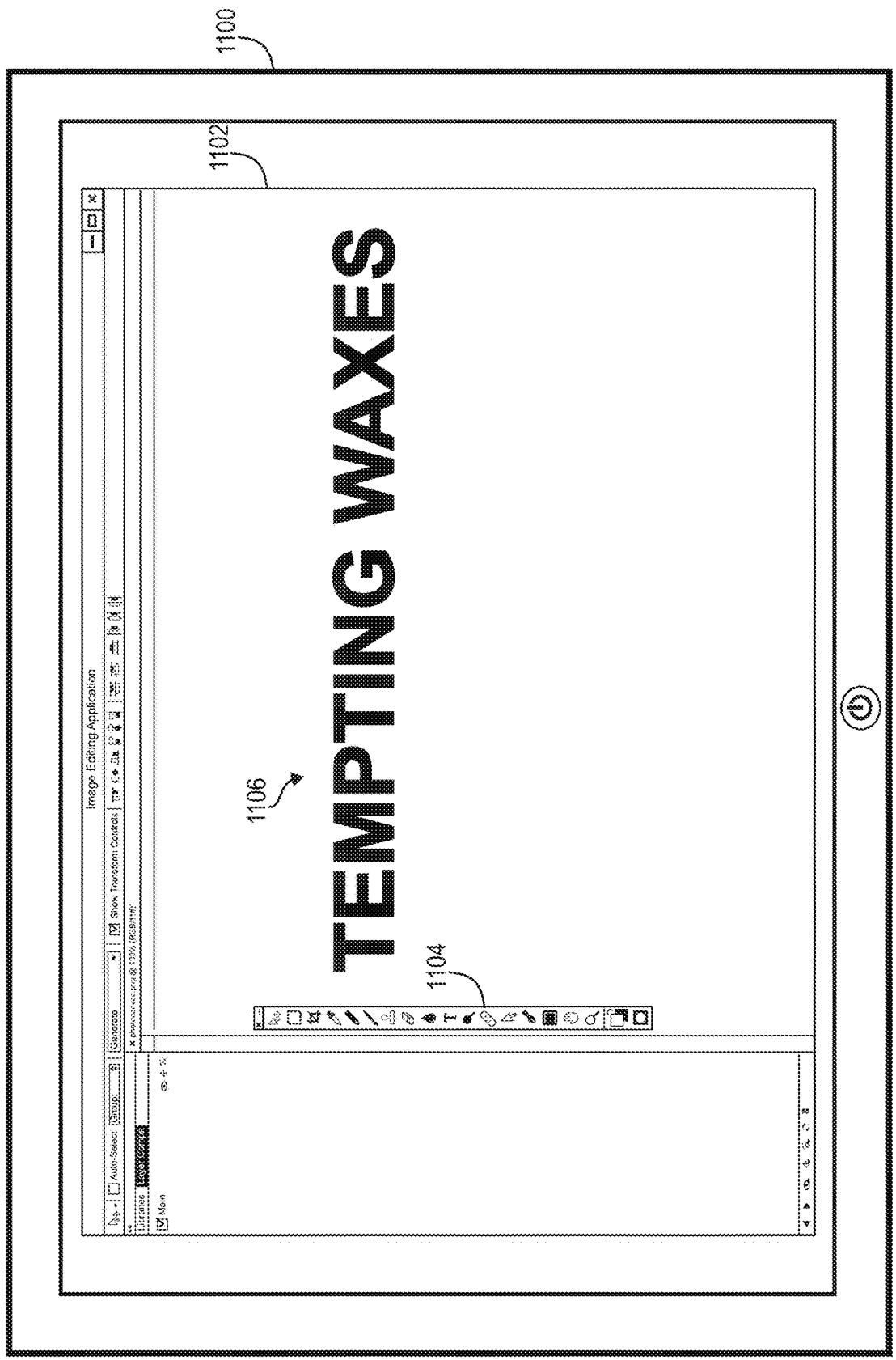
FIGS. 11A-11F illustrate diagrams for deforming digital text along a curved path in accordance with one or more implementations.
Figure 11B:
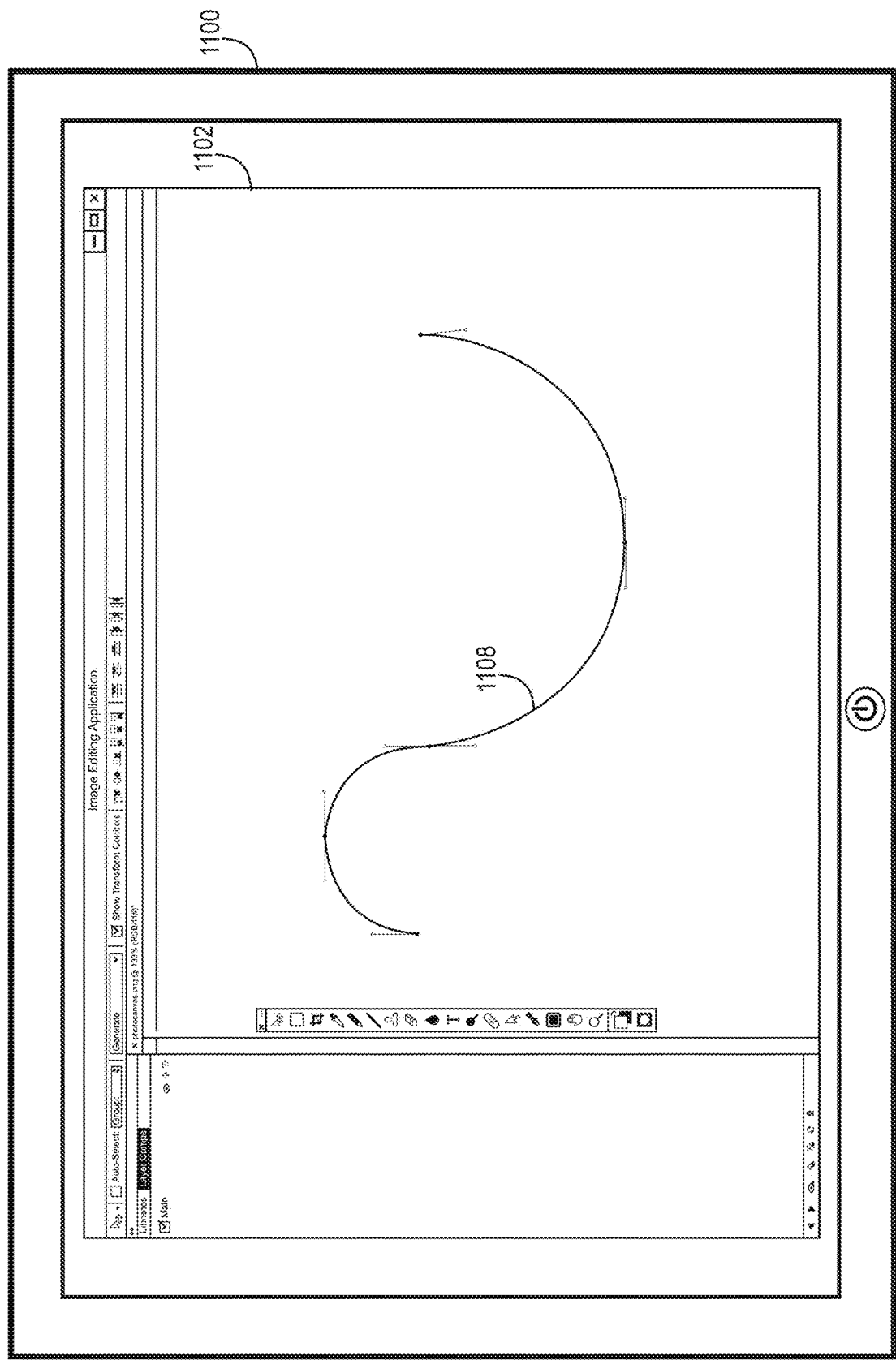
Figure 11C:
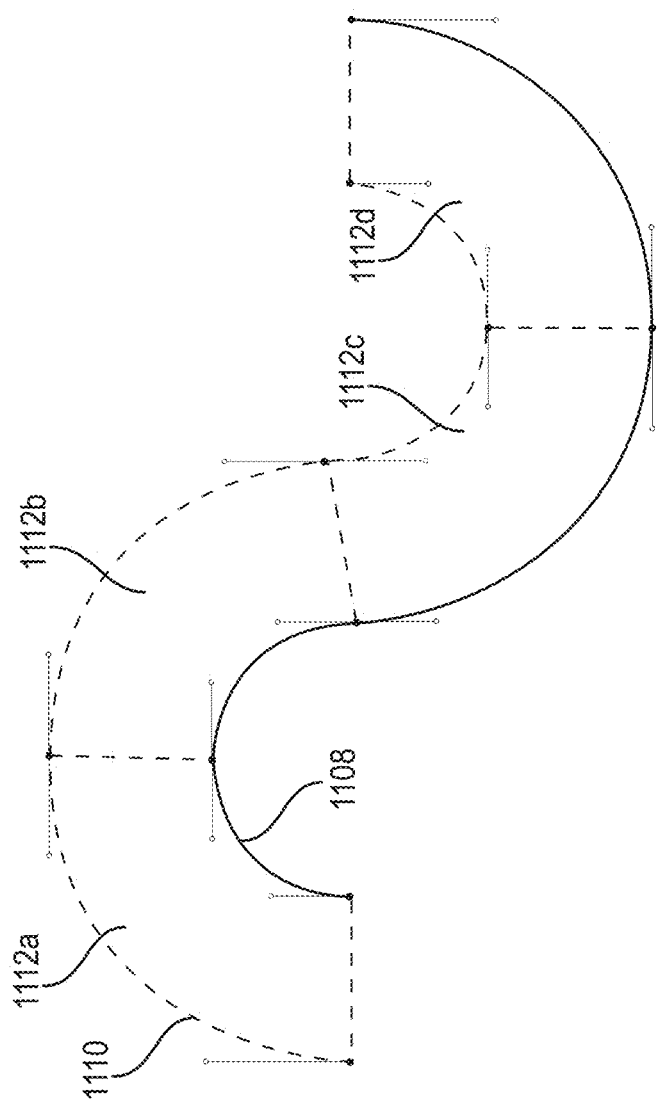
Figure 11D:
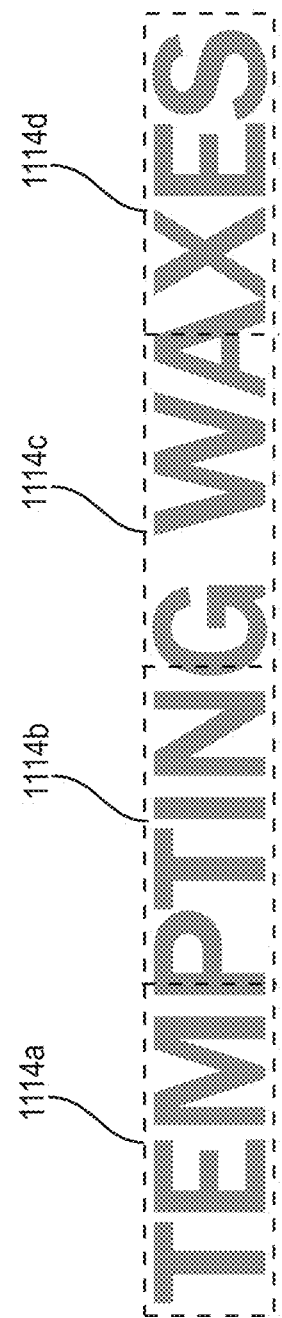
Figure 11E:
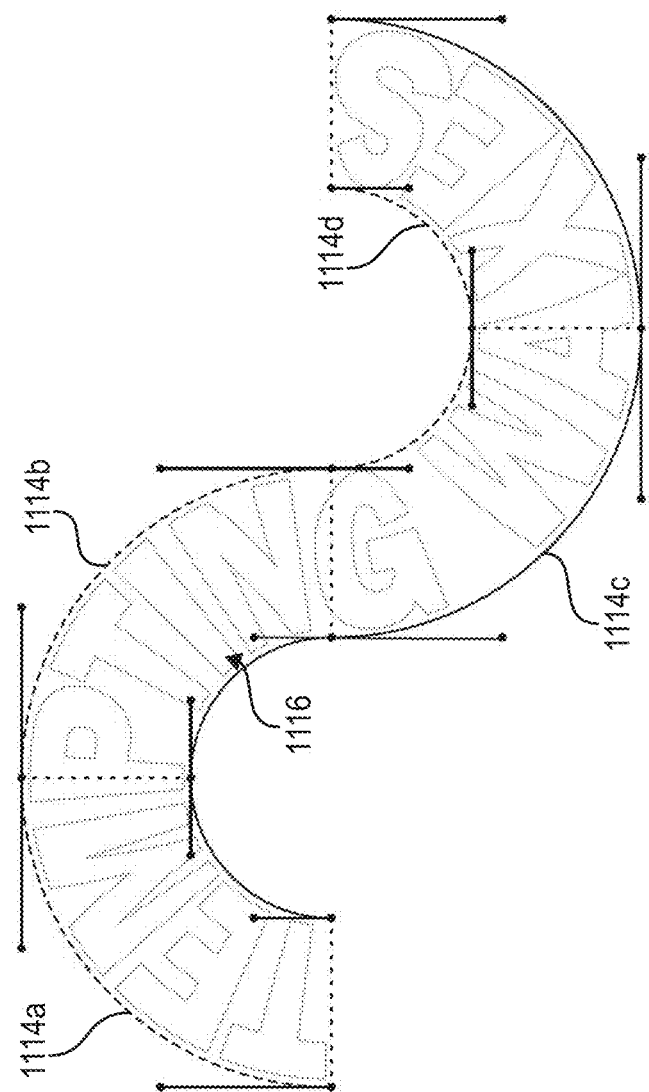
Figure 11F:
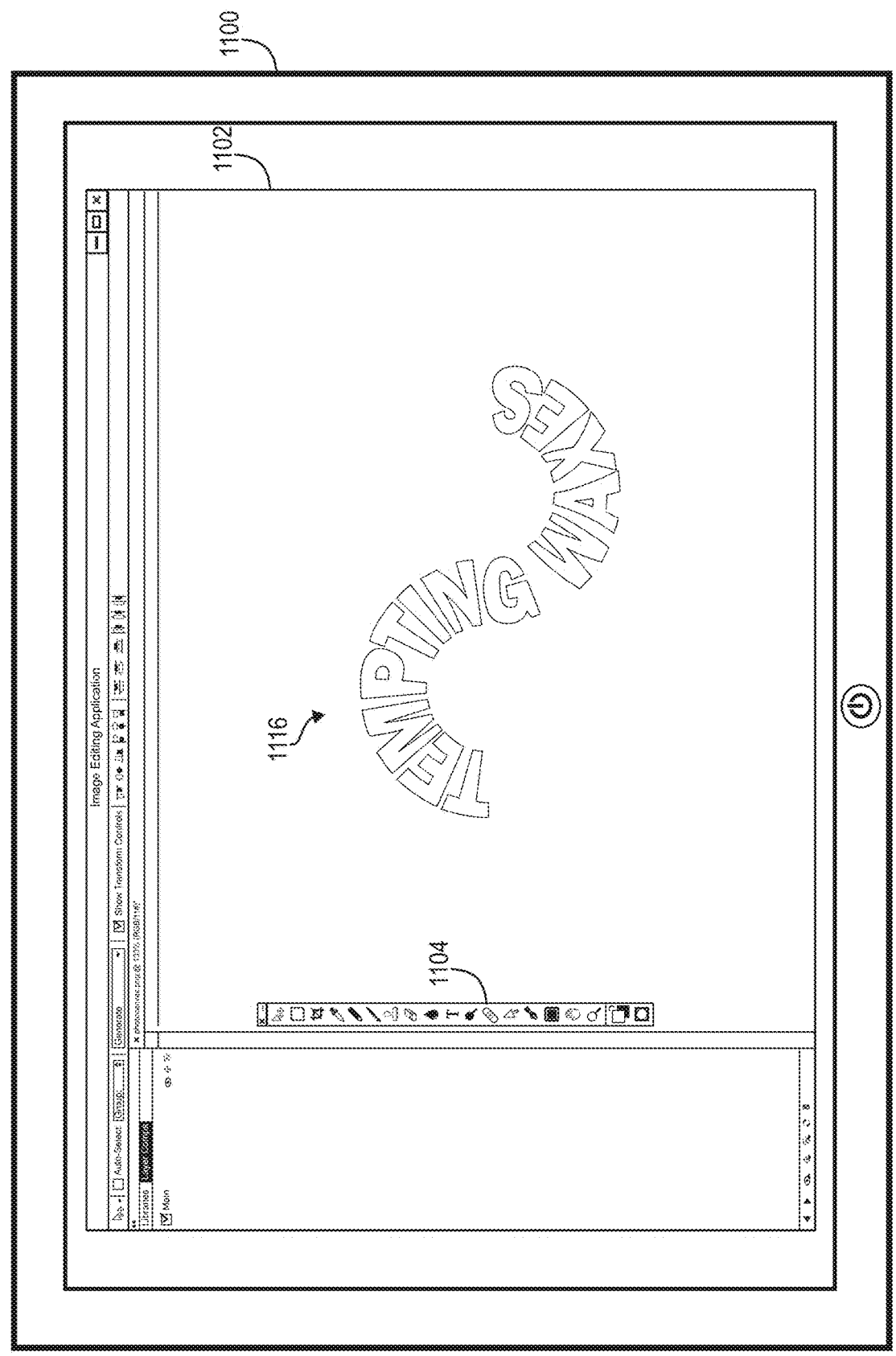

As mentioned, FIGS. 11A-11F illustrate diagrams for performing a deformation operation on digital text along a curved path within a client application. Specifically, FIGS. 11A, 11B and 11F illustrate embodiments of a graphical user interface of a client application displayed on a client device. FIGS. 11C and 11D illustrate embodiments of determining deformation regions and generating Bezier patches, respectively, associated with the deformation operation. FIG. 11E illustrates an embodiment of deformed digital text corresponding to the Bezier patches modified based on the deformation regions. The accompanying description includes additional details associated with the various operations described in relation to FIG. 10.

As shown, FIG. 11A includes a client application 1102 running on a client device 1100. For example, the client application 1102 is an image editing application allowing a user to edit digital content using a plurality of tools 1104. In one or more embodiments, the tools 1104 include a text deformation tool allowing a user to deform text along a path using the processes described above in FIG. 10. Alternatively, the text deformation tool is included in a menu, dialog, or other area of the client application 1102.

In response to the user selecting the text deformation tool, the content editing system can prompt the user to input a path for deforming digital text. To illustrate, the user can select digital text 1106 and then select the text deformation tool. As shown in FIG. 11A, the digital text 1106 includes a single line of digital text. While the digital text 1106 includes only a single line of text, the content editing system may allow a user to deform any number of lines along a path, or along a plurality of paths. Thus, the content editing system can provide a flexible text deformation operation for applying deformations to a variety of text configurations.

After identifying the request to deform the digital text 1106 along a path, the content editing system prompts the user to input a path for deforming the digital text 1106. As shown in FIG. 11B, the user input a curved path 1108 that includes one or more Bezier curves. For instance, the client application 1102 can include tools for generating the curved path 1108, including tools allowing the user to specify ends of the curved path 1108 in addition to curvatures/contour of the curved path 1108 by editing control points and rotation handles associated with the curved path 1108. Instead of requesting that the user input the curved path 1108 after the request to deform the digital text 1106, the content editing system can allow the user to input the curved path 1108 prior to the user requesting to deform the digital text 1106 along the curved path 1108.

In one or more additional embodiments, the content editing system allows a user to select from a plurality of different path shapes. To illustrate, the content editing system can allow the user to select a circle, square, wavy line, or any number of predefined shapes. The content editing system can also allow the user to modify one or more characteristics of a shape to vary the appearance of the shape, such as by changing a length, number of curves (e.g., in a sinusoidal path), number of sides on a polygon, or other characteristics of predefined shapes. The content editing system then automatically constructs the curved path 1108 using the indicated characteristics Using the curved path 1108, the content editing system then generates an offset path 1110. FIG. 11C illustrates an embodiment of the offset path 1110 based on the curved path 1108. In particular, content editing system generates the offset path 1110 to be parallel to the curved path 1108 so that the offset path 1110 follows the contour of the curved path 1108 at a distance that is a perpendicular vector from the curved path 1108. Because the offset path 1110 runs parallel to the curved path 1108 at a constant distance from the curved path 1108, the offset path 1110 curves inward when the curved path 1108 curves inward and curves outward when the curved path 1108 curves outward.

In one or more embodiments, the content editing system determines the distance of the offset path 1110 from the curved path 1108 by identifying a height or size of a font of the digital text 1106. Specifically, the content editing system obtains the height of the font from metadata associated with the digital text 1106. Alternatively, the content editing system can determine the distance by analyzing the digital text 1106 to identify a height of the tallest character in the digital text 1106. In one or more embodiments, the content editing system allows a user to specify the distance to modify the deformation of the digital text 1106.

As shown in FIG. 11C, the content editing system also determines a plurality of deformation regions 1112a-1112d based on the curved path 1108 and the offset path 1110. Specifically, the content editing system can determine the deformation regions 1112a-1112d based on the Bezier curves in the curved path 1108. For example, the content editing system can determine the deformation regions 1112a-1112d based on control point locations of the Bezier curves, changes in the curvature of the Bezier curves, or a length of the curved path 1108.

Additionally, when generating the deformation regions 1112a-1112d, the content editing system detects the order (or degree) of the curved path 1108 and the order (or degree) in the direction perpendicular to the curved path 1108. For instance, the deformation regions 1112a-1112d of FIG. 11C include a cubic Bezier curve along the curved path 1108 and a linear order in the direction perpendicular to the curved path 1108. The content editing system can also support other orders in the direction perpendicular to the curved path 1108. Additionally, the content editing system allows a user to modify a deformation order along the height of the digital text 1106 to create a different deformation style that can stretch or compress the text in the vertical direction at different locations.

In one or more embodiments, the content editing system uses the deformation regions to generate a plurality of Bezier patches 1114a-1114d for the digital text 1106. The content editing system uses the deformation regions 1112a-1112d to determine the Bezier patches 1114a-1114d according to Bezier patch joints in the original curved path 1108 defining the warp/deformation operation. In different embodiments, the text may or may not be scaled to fit the full length of the path. More specifically, the content editing system defines the Bezier patches 1114a-1114d so that the Bezier patches 1114a-1114d correspond to the deformation regions 1112a-1112d relative to the digital text 1106 when the digital text 1106 is set along the curved path 1108. To illustrate, when setting the digital text 1106 along the curved path 1108, the edges of the deformation regions 1112a-1112d correspond to the same locations of the digital text 1106 as the edges of the Bezier patches 1114a-1114d relative to the un-deformed digital text 1106.

In one or more embodiments, the content editing system creates the Bezier patches based on the shape of the curved path 1108 and the offset path 1110. The content editing system can then determine how to modify the digital text 1106 based on the shapes of the Bezier patches. For instance, the content editing system can analyze the Bezier patches to determine deformation information to apply to the digital text 1106 based on Bezier curves corresponding to the Bezier patches.

In one or more alternative embodiments, the content editing system modifies a set of Bezier patches 1114a-1114d conforming to the unmodified text (i.e., without any deformation information) based on the deformation regions 1112a-1112d. As illustrated in FIG. 11E, the content editing system modifies the Bezier patches 1114a-1114d by changing the Bezier patches 1114a-1114d to conform to the deformation regions 1112a-1112d. For instance, the content editing system can modify a first Bezier patch 1114a to conform to a first deformation region 1112a by changing a curvature of the Bezier patch 1114a so that the first Bezier patch 1114a has the same shape as the first deformation region 1112a. The content editing system can similarly modify the other Bezier patches for the digital text 1106 to conform to the corresponding deformation regions.

Based on the modified Bezier patches 1114a-1114d, the content editing system generates modified digital text 1116 by deforming text segments corresponding to the Bezier patches 1114a-1114d. In particular, the content editing system deforms the digital text 1116 by separating the digital text 1116 into segments corresponding to the Bezier patches 1114a-1114d. For example, similar to the processes described above with respect to raster images in FIGS. 2A-2E or vector images in FIGS. 6A-6E, the content editing system can segment the digital text 1106 so that each text segment corresponds to a single Bezier patch.

After identifying the text segments and the corresponding Bezier patches, the content editing system deforms the text segments based on any modifications to the corresponding patches. For instance, in response to determining that the Bezier patch corresponding to a particular text segment is modified, the content editing system deforms the text segment accordingly. Thus, if the Bezier patch curves outward according to a contour of the curved path 1108, the content editing system deforms the corresponding text segment to expand the text at farther distances from the curved path 1108. Alternatively, if the Bezier patch curves inward, the content editing system deforms the text segment to compress the text at farther distances from the curved path 1108.

In one or more embodiments, the content editing system deforms the text segments by first extracting Bezier curve outlines of the characters in the digital text 1106. In some embodiments, the content editing system uses edge detection or other image processing method to detect the outlines of each character in the digital text 1106 if the font outlines for the digital text 1106 are not available. Otherwise, the content editing system uses outlines of the digital text 1106 if the font outlines are available. The content editing system then reconstructs the outlines of the characters by fitting Bezier curves to the outlines. This may involve generating one or more paths for each character in the digital text 1106 to represent any curves, points, or other visual characteristics of the text outlines.

The content editing system also identifies control points associated with the Bezier curve outlines of the characters. Specifically, when reconstructing the Bezier curve outlines for the digital text 1106, the content editing system determines the control points as part of the curve generation operation. The control points allow the content editing system to deform segments of the digital text 1106 using the Bezier curve outlines and based on the modified Bezier patches for the different text segments.

The content editing system then generates digital text containing the deformation(s) for one or more text segments. Specifically, the content editing system recombines the segments (i.e., the curve outlines within each segment) with their adjacent segment(s) based on an original layout of the segments. The content editing system can utilize the recombining processes described previously with respect to vector images. The content editing system can then fill or frame the Bezier curve outlines according to the rendering style of the digital text 1106, thus maintaining consistent look-and-feel (including font characteristics, character shape, and spacing) of the digital text 1106 even after deformation. The content editing system can also remove the Bezier curves and provide the modified digital text 1116 within a user interface of the client application 1102, as shown in FIG. 11F. The user can then view and/or make further edits to the modified digital text 1116.

As described in relation to FIG. 10, and the more detailed descriptions in relation to FIGS. 11A-11F, the content editing system can thus perform operations for deforming digital text along a path. The operations allow the content editing system to use a piecewise deformation process with a plurality of separate Bezier patches according to segments of a curved path the text is warped to conform to. Accordingly, the acts and operations illustrated and described above in relation to FIG. 10 (e.g., the step 1004), and the descriptions in FIGS. 11A-11F, provide the corresponding structure for an example step for modifying the digital text to follow the curved path based on a parametric quilt.

Figure 12:
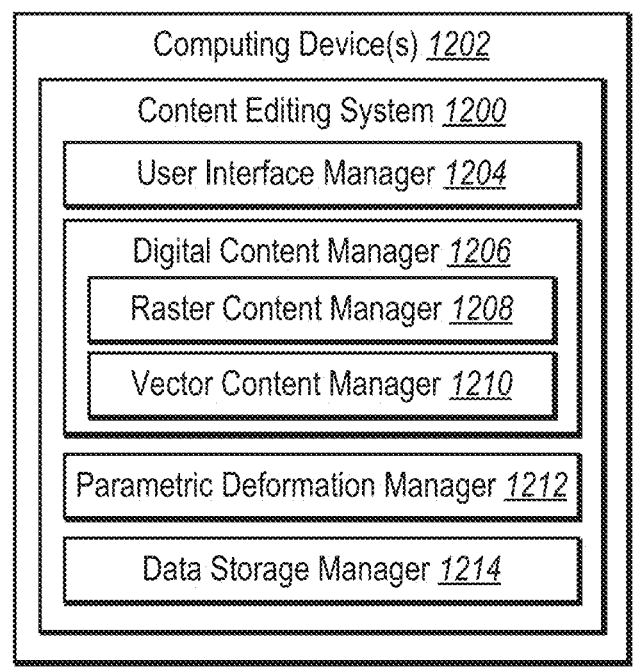
FIG. 12 illustrates a schematic diagram of a digital content editing system in accordance with one or more implementations.

As described in relation to FIGS. 1-8F, the content editing system performs operations for deforming digital content (e.g., raster images, vector images, digital text) using a piecewise deformation process with a quilt of Bezier patches. FIG. 12 illustrates a detailed schematic diagram of an embodiment of the content editing system described above. As shown, the content editing system 1200 can be implemented on computing device(s) 1202 (e.g., a client device and/or a server device as described below in relation to FIG. 13). Additionally, the content editing system can include, but is not limited to, a user interface manager 1204, a digital content manager 1206 including a raster content manager 1208 and a vector content manager 1210, a parametric deformation manager 1212, and a data storage manager 1214. The content editing system 1200 can be implemented on any number of computing devices. For example, the content editing system 1200 can be implemented in a distributed system of server devices for providing digital content editing services for any number of systems or entities. Alternatively, the content editing system 1200 can be implemented on a single computing device such as a single client device running a client application that provides digital content deformation capabilities to a user.

In one or more embodiments, each of the components of the content editing system 1200 are in communication with one another using any suitable communication technologies. Additionally, the components of the content editing system 1200 can be in communication with one or more other devices including other computing devices of a user, server devices (e.g., cloud storage devices), licensing servers, or other devices/systems. Although the components of the content editing system 1200 are shown separately in FIG. 12, any of the subcomponents may be combined into fewer components, such as into a single component, or divided into more components as may serve a particular implementation. Furthermore, although the components of FIG. 12 are described in connection with the content editing system 1200, at least some of the components for performing operations in conjunction with the content editing system 1200 described herein may be implemented on other devices within the environment.

The components of the content editing system 1200 can include software, hardware, or both. For example, the components of the content editing system 1200 can include one or more instructions stored on a computer-readable storage medium and executable by processors of one or more computing devices (e.g., the computing device(s) 1202). When executed by the one or more processors, the computer-executable instructions of the content editing system 1200 can cause the computing device(s) 1202 to perform the digital content deformation operations described herein. Alternatively, the components of the content editing system 1200 can comprise hardware, such as a special purpose processing device to perform a certain function or group of functions. Additionally, or alternatively, the components of the content editing system 1200 can include a combination of computer-executable instructions and hardware.

Furthermore, the components of the content editing system 1200 performing the functions described herein with respect to the content editing system 1200 may, for example, be implemented as part of a stand-alone application, as a module of an application, as a plug-in for applications including marketing applications, as a library function or functions that may be called by other applications, and/or as a cloud-computing model. Thus, the components of the content editing system 1200 may be implemented as part of a stand-alone application on a personal computing device or a mobile device. Alternatively, or additionally, the components of the content editing system 1200 may be implemented in any application that allows digital content editing, including, but not limited to ADOBE® ILLUSTRATOR®, ADOBE PHOTOSHOP®, and ADOBE® AFTER EFFECTS® software. "ADOBE," "ILLUSTRATOR," "PHOTOSHOP," and "AFTER EFFECTS" are registered trademarks of Adobe Systems Incorporated in the United States and/or other countries.

As mentioned, the content editing system 1200 includes a user interface manager 1204 to facilitate the generation and display of content within a user interface of one or more applications on a client device. Additionally, the user interface manager 1204 allows a user to view and/or interact with digital content displayed in a user interface. The user interface manager 1204 can thus allow a user to interact with digital content to modify the digital content by deforming the digital content. For instance, the user interface manager 1204 can display tools or controls to allow the user to modify parametric patches, parametric curves, deformation paths, and input images or text into a client application to deform the specific digital content in one or more ways.

The content editing system 1200 also includes a digital content manager 1206 to facilitate the management of digital content. For example, the digital content manager 1206 can manage processes for handling a variety of digital content. The digital content manager 1206 can communicate with the user interface manager 1204 to allow the user interface manager 1204 to properly display digital content within a user interface. Additionally, the digital content manager 1206 can communicate with the data storage manager 1214 to access digital content stored on the computing device(s) 1202.

The digital content manager 1206 can include a raster content manager 1208 for handling raster image content. Specifically, the raster content manager 1208 can allow the user interface manager 1204 to display raster images within a pixel grid of (x, y) dimensions. Additionally, the raster content manager 1208 can facilitate the segmentation of raster images in connection with a deformation operation. The raster content manager 1208 can thus assist the parametric deformation manager 1212 during a deformation operation of a raster image to accurately apply parametric deformations to separate portions of the raster image and then recombine the portions for creating a deformed raster image.

The digital content manager 1206 can also include a vector content manager 1210 for handling vector image content. In particular, the vector content manager 1210 can allow the user interface manager 1204 to display vector images based on characteristics applied to vector paths/segments. For instance, the vector content manager 1210 can translate end point and direction information into pixel coordinates on a display device for the user interface manager 1204. The vector content manager 1210 can also communicate with the parametric deformation manager 1212 to facilitate segmentation of vector portions during a deformation operation by performing mathematical calculations for finding locations of vector segments within deformation regions. Likewise, the vector content manager 1210 can facilitate recombination of a plurality of vector segments according to predefined tolerances in response to a request to deform one or more of the vector segments.

The content editing system 1200 also includes a parametric deformation manager 1212 to facilitate the operation of Bezier deformations on digital content. Specifically, the parametric deformation manager 1212 can generate a plurality of parametric patches (e.g., Bezier patches part of a Bezier quilt) for a plurality of separate portions of an image during a deformation operation on a digital image or digital text. The parametric deformation manager 1212 can also perform parametric deformations within one or more modified parametric patches based on control point locations/rotations within the parametric patches. The parametric deformation manager 1212 can also communicate with other components of the content editing system 1200 to determine on which portions of digital content to perform the deformations and to recombine the portions into modified digital content.

The content editing system 1200 also includes a data storage manager 1214 (that comprises a non-transitory computer memory) that stores and maintains data associated with deforming digital content using a plurality of parametric patches. For example, the data storage manager 1214 can include a database that stores digital content (e.g., digital images or digital text), content portions corresponding to parametric patches in a deformation operation, and deformation information for one or more portions. Additionally, the data storage manager 1214 can store information associated with recombining the portions, including any deformations, to create a modified digital image. The data storage manager 1214 can then store the modified digital image.

Figure 13:
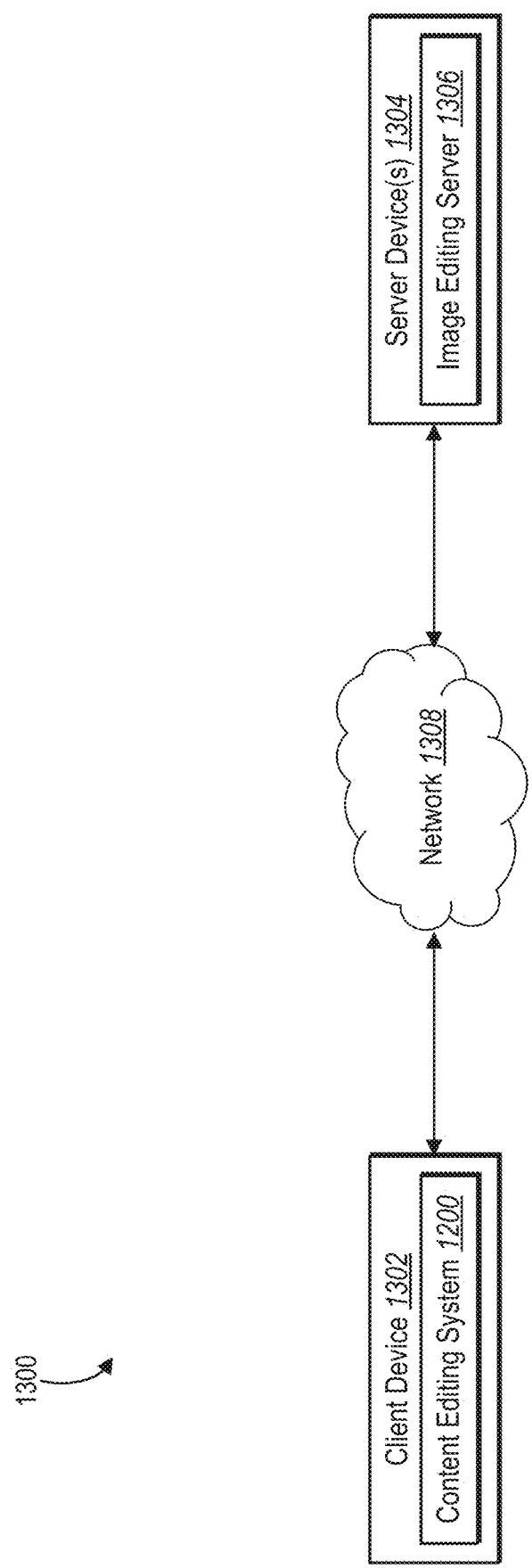
FIG. 13 illustrates an example environment in which a content editing system can operate in accordance with one or more embodiments.

FIG. 13 illustrates a schematic diagram of an environment 1300 in which the content editing system 1200 may be implemented in accordance with one or more embodiments. In one or more embodiments, the environment 1300 includes various computing devices including a client device 1302 and server device(s) 1304. In addition, the environment 1300 includes a network 1308. The network 1308 may be any suitable network over which the computing devices can communicate. Example networks are discussed in more detail below with regard to FIG. 17.

As illustrated in FIG. 13, the environment 1300 includes the client device 1302. The client device 1302 may comprise any computing device, such as the computing device described below in relation to FIG. 17. As shown, the client device includes the content editing system 1200, described previously. For example, as described above, the content editing system 1200 deforms digital content (e.g., digital images or digital text) using piecewise parametric patch deformations. Specifically, the content editing system 1200 employs a plurality of parametric patches that are individually modifiable for deforming separate portions of digital content. Additionally, the content editing system 1200 provides piecewise patch deformation of digital text along a curved path input using the principles described above.

In addition, the environment 1300 includes the server device(s) 1304, which may comprise any computing device, such as one or more of the computing devices described below in relation to FIG. 17. The server device(s) 1304 can generate, store, receive, and transmit any type of data, including graphical content such as digital text or digital images (e.g., raster images or vector images). As shown, the server device(s) 1304 includes an image editing server system 1306 that communicates with the content editing system 1200 on the client device 1302. For example, the image editing server system 1306 transmits graphical content to the client device 1302, which enables the client device 1302 to render raster images or vector images within a graphical user interface of the client device 1302. Notably, while only a single server device is shown, the image editing server system 1306 can be implemented across multiple server devices.

While not illustrated, in one or more embodiments, the server device(s) 1304 can also include all, or a portion of, the content editing system 1200, such as within the image editing server system 1306. For example, when located in the server device(s) 1304, the content editing system 1200 can comprise an application running on the server device(s) 1304 or a portion of a software application that can be downloaded to the client device 1302. For instance, the content editing system 1200 can include a web hosting application allowing the client device 1302 to interact with content from the image editing server system 1306 hosted on the server device(s) 1304. In this manner, the server device(s) 1304 generates and/or modifies raster image content or vector segments based on the digital content and user interaction within a graphical user interface provided to the client device 1302.

Although FIG. 13 illustrates a particular arrangement of the server device(s) 1304, the client device 1302 and the network 1308, various additional arrangements are possible.

For example, while FIG. 13 illustrates the client device 1302 communicating with the server device(s) 1304 via the network 1308, in one or more embodiments, a client device may communicate directly with the server device(s) 1304, bypassing the network 1308.

Similarly, although the environment 1300 of FIG. 13 is depicted as having various components, the environment 1300 may have additional or alternative components. For example, the content editing system 1200 can be implemented on multiple computing devices. In particular, the content editing system 1200 may be implemented in whole by the server device(s) 1304 or the content editing system 1200 may be implemented in whole by the client device 1302. Alternatively, the content editing system 1200 may be implemented across multiple devices or components (e.g., utilizing the server device(s) 1304 and the one or more client device 1302).

Figure 14:
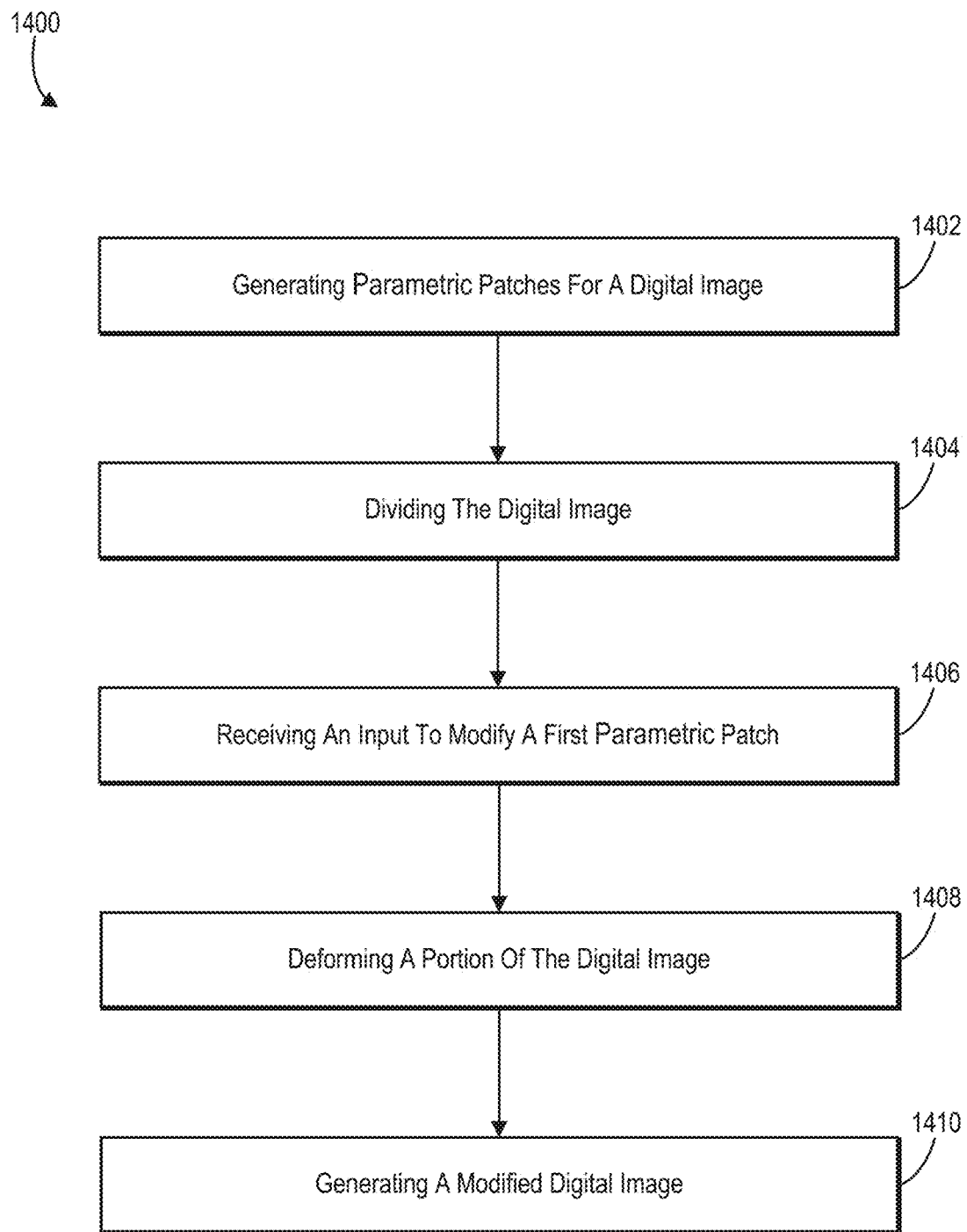
FIG. 14 illustrates a flowchart of a series of acts for piecewise deformation of digital images in accordance with one or more implementations.

Turning now to FIG. 14, this figure illustrates a flowchart of a series of acts 1400 of piecewise deformation of digital images. While FIG. 14 illustrates acts according to one embodiment, alternative embodiments may omit, add to, reorder, and/or modify any of the acts shown in FIG. 14. The acts of FIG. 14 can be performed as part of a method. Alternatively, a non-transitory computer readable medium can comprise instructions, that when executed by one or more processors, cause a computing device to perform the acts of FIG. 14. In still further embodiments, a system can perform the acts of FIG. 14.

The series of acts 1400 includes an act 1402 of generating parametric patches for a digital image. For example, act 1402 involves generating, in response to a request to deform a digital image, a plurality of parametric patches within a parametric quilt corresponding to the digital image. To illustrate act 1402 can involve generating the plurality of parametric patches for a raster image or a vector image. Act 1402 can involve generating a plurality of Bezier patches of equal size within the parametric quilt. For example, act 1402 can involve generating the plurality of Bezier patches based on dimensions of the digital image.

The series of acts 1400 also includes an act 1404 of dividing the digital image. For example, act 1404 involves dividing the digital image into a plurality of portions corresponding to the plurality of parametric patches. Act 1404 can involve dividing the digital image into a plurality of portions in which each portion of the plurality of portions corresponds to a separate parametric patch of the plurality of parametric patches.

Act 1404 can involve determining that a first portion of a vector segment of the digital image is within the first parametric patch of the plurality of parametric patches and a second portion of the vector segment is within a second parametric patch of the plurality of patches. act 1404 can then involve dividing the vector segment into a first sliced segment corresponding to the first portion of the vector segment and a second sliced segment corresponding to the second portion of the vector segment according to a list of path slices for the digital image. For example, act 1404 can involve deforming the first sliced segment according to the modified first parametric patch of the plurality of parametric patches. Additionally, act 1404 can involve recombining the first sliced segment and the second sliced segment in response to determining that the first sliced segment and the second sliced segment are within a predefined tolerance value.

Additionally, the series of acts 1400 includes an act 1406 of receiving an input to modify a first Bezier patch. For example, act 1406 involves receiving an input to modify a first parametric patch of the plurality of parametric patches corresponding to a first portion of the digital image based on a position of a control point for the first parametric patch.

The series of acts 1400 also includes an act 1408 of deforming a portion of the digital image. For example, act 1408 involves deforming, based on the received input, the first portion of the digital image according to the modified first parametric patch of the plurality of parametric patches. Act 1408 can involve maintaining a parametric continuity of the digital image. For instance, act 1408 can involve maintaining a $C^0$ continuity portions of the digital image. Additionally, act 1408 can involve maintaining a $C^1$ continuity across portions of the digital image.

Act 1408 can also involve determining that modifying the first parametric patch causes a second parametric patch of the plurality of parametric patches to modify based on a coincident control point, the second parametric patch being adjacent to the first parametric patch. For example, the coincident control point is at an edge of the second parametric patch and corresponds to a location of the control point for the first parametric patch. Act 1408 can then involve deforming a second portion of the digital image based on the modified second parametric patch.

Furthermore, the series of acts 1400 includes an act 1410 of generating a modified digital image. For example, act 1410 involves generating a modified digital image by recombining the deformed first portion of the digital image with an adjacent portion of the digital image. Act 1410 can involve generating the modified digital image by recombining the deformed first portion of the digital image with the deformed second portion of the digital image. Additionally, act 1410 can involve combining the deformed first portion of the digital image with at least one portion of the digital image outside the parametric quilt.

Act 1410 can also involve recombine a deformed first sliced segment with the second sliced segment based on the list of path slices. For example, act 1410 can involve recombining the deformed first sliced segment with the second sliced segment in response to determining that the first sliced segment and the second sliced segment meet a predefined tolerance value.

Figure 15:
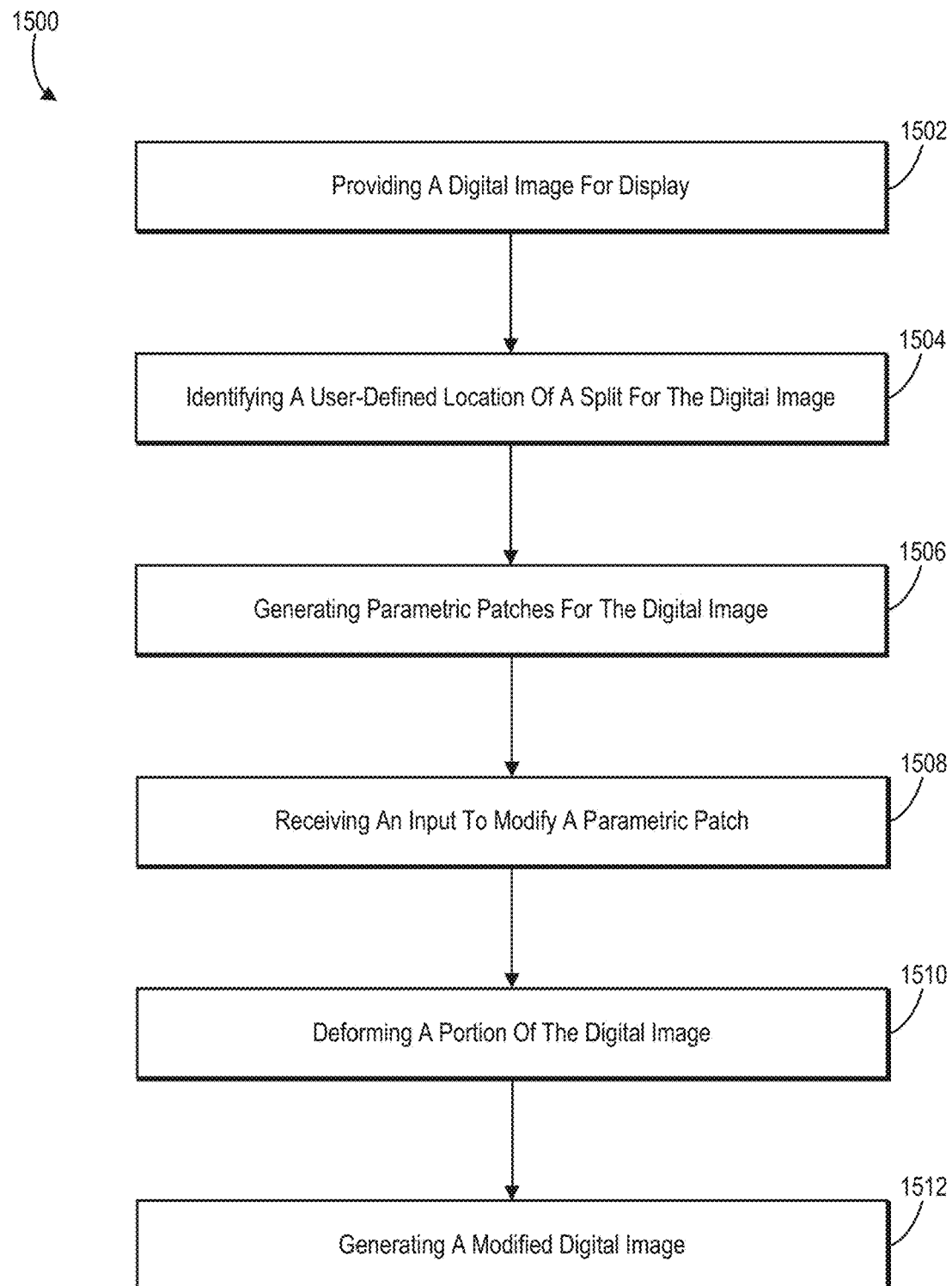
FIG. 15 illustrates a flowchart of a series of acts for dynamic piecewise deformation of digital images in accordance with one or more implementations.

Turning now to FIG. 15, this figure illustrates a flowchart of a series of acts 1500 of piecewise deformation of digital images via a dynamic parametric patch split control. While FIG. 15 illustrates acts according to one embodiment, alternative embodiments may omit, add to, reorder, and/or modify any of the acts shown in FIG. 15. The acts of FIG. 15 can be performed as part of a method. Alternatively, a non-transitory computer readable medium can comprise instructions, that when executed by one or more processors, cause a computing device to perform the acts of FIG. 15. In still further embodiments, a system can perform the acts of FIG. 15.

The series of acts 1500 includes an act 1502 of providing a digital image for display. For example, act 1502 involves providing a digital image for display via a graphical interface of a client device, the graphical interface comprising a dynamic parametric patch split control. The dynamic parametric patch split control can include a graphical element that causes a computing device to display a dynamic split indicator for dividing a digital image into portions in connection with a deformation operation.

The series of acts 1500 also includes an act 1504 of identifying a user-defined location of a split for the digital image. For example, act 1504 involves, based on user input via the dynamic parametric patch split control, identifying a user-defined location of a split for the digital image. Act 1504 can involve identifying a user-defined location of a horizontal split or a vertical split for the digital image. Act 1504 can involve determining that the plurality of splits comprises a vertical split and a horizontal split crossing at a location of a cursor.

As part of act 1504, or as an additional act, the series of acts 1500 can include detecting, via the graphical interface, a location of a cursor within a deformation boundary corresponding to the deformation operation. The series of acts 1500 can then involve identifying the user-defined location of the split based on the location of the cursor. The series of acts 1500 can also include an act of displaying, within the graphical interface, a first line at a first location of the cursor and a second line at a second location of the cursor. The series of acts 1500 can then include setting the user-defined location of the split at the second location of the cursor in response to detecting a selection input to insert the split at the second location. Additionally, the series of acts 1500 can include identifying a previously deformed parametric patch corresponding to the digital image, and display the first line based on the deformed parametric patch.

As part of act 1504, or as an additional act, the series of acts 1500 can include determining whether a location of a cursor is within a threshold distance of an existing split in the parametric quilt. If the location of the cursor is within the threshold distance of an existing vertical split in the parametric quilt, the series of acts 1500 can include displaying a horizontal split indicator at the location of the cursor. If the location of the cursor is within the threshold distance of an existing horizontal split in the parametric quilt, the series of acts 1500 can include displaying a vertical split indicator at the location of the cursor. If the location of the cursor is not within the threshold distance of any existing splits in the parametric quilt, the series of acts 1500 can include displaying a cross split indicator at the location of the cursor.

Additionally, the series of acts 1500 includes an act 1506 of generating parametric patches for the digital image. For example, act 1506 involves generating, based on the user-defined location of the split, a plurality of parametric patches within a parametric quilt corresponding to the digital image, each parametric patch of the plurality of parametric patches corresponding to a separate portion of the digital image.

As part of act 1506, or as an additional act, the series of acts 1500 can include identifying, via the graphical interface, an indication to insert a buffer zone between the first portion of the digital image and a second portion of the digital image. The series of acts 1500 can also include generating the buffer zone between the first portion and the second portion, the buffer zone preventing a deformation in the first portion from deforming the second portion. Additionally, the series of acts 1500 can include generating a plurality of transition lines at a plurality of boundaries of the buffer zone, a first transition line of the plurality of transition lines indicating an edge of a first parametric patch corresponding to the first portion and a second transition line of the plurality of transition lines indicating an edge of a second parametric patch corresponding to the second portion. The series of acts 1500 can also include identifying, via the graphical interface, a user-defined size of the buffer zone and generating the buffer zone according to the user-defined size.

For example, the series of acts 1500 can include providing, within the graphical interface, a first set of control points for the first parametric patch and a second set of control points for the second parametric patch. The series of acts 1500 can include identifying, via the graphical interface, an input to modify a control point of the first set of control points to modify the first parametric patch. The series of acts 1500 can then include deforming the first portion based on the modified first parametric patch and deforming the buffer zone to maintain a parametric continuity between the first portion and the buffer zone without deforming the second portion.

The series of acts 1500 also includes an act 1508 of receiving an input to modify a parametric patch. For example, act 1508 involves receiving an input to modify a first parametric patch of the plurality of parametric patches based on a position of a control point for the first parametric patch.

Furthermore, the series of acts 1500 includes an act 1510 of deforming a portion of the digital image. For example, act 1510 involves deforming, in response to the input to modify the first parametric patch, a first portion of the digital image based on the modified first parametric patch. Act 1510 can involve maintaining a parametric continuity of the digital image. For instance, act 1510 can involve maintaining a $C^0$ continuity portions of the digital image. Additionally, act 1510 can involve maintaining a $C^1$ continuity across portions of the digital image.

The series of acts 1500 then includes an act 1512 of generating a modified digital image. For example, act 1512 involves generating a modified digital image including the deformed first portion of the plurality of portions. Act 1512 can involve generating the modified digital image by recombining the deformed first portion of the digital image with a second portion of the digital image. Additionally, act 1512 can involve combining the deformed first portion of the digital image with at least one portion of the digital image outside the parametric quilt.

Figure 16:
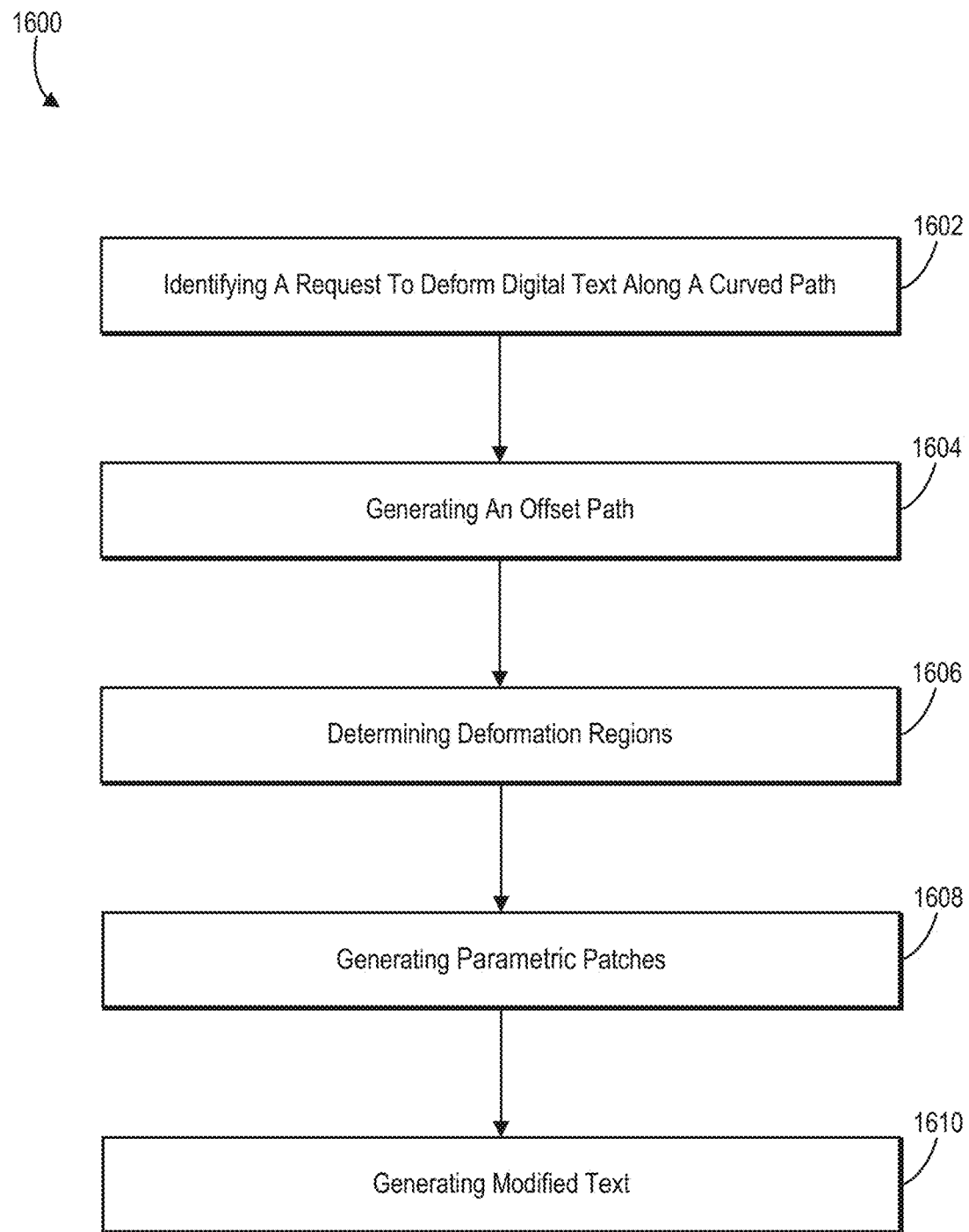
FIG. 16 illustrates a flowchart of a series of acts for piecewise deformation of digital text along a path in accordance with one or more implementations.

Turning now to FIG. 16, this figure illustrates a flowchart of a series of acts 1600 of piecewise deformation of digital text along a path. While FIG. 16 illustrates acts according to one embodiment, alternative embodiments may omit, add to, reorder, and/or modify any of the acts shown in FIG. 16. The acts of FIG. 16 can be performed as part of a method. Alternatively, a non-transitory computer readable medium can comprise instructions, that when executed by one or more processors, cause a computing device to perform the acts of FIG. 16. In still further embodiments, a system can perform the acts of FIG. 16.

The series of acts 1600 includes an act 1602 of identifying a request to deform digital text along a curved path. Act 1602 can involve identifying a request to deform digital text along a curved path comprising at least one Bezier curve. The curved path can also comprise a combination of one or more Bezier curves and one or more straight portions.

The series of acts 1600 also includes an act 1604 of generating an offset path. For example, act 1604 involves generating an offset path corresponding to the curved path, the offset path being offset from the curved path by a distance based on a size of the digital text. Act 1604 can involve determining a height of the digital text based on a font size of the digital text. Alternatively, act 1604 can involve determining a height of a character of the digital text. Act 1604 can then involve generating a path parallel to the curved path at a distance from the curved path corresponding to the determined height.

The series of acts 1600 further includes an act 1606 of determining deformation regions. For example, act 1606 involves determining a plurality of deformation regions based on the curved path and the offset path. Act 1606 can involve determining the plurality of deformation regions based on one or more Bezier curves of the curved path. Act 1606 can involve determining the plurality of deformation regions based on a length of the curved path or a length of the offset path.

Additionally, the series of acts 1600 includes an act 1608 of generating parametric patches. For example, act 1608 involves generating a plurality of parametric patches corresponding to a plurality of portions of the digital text. Act 1608 can involve determining sizes of the plurality of parametric patches based on sizes of the plurality of deformation regions.

As part of act 1608, or as an additional act, the series of acts 1600 can include dividing the digital text into the plurality of portions based on identified edges of the plurality of Bezier patches, wherein the edges of the plurality of Bezier patches correspond to edges of the plurality of deformation regions.

The series of acts 1600 also includes an act 1610 of generating modified text. For example, act 1610 involves generating modified text that follows the curved path by modifying a parametric patch of the plurality of parametric patches based on a corresponding deformation region of the plurality of deformation regions. Act 1610 can involve dividing the digital text into the plurality of portions based on the plurality of parametric patches and deforming a first portion of the plurality of portions based on a corresponding first parametric patch of the plurality of parametric patches.

Act 1610 can also involve recombining the deformed first portion with an adjacent portion of the plurality of portions. Furthermore, act 1610 can involve deforming a second portion of the plurality of portions based on a corresponding second parametric patch of the plurality of parametric patches, the second portion being adjacent to the first portion. Act 1610 can then involve recombining the deformed first portion and the deformed second portion.

Act 1610 can involve deform at least one character within a portion of the plurality of portions corresponding to a first parametric patch of the plurality of parametric patches by modifying a spacing and a shape of the at least one character within the portion. Additionally, act 1610 can involve determining a parametric curve outline of the at least one character within the portion and modifying the parametric curve outline of the at least one character based on the first parametric patch. Act 1610 can then involve filling the modified parametric curve outline of the at least one character according to a rendering style of the digital text.

Act 1610 can also involve determining that a first portion of a character of the digital text corresponds to a first parametric patch of the plurality of parametric patches and a second portion of the character of the digital text corresponds to a second parametric patch of the plurality of parametric patches. Act 1610 an involve deforming the first portion of the character based on the first parametric patch and the second portion of the character based on the second parametric patch.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 17:
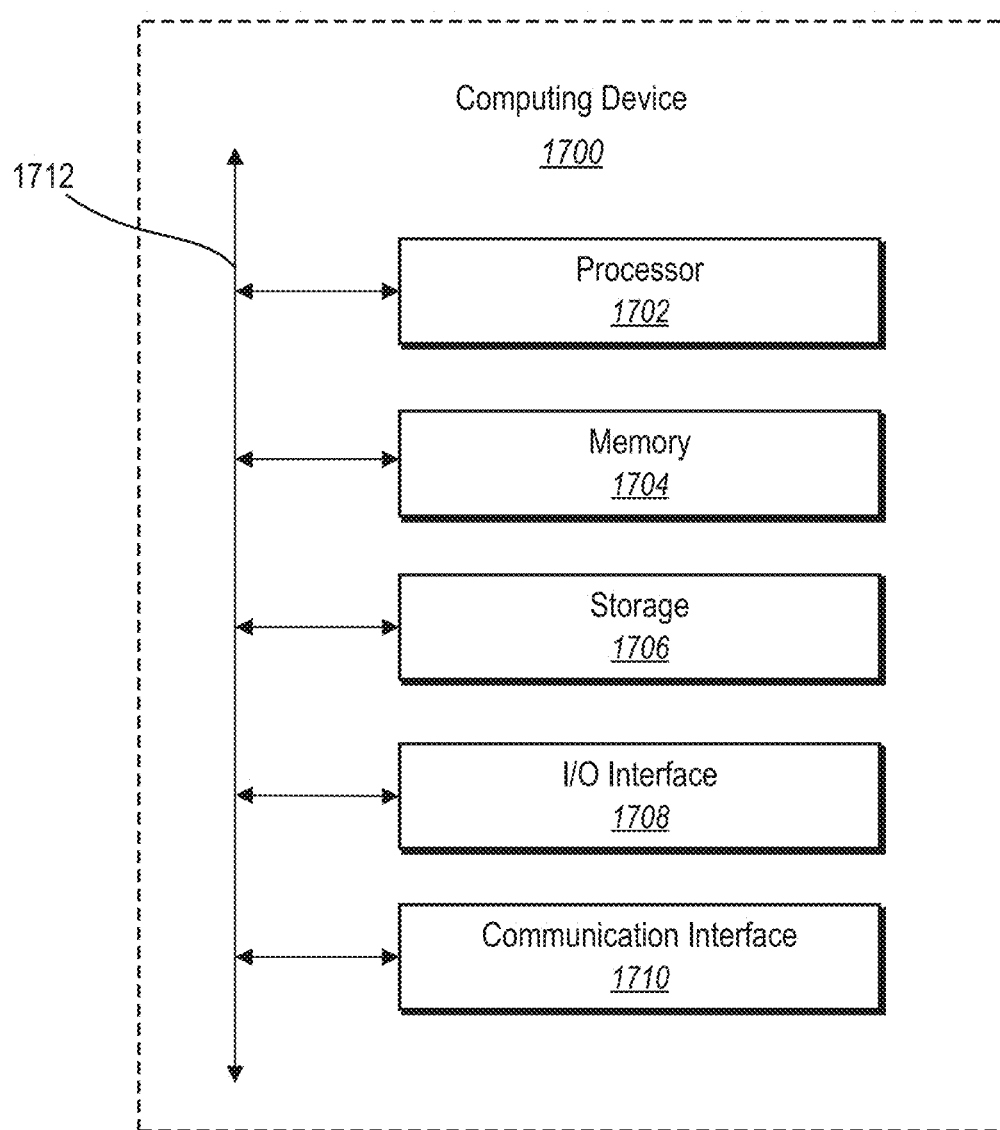
FIG. 17 illustrates a block diagram of an exemplary computing device in accordance with one or more embodiments.

FIG. 17 illustrates a block diagram of exemplary computing device 1700 that may be configured to perform one or more of the processes described above. One will appreciate that one or more computing devices such as the computing device 1700 may implement the content editing system. As shown by FIG. 17, the computing device 1700 can comprise a processor 1702, a memory 1704, a storage device 1706, an I/O interface 1708, and a communication interface 1710, which may be communicatively coupled by way of a communication infrastructure 1712. In certain embodiments, the computing device 1700 can include fewer or more components than those shown in FIG. 17. Components of the computing device 1700 shown in FIG. 17 will now be described in additional detail.

In one or more embodiments, the processor 1702 includes hardware for executing instructions, such as those making up a computer program. As an example, and not by way of limitation, to execute instructions for dynamically modifying workflows, the processor 1702 may retrieve (or fetch) the instructions from an internal register, an internal cache, the memory 1704, or the storage device 1706 and decode and execute them. The memory 1704 may be a volatile or non-volatile memory used for storing data, metadata, and programs for execution by the processor(s). The storage device 1706 includes storage, such as a hard disk, flash disk drive, or other digital storage device, for storing data or instructions for performing the methods described herein.

The I/O interface 1708 allows a user to provide input to, receive output from, and otherwise transfer data to and receive data from computing device 1700. The I/O interface 1708 may include a mouse, a keypad or a keyboard, a touch screen, a camera, an optical scanner, network interface, modem, other known I/O devices or a combination of such I/O interfaces. The I/O interface 1708 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1708 is configured to provide graphical data to a display for presentation to a user. The graphical data may be representative of one or more graphical user interfaces and/or any other graphical content as may serve a particular implementation.

The communication interface 1710 can include hardware, software, or both. In any event, the communication interface 1710 can provide one or more interfaces for communication (such as, for example, packet-based communication) between the computing device 1700 and one or more other computing devices or networks. As an example, and not by way of limitation, the communication interface 1710 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 1710 may facilitate communications with various types of wired or wireless networks. The communication interface 1710 may also facilitate communications using various communication protocols. The communication infrastructure 1712 may also include hardware, software, or both that couples components of the computing device 1700 to each other. For example, the communication interface 1710 may use one or more networks and/or protocols to enable a plurality of computing devices connected by a particular infrastructure to communicate with each other to perform one or more aspects of the processes described herein. To illustrate, the digital content campaign management process can allow a plurality of devices (e.g., a client device and server devices) to exchange information using various communication networks and protocols for sharing information such as electronic messages, user interaction information, engagement metrics, or campaign management resources.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A non-transitory computer readable storage medium comprising instructions that, when executed by at least one processor, cause a computer system to:
   provide a two-dimensional digital image for display via a graphical interface of a client device, the graphical interface comprising a dynamic parametric patch split control for generating a plurality of parametric patches on the two-dimensional digital image;
   based on user input via the dynamic parametric patch split control, identify a user-defined location of a split within the two-dimensional digital image;
   generate, based on the user-defined location of the split, a parametric quilt comprising a plurality of parametric patches corresponding to separate portions of the two-dimensional digital image by dividing the two-dimensional digital image along edges of the plurality of parametric patches at the user-defined location of the split, wherein each parametric patch of the plurality of parametric patches comprises a separate set of parametric curves controlled by a separate set of control points;
   receive an input to modify a first parametric patch of the plurality of parametric patches based on a position of a control point in a first set of control points corresponding to the first parametric patch;
   deform, in response to the input to modify the first parametric patch, a first portion of the two-dimensional digital image based on the modified first parametric patch; and
   generate a modified digital image including the deformed first portion.

2. The non-transitory computer readable storage medium as recited in claim 1, further comprising instructions that, when executed by the at least one processor, cause the computer system to:
   receive an input to modify a second parametric patch of the plurality of parametric patches based on a position of a control point in a second set of control points corresponding to the second parametric patch;
   deform, in response to the input to modify the second parametric patch, a second portion of the two-dimensional digital image based on the modified second parametric patch separately from the first portion corresponding to the first parametric patch, wherein the first portion and the second portion each comprises an edge at the user-defined location of the split; and
   generate a modified digital image including the deformed second portion.

3. The non-transitory computer readable storage medium as recited in claim 2, wherein the instructions that cause the computer system to generate the modified digital image cause the computer system to generate the modified digital image by recombining the deformed first portion and the deformed second portion at the user-defined location of the split.

4. The non-transitory computer readable storage medium as recited in claim 1, wherein the instructions that cause the computer system to identify the user-defined location of the split for the digital image causes the computer system to:

detect, via the graphical interface, a location of a cursor within a deformation boundary corresponding to a deformation operation for the two-dimensional digital image;

identify the user-defined location of the split based on the location of the cursor; and display, within the graphical interface, a first line at a first location of the cursor.

5. The non-transitory computer readable storage medium as recited in claim 4, further comprising instructions that, when executed by the at least one processor, cause the computer system to:

identify a previously deformed parametric patch corresponding to the two-dimensional digital image; and display the first line based on the deformed parametric patch.

6. The non-transitory computer readable storage medium as recited in claim 1, further comprising instructions that, when executed by the at least one processor, cause the computer system to:

determine whether a location of a cursor is within a threshold distance of an existing split in the parametric quilt;

if the location of the cursor is within the threshold distance of an existing vertical split in the parametric quilt, display a horizontal split indicator at the location of the cursor;

if the location of the cursor is within the threshold distance of an existing horizontal split in the parametric quilt, display a vertical split indicator at the location of the cursor; and if the location of the cursor is not within the threshold distance of any existing splits in the parametric quilt, display a cross split indicator at the location of the cursor.

7. The non-transitory computer readable storage medium as recited in claim 1, wherein the instructions that cause the computer system to generate the parametric quilt comprising the plurality of parametric patches cause the computer system to:

identify, via the graphical interface, an indication to insert a buffer zone between the first portion of the digital image and a second portion of the two-dimensional digital image; and generate the buffer zone between the first portion and the second portion, the buffer zone corresponding to a portion of the two-dimensional digital image between the first portion and the second portion and preventing a deformation in the first portion from deforming the second portion.

8. The non-transitory computer readable storage medium as recited in claim 7, wherein the instructions that cause the computer system to generate the buffer zone cause the computer system to generate a plurality of transition lines at a plurality of boundaries of the buffer zone, a first transition line of the plurality of transition lines indicating an edge of the first parametric patch corresponding to the first portion and a second transition line of the plurality of transition lines indicating an edge of a second parametric patch corresponding to the second portion.

9. The non-transitory computer readable storage medium as recited in claim 8, wherein the instructions that cause the computer system to generate the buffer zone cause the computer system to:

provide, within the graphical interface, the first set of control points for the first parametric patch and a second set of control points for the second parametric patch;

identify, via the graphical interface, an input to modify a control point of the first set of control points to modify the first parametric patch;

deform the first portion based on the modified first parametric patch; and deform the buffer zone to maintain a parametric continuity between the first portion and the buffer zone without deforming the second portion.

10. The non-transitory computer readable storage medium as recited in claim 7, wherein the instructions that cause the computer system to generate the buffer zone cause the computer system to:

identify, via the graphical interface, a user-defined size of the buffer zone; and generate the buffer zone according to the user-defined size.

11. In a digital medium environment for digital image editing, a system for user-defined piecewise deformation of digital images comprising:

at least one processor; and a non-transitory computer memory comprising:

a two-dimensional digital image; and instructions that, when executed by the at least one processor, cause the system to:

provide the two-dimensional digital image for display via a graphical interface of a client device, the graphical interface comprising a dynamic parametric patch split control for generating a plurality of parametric patches on the two-dimensional digital image;

display, within the graphical interface based on user input via the dynamic parametric patch split control, a dynamic split indicator corresponding to movement of a cursor within the graphical interface;

in response to user input indicating a split selection, set a user-defined location of a split within the two-dimensional digital image according to a location of the cursor and corresponding to the dynamic split indicator;

generate, based on the user-defined location of the split, a parametric quilt comprising a plurality of parametric patches corresponding to separate portions of the two-dimensional digital image by dividing the two-dimensional digital image along edges of the plurality of parametric patches at the user-defined location of the split, wherein each parametric patch of the plurality of parametric patches comprises a separate set of parametric curves controlled by a separate set of control points;

receive an input to modify a first parametric patch of the plurality of parametric patches based on a position of a control point in a first set of control points corresponding to the first parametric patch;

deform, in response to the input to modify the first parametric patch, a first portion of the two-dimensional digital image based on the modified first parametric patch; and generate a modified digital image including the deformed first portion.

12. The system as recited in claim 11, wherein the instructions that cause the system to display the dynamic split indicator cause the system to display, within the graphical interface, a first line at a first location of the cursor and a second line at a second location of the cursor as the cursor moves within the graphical interface.

13. The system as recited in claim 11, further comprising instructions that, when executed by the at least one processor, cause the system to determine that the user input indicating the split selection comprises an indication to insert a vertical split and a horizontal split centered at the location of the cursor.

14. The system as recited in claim 11, wherein the instructions that cause the system to generate the plurality of parametric patches cause the system to:
identify, via the graphical interface, an indication to insert a buffer zone between the first parametric patch corresponding to the first portion of the two-dimensional digital image and a second parametric patch corresponding to a second portion of the two-dimensional digital image; and
generate the buffer zone between the first parametric patch and the second parametric patch, the buffer zone corresponding to a portion of the two-dimensional digital image between the first portion and the second portion and preventing the first parametric patch from causing a deformation of the second portion.

15. The system as recited in claim 14, wherein the instructions that cause the system to generate the buffer zone cause the system to generate a plurality of transition lines at a plurality of boundaries of the buffer zone, a first transition line of the plurality of transition lines indicating an edge of the first parametric patch and a second transition line of the plurality of transition lines indicating an edge of the second parametric patch, the first transition line being separated from the second transition line by a distance corresponding to the buffer zone.

16. The system as recited in claim 15, wherein the instructions that cause the system to generate the buffer zone cause the system to:
provide, within the graphical interface, the first set of control points for the first parametric patch and a second set of control points for the second parametric patch;
identify, via the graphical interface, an input to modify a control point of the first set of control points to modify the first parametric patch;
deform the first portion based on the modified first parametric patch; and
deform the buffer zone to maintain a parametric continuity between the first portion and the buffer zone without deforming the second portion.

17. The system as recited in claim 11, wherein the instructions that cause the system to identify the display the dynamic split indicator cause the system to:
identify a previously deformed parametric patch corresponding to the two-dimensional digital image; and
display the dynamic split indicator based on the deformed parametric patch.

18. The system as recited in claim 17, wherein the instructions that cause the system to display the dynamic split indicator based on the deformed parametric patch cause the system to modify the dynamic split indicator to correspond to a curvature of the previously deformed parametric patch.

19. In a digital medium environment for digital image editing, a computer-implemented method for dynamic piecewise deformation of digital images comprising:
identifying, by at least one processor, a request to deform a two-dimensional digital image via a dynamic parametric patch split control for generating a plurality of parametric patches on the two-dimensional digital image;
displaying, within a graphical interface in response to the request, a dynamic split indicator corresponding to movement of a cursor within the graphical interface;
identifying an input to set a split within the two-dimensional digital image;
dividing, based on the input to set the split, the two-dimensional digital image into a plurality of separate portions at a location of the cursor and corresponding to the dynamic split indicator;
generating, for the plurality of separate portions, a parametric quilt comprising a plurality of parametric patches corresponding to the separate portions of the two-dimensional digital image, wherein each parametric patch of the plurality of parametric patches comprises a separate set of parametric curves controlled by a separate set of control points;
identifying an input to modify a first parametric patch of the plurality of parametric patches via a position of a control point in a first set of control points corresponding to the first parametric patch;
deforming, in response to the input to modify the first parametric patch, a first portion of the two-dimensional digital image based on the modified first parametric patch; and
generating a modified digital image including the deformed first portion of the plurality of separate portions.

20. The computer-implemented method as recited in claim 19, further comprising:
identifying, via the graphical interface, an indication to insert a buffer zone between the first portion of the two-dimensional digital image and a second portion of the two-dimensional digital image; and
generating the buffer zone between the first portion and the second portion, the buffer zone corresponding to a portion of the two-dimensional digital image between the first portion and the second portion and preventing a deformation in the first portion from deforming the second portion.

* * * * *